US012589446B2

(12) United States Patent
Song

(10) Patent No.: US 12,589,446 B2
(45) Date of Patent: Mar. 31, 2026

(54) WIRE-FEED FRICTION STIR ADDITIVE MANUFACTURING SYSTEMS, DEVICES, AND METHODS

(71) Applicant: Blue Origin Manufacturing, LLC, Kent, WA (US)

(72) Inventor: Weidong Song, Woodinville, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/979,450

(22) Filed: Dec. 12, 2024

(65) Prior Publication Data

US 2025/0187108 A1 Jun. 12, 2025

Related U.S. Application Data

(60) Provisional application No. 63/611,054, filed on Dec. 15, 2023, provisional application No. 63/608,991, filed on Dec. 12, 2023.

(51) Int. Cl.
*B23K 20/12* (2006.01)
*B33Y 10/00* (2015.01)
(Continued)

(52) U.S. Cl.
CPC ...... *B23K 20/1255* (2013.01); *B23K 20/1215* (2013.01); *B23K 20/1225* (2013.01);
(Continued)

(58) Field of Classification Search
CPC ............ B23K 20/1255; B23K 20/1215; B23K 20/1225; B23K 20/128; B23K 20/1245;
(Continued)

(56) References Cited

U.S. PATENT DOCUMENTS 3,069,847 A 12/1962 Vest, Jr.
3,585,800 A 6/1971 Kuntz
(Continued)

FOREIGN PATENT DOCUMENTS

AU 2014274824 A1 12/2015
AU 2018359514 B2 10/2018
(Continued)

OTHER PUBLICATIONS

Das, S. et al., "Selective Laser Sintering of High Performance High Temperature Materials", Laboratory for Freeform Fabrication, University of Texas at Austin, 1996, pp. 89-96.
(Continued)

*Primary Examiner* — Kiley S Stoner
(74) *Attorney, Agent, or Firm* — Knobbe, Martens, Olson & Bear, LLP

(57) ABSTRACT

A friction stir additive manufacturing system is provided. In one aspect, the system includes a spindle configured to rotate about a central axis, and a housing configured to receive at least a portion of the spindle, the housing configured to remain stationary relative to the spindle. The housing includes a wire inlet extending between an exterior surface of the housing and an interior surface of the housing, and a track extending from the wire inlet and partially around a circumference of an interior surface of the housing. The system also includes a feeding system configured to receive a wire from a roller and feed the wire through the wire inlet and into the track of the housing.

20 Claims, 41 Drawing Sheets

(51) Int. Cl.
  *B33Y 30/00* (2015.01)
  *B25J 9/02* (2006.01)
  *B25J 11/00* (2006.01)

(52) U.S. Cl.
  CPC ............ *B23K 20/128* (2013.01); *B33Y 10/00*
    (2014.12); *B33Y 30/00* (2014.12); *B25J 9/026*
    (2013.01); *B25J 11/005* (2013.01)

(58) Field of Classification Search
  CPC ............... B23K 20/1265; B23K 20/22; B23K
    20/122–1295; B33Y 10/00; B33Y 30/00;
    B33Y 40/00; B25J 9/026; B25J 11/005
  USPC .............................. 228/112.1–114.5, 2.1–2.3
  See application file for complete search history.

(56) References Cited

U.S. PATENT DOCUMENTS

| | | | |
|---|---|---|---|
| 3,737,976 | A | 6/1973 | Lieberman et al. |
| 4,364,067 | A | 12/1982 | Koto et al. |
| 5,233,755 | A | 8/1993 | Vandendriessche |
| 5,697,511 | A | 12/1997 | Bampton |
| 5,971,252 | A | 10/1999 | Rosen et al. |
| 6,050,474 | A | 4/2000 | Aota et al. |
| 6,151,887 | A | 11/2000 | Hadin |
| 6,536,651 | B2 | 3/2003 | Ezumi et al. |
| 6,543,671 | B2 | 4/2003 | Hatten et al. |
| 6,606,851 | B1 | 8/2003 | Herdy, Jr. |
| 6,669,075 | B2 | 12/2003 | Colligan |
| 6,779,707 | B2 | 8/2004 | Dracup et al. |
| 7,090,112 | B2 | 8/2006 | Masingale |
| 7,093,470 | B2 | 8/2006 | El-Soudani |
| 7,097,091 | B2 | 8/2006 | Okamura et al. |
| 7,128,532 | B2 | 10/2006 | Petervary |
| 7,354,657 | B2 | 4/2008 | Mishra |
| 7,430,888 | B2 | 10/2008 | Osame |
| 7,556,187 | B2 | 7/2009 | Sunahara et al. |
| 7,735,223 | B2 | 6/2010 | Clark |
| 7,854,958 | B2 | 12/2010 | Kramer |
| 7,866,532 | B1 | 1/2011 | Potter et al. |
| 8,079,126 | B2 | 12/2011 | Bampton et al. |
| 8,114,474 | B1 | 2/2012 | Dudt et al. |
| 8,141,764 | B1 | 3/2012 | Potter et al. |
| 8,272,424 | B2 | 9/2012 | Short |
| 8,316,916 | B2 | 11/2012 | Heinrich et al. |
| 8,348,136 | B1 | 1/2013 | Potter et al. |
| 8,397,974 | B2 | 3/2013 | Schultz et al. |
| 8,632,850 | B2 | 1/2014 | Schultz et al. |
| 8,636,194 | B2 | 1/2014 | Schultz et al. |
| 8,710,144 | B2 | 4/2014 | Hesse et al. |
| 8,782,892 | B2 | 7/2014 | Seo et al. |
| 8,875,976 | B2 | 11/2014 | Schultz et al. |
| 8,893,954 | B2 | 11/2014 | Schultz et al. |
| 9,027,378 | B2 | 5/2015 | Crump et al. |
| 9,101,979 | B2 | 8/2015 | Hofmann et al. |
| 9,126,367 | B1 | 9/2015 | Mark et al. |
| 9,205,578 | B2 | 12/2015 | Schultz et al. |
| 9,233,438 | B2 | 1/2016 | Phelan et al. |
| 9,238,283 | B2 | 1/2016 | Gniesmer |
| 9,266,191 | B2 | 2/2016 | Kandasamy et al. |
| 9,511,445 | B2 | 12/2016 | Kandasamy |
| 9,511,446 | B2 | 12/2016 | Kandasamy et al. |
| 9,555,580 | B1 | 1/2017 | Dykstra et al. |
| 9,555,871 | B2 | 1/2017 | Grip et al. |
| 9,610,650 | B2 | 4/2017 | Hofmann et al. |
| 9,611,803 | B2 | 4/2017 | Vieira De Morais et al. |
| 9,643,279 | B2 | 5/2017 | Schultz et al. |
| 9,757,802 | B2 | 9/2017 | Cui et al. |
| 9,862,054 | B2 | 1/2018 | Kandasamy et al. |
| 9,931,789 | B2 | 4/2018 | Wiesner et al. |
| 9,937,587 | B2 | 4/2018 | Kou et al. |
| 9,943,929 | B2 | 4/2018 | Schultz et al. |
| 10,011,089 | B2 | 7/2018 | Lyons et al. |
| 10,022,796 | B2 | 7/2018 | Wang |
| 10,105,790 | B2 | 10/2018 | Kandasamy |

| | | | |
|---|---|---|---|
| 10,254,499 | B1 | 4/2019 | Cohen et al. |
| 10,259,041 | B2 | 4/2019 | Gessler et al. |
| 10,279,422 | B2 | 5/2019 | Werz et al. |
| 10,335,854 | B2 | 7/2019 | Wiesner et al. |
| 10,500,674 | B2 | 12/2019 | Kandasamy et al. |
| 10,543,529 | B2 | 1/2020 | Schwarze et al. |
| 10,583,519 | B2 | 3/2020 | Litwinski |
| 10,583,631 | B2 | 3/2020 | Kandasamy et al. |
| 10,625,374 | B2 | 4/2020 | Schwarze |
| 10,670,019 | B2 | 6/2020 | Zinniel et al. |
| 10,724,561 | B2 | 7/2020 | Amira et al. |
| 10,796,727 | B1 | 10/2020 | Coffey et al. |
| 10,857,596 | B1 | 12/2020 | Mittendorf et al. |
| 10,889,098 | B2 | 1/2021 | Yamazaki et al. |
| 10,906,127 | B2 | 2/2021 | Seo et al. |
| 10,953,489 | B2 | 3/2021 | Fröhlke et al. |
| 11,014,292 | B2 | 5/2021 | Marchione |
| 11,077,607 | B2 | 8/2021 | Snyder et al. |
| 11,219,951 | B2 | 1/2022 | Matthews et al. |
| 11,229,972 | B2 | 1/2022 | Mosaki et al. |
| 11,260,468 | B2 | 3/2022 | Frank et al. |
| 11,311,959 | B2 | 4/2022 | Hardwick et al. |
| 11,415,380 | B2 | 8/2022 | Chipko et al. |
| 11,772,188 | B1 | 10/2023 | Sargent |
| 11,981,460 | B2 | 5/2024 | Muceus et al. |
| 12,140,109 | B2 | 11/2024 | Song et al. |
| 12,172,229 | B2 | 12/2024 | Song |
| 2002/0014070 | A1 | 2/2002 | Stechman, Jr. et al. |
| 2003/0042292 | A1* | 3/2003 | Hatten ................. B23K 20/128 |
| | | | 228/2.1 |
| 2003/0192941 | A1 | 10/2003 | Ishida et al. |
| 2004/0060965 | A1 | 4/2004 | Mishra |
| 2004/0074949 | A1 | 4/2004 | Narita et al. |
| 2004/0107019 | A1 | 6/2004 | Keshovmurthy et al. |
| 2004/0155094 | A1 | 8/2004 | Okamoto et al. |
| 2005/0035173 | A1 | 2/2005 | Steel et al. |
| 2005/0242158 | A1 | 11/2005 | Bolser |
| 2005/0279810 | A1 | 12/2005 | Stol et al. |
| 2006/0102699 | A1 | 5/2006 | Burton et al. |
| 2006/0169741 | A1 | 8/2006 | Smith et al. |
| 2006/0289604 | A1 | 12/2006 | Zettler et al. |
| 2007/0152015 | A1 | 7/2007 | Burton et al. |
| 2007/0158343 | A1 | 7/2007 | Shimada et al. |
| 2007/0194051 | A1 | 8/2007 | Bakken et al. |
| 2007/0199978 | A1 | 8/2007 | Ezumi |
| 2008/0096038 | A1 | 4/2008 | Nagano |
| 2008/0128473 | A1 | 6/2008 | Zhou et al. |
| 2009/0188109 | A1 | 7/2009 | Bampton et al. |
| 2010/0140321 | A1 | 6/2010 | Eller et al. |
| 2010/0167083 | A1 | 7/2010 | Park et al. |
| 2010/0242843 | A1 | 9/2010 | Peretti et al. |
| 2010/0252169 | A1 | 10/2010 | Feng et al. |
| 2010/0285207 | A1 | 11/2010 | Creehan et al. |
| 2011/0062219 | A1 | 3/2011 | Bezaire et al. |
| 2011/0262695 | A1 | 10/2011 | Lee et al. |
| 2011/0266330 | A1 | 11/2011 | Bruck et al. |
| 2011/0315367 | A1 | 12/2011 | Romero et al. |
| 2012/0009339 | A1 | 1/2012 | Creehan et al. |
| 2012/0058359 | A1 | 3/2012 | Kingston et al. |
| 2012/0073732 | A1 | 3/2012 | Perlman |
| 2012/0114861 | A1 | 5/2012 | Cohen et al. |
| 2012/0273555 | A1 | 11/2012 | Flak et al. |
| 2012/0279441 | A1 | 11/2012 | Creehan et al. |
| 2012/0279442 | A1 | 11/2012 | Creehan et al. |
| 2013/0056912 | A1 | 3/2013 | O'Neill et al. |
| 2013/0068825 | A1 | 3/2013 | Rosal et al. |
| 2014/0130736 | A1 | 5/2014 | Schultz et al. |
| 2014/0134325 | A1 | 5/2014 | Schultz et al. |
| 2014/0138332 | A1 | 5/2014 | Loree |
| 2014/0165399 | A1 | 6/2014 | Seo et al. |
| 2014/0174344 | A1 | 6/2014 | Scuhltz et al. |
| 2014/0274726 | A1 | 9/2014 | Sugimoto et al. |
| 2015/0079306 | A1 | 3/2015 | Schoeneborn et al. |
| 2015/0165546 | A1 | 6/2015 | Kandasamy et al. |
| 2015/0274280 | A1 | 10/2015 | Sheahan, Jr. |
| 2015/0321289 | A1 | 11/2015 | Bruck et al. |
| 2016/0074958 | A1 | 3/2016 | Kandasamy et al. |
| 2016/0075059 | A1 | 3/2016 | Williams |
| 2016/0090848 | A1 | 3/2016 | Engeli et al. |

(56) References Cited

U.S. PATENT DOCUMENTS

| | | |
|---|---|---|
| 2016/0107262 A1 | 4/2016 | Schultz et al. |
| 2016/0169012 A1 | 6/2016 | Dacunha et al. |
| 2016/0175981 A1 | 6/2016 | Kandasamy et al. |
| 2016/0175982 A1 | 6/2016 | Kandasamy et al. |
| 2016/0258298 A1 | 9/2016 | Channel et al. |
| 2016/0363390 A1 | 12/2016 | Karlen et al. |
| 2017/0022615 A1 | 1/2017 | Arndt et al. |
| 2017/0043429 A1 | 2/2017 | Kandasamy et al. |
| 2017/0057204 A1 | 3/2017 | Kandasamy et al. |
| 2017/0080519 A1 | 3/2017 | Atin et al. |
| 2017/0150602 A1 | 5/2017 | Johnston et al. |
| 2017/0197274 A1 | 7/2017 | Steel et al. |
| 2017/0216962 A1 | 8/2017 | Schultz et al. |
| 2017/0284206 A1 | 10/2017 | Reberts et al. |
| 2017/0291221 A1 | 10/2017 | Swank et al. |
| 2017/0299120 A1 | 10/2017 | Stachulla et al. |
| 2017/0312850 A1 | 11/2017 | Werz et al. |
| 2018/0047645 A1 | 2/2018 | Varadarajan et al. |
| 2018/0085849 A1 | 3/2018 | Kandasamy et al. |
| 2018/0126636 A1 | 5/2018 | Jang |
| 2018/0257141 A1 | 9/2018 | Hofmann et al. |
| 2018/0296343 A1 | 10/2018 | Wei |
| 2018/0361501 A1 | 12/2018 | Hardwick et al. |
| 2019/0054534 A1 | 2/2019 | Norton et al. |
| 2019/0168304 A1 | 6/2019 | Krol et al. |
| 2019/0193194 A1 | 6/2019 | Grong et al. |
| 2019/0210152 A1 | 7/2019 | Konitzer |
| 2019/0217508 A1 | 7/2019 | McGinnis et al. |
| 2019/0299290 A1 | 10/2019 | Kuhns et al. |
| 2019/0388128 A1 | 12/2019 | Wilson et al. |
| 2020/0016687 A1 | 1/2020 | Whalen et al. |
| 2020/0047279 A1 | 2/2020 | Misak |
| 2020/0063242 A1 | 2/2020 | Angels |
| 2020/0101559 A1 | 4/2020 | Rose et al. |
| 2020/0180297 A1 | 6/2020 | Carter et al. |
| 2020/0189025 A1 | 6/2020 | Rodriguez |
| 2020/0198046 A1 | 6/2020 | Imaizumi et al. |
| 2020/0209107 A1 | 7/2020 | Ream et al. |
| 2020/0247058 A1 | 8/2020 | Flitsch et al. |
| 2020/0262001 A1 | 8/2020 | Uetani |
| 2020/0290127 A1 | 9/2020 | Berglund et al. |
| 2020/0306869 A1 | 10/2020 | Hardwick et al. |
| 2020/0332421 A1 | 10/2020 | Jahdie et al. |
| 2020/0338639 A1 | 10/2020 | Friesth |
| 2021/0008658 A1 | 1/2021 | Frank et al. |
| 2021/0048053 A1 | 2/2021 | Ahn |
| 2021/0053283 A1 | 2/2021 | Liu et al. |
| 2021/0069778 A1 | 3/2021 | Redding et al. |
| 2021/0078258 A1 | 3/2021 | Lalande et al. |
| 2021/0180165 A1 | 6/2021 | Pasebani et al. |
| 2021/0245293 A1 | 8/2021 | Hardwick et al. |
| 2021/0308937 A1 | 10/2021 | Broach et al. |
| 2021/0379664 A1 | 12/2021 | Gibson et al. |
| 2021/0387253 A1 | 12/2021 | Schweizer et al. |
| 2022/0016834 A1 | 1/2022 | West |
| 2022/0023821 A1 | 1/2022 | Aimone et al. |
| 2022/0049331 A1 | 2/2022 | Angels |
| 2022/0080522 A1 | 3/2022 | Cox et al. |
| 2022/0088681 A1 | 3/2022 | Chehab |
| 2022/0176451 A1 | 6/2022 | Schweizer et al. |
| 2022/0281005 A1 | 9/2022 | Kandasamy |
| 2022/0388091 A1 | 12/2022 | Norman et al. |
| 2022/0389543 A1 | 12/2022 | Chehab |
| 2023/0146110 A1 | 5/2023 | Allison et al. |
| 2023/0150052 A1 | 5/2023 | Haynes |
| 2023/0356322 A1 | 11/2023 | Haynie et al. |
| 2024/0100624 A1 | 3/2024 | Hardwick et al. |
| 2024/0109245 A1 | 4/2024 | Lalande et al. |
| 2024/0149373 A1 | 5/2024 | Munn et al. |
| 2024/0326155 A1 | 10/2024 | Song |
| 2024/0326156 A1 | 10/2024 | Song et al. |
| 2024/0328373 A1 | 10/2024 | Song et al. |
| 2024/0328374 A1 | 10/2024 | Song et al. |
| 2025/0187104 A1* | 6/2025 | Song .................. B23K 20/1225 |
| 2025/0187105 A1* | 6/2025 | Song ..................... B33Y 40/00 |
| 2025/0187106 A1* | 6/2025 | Song .................. B23K 20/1215 |
| 2025/0187107 A1* | 6/2025 | Song ..................... B23K 20/22 |
| 2025/0187108 A1* | 6/2025 | Song ..................... B23K 20/22 |

FOREIGN PATENT DOCUMENTS

| | | | | |
|---|---|---|---|---|
| AU | 2018359514 A1 | 5/2019 | | |
| AU | 2019234726 A1 | 9/2019 | | |
| AU | 2019290657 A1 | 12/2019 | | |
| AU | 2019338384 A1 | 3/2020 | | |
| AU | 2019383418 A1 | 5/2020 | | |
| AU | 2018359514 C1 | 5/2021 | | |
| CA | 2569350 A1 | 5/2007 | | |
| CA | 2569773 C | 4/2013 | | |
| CA | 3081330 A1 | 10/2018 | | |
| CA | 3093812 A1 | 3/2019 | | |
| CA | 3104289 A1 | 6/2019 | | |
| CA | 3112446 A1 | 9/2019 | | |
| CA | 3120796 A1 | 11/2019 | | |
| CN | 101629290 A | 1/2010 | | |
| CN | 101537538 B | 1/2011 | | |
| CN | 102069172 A | 5/2011 | | |
| CN | 101406987 B | 3/2012 | | |
| CN | 203843367 U | 9/2014 | | |
| CN | 109202271 A | 1/2015 | | |
| CN | 104439686 A | 3/2015 | | |
| CN | 103639668 B | 12/2015 | | |
| CN | 105290608 A | 2/2016 | | |
| CN | 105750725 A | 7/2016 | | |
| CN | 103978304 B | 9/2016 | | |
| CN | 105965152 A | 9/2016 | | |
| CN | 106001905 A | 10/2016 | | |
| CN | 106735851 A | 5/2017 | | |
| CN | 107030371 A | 8/2017 | | |
| CN | 206366652 U | 8/2017 | | |
| CN | 107160030 A | 9/2017 | | |
| CN | 107160109 A | 9/2017 | | |
| CN | 107498175 A | 12/2017 | | |
| CN | 206925453 U | 1/2018 | | |
| CN | 107813044 A | 3/2018 | | |
| CN | 107841744 A | 3/2018 | | |
| CN | 108372359 A | 8/2018 | | |
| CN | 108385101 A | 8/2018 | | |
| CN | 108838509 A | 11/2018 | | |
| CN | 109202273 A | 1/2019 | | |
| CN | 109261940 A | 1/2019 | | |
| CN | 107584122 B | 2/2019 | | |
| CN | 107116366 B | 3/2019 | | |
| CN | 109940524 A | 6/2019 | | |
| CN | 110042385 A | 7/2019 | | |
| CN | 209272731 U | 8/2019 | | |
| CN | 110653618 A | 1/2020 | | |
| CN | 107900510 B | 2/2020 | | |
| CN | 110802317 A | * | 2/2020 | ......... B23K 20/1245 |
| CN | 110834179 A | 2/2020 | | |
| CN | 111331246 A | 2/2020 | | |
| CN | 110933791 A | 3/2020 | | |
| CN | 111069762 A | * | 4/2020 | ............ B23K 20/26 |
| CN | 109878084 B | 6/2020 | | |
| CN | 108971742 B | 7/2020 | | |
| CN | 109202273 B | 9/2020 | | |
| CN | 111655403 A | 9/2020 | | |
| CN | 211464825 U | 9/2020 | | |
| CN | 109202275 B | 10/2020 | | |
| CN | 111761198 A | 10/2020 | | |
| CN | 108603504 B | 11/2020 | | |
| CN | 109940163 B | 12/2020 | | |
| CN | 112108756 A | 12/2020 | | |
| CN | 108930034 B | 1/2021 | | |
| CN | 112207414 A | 1/2021 | | |
| CN | 109202272 B | 2/2021 | | |
| CN | 109570934 B | 2/2021 | | |
| CN | 112355463 A | 2/2021 | | |
| CN | 112404453 A | 2/2021 | | |
| CN | 109967860 B | 3/2021 | | |
| CN | 112496522 A | 3/2021 | | |
| CN | 110640294 B | 4/2021 | | |
| CN | 112658460 A | 4/2021 | | |
| CN | 109570933 B | 5/2021 | | |

(56)  References Cited

FOREIGN PATENT DOCUMENTS

| | | | | |
|---|---|---|---|---|
| CN | 112770884 A | 5/2021 | | |
| CN | 112828441 A | 5/2021 | | |
| CN | 110102871 B | 6/2021 | | |
| CN | 112958902 A | 6/2021 | | |
| CN | 112976567 A | * 6/2021 | ............ | B33Y 30/00 |
| CN | 113001007 A | 6/2021 | | |
| CN | 113020625 A | 6/2021 | | |
| CN | 113118612 A | * 7/2021 | ............ | B33Y 30/00 |
| CN | 113172331 A | 7/2021 | | |
| CN | 111531266 B | 8/2021 | | |
| CN | 113369671 A | * 9/2021 | ............ | B23K 20/122 |
| CN | 214212574 U | 9/2021 | | |
| CN | 111230282 B | 10/2021 | | |
| CN | 113523534 A | 10/2021 | | |
| CN | 113695573 A | 11/2021 | | |
| CN | 113695593 A | 11/2021 | | |
| CN | 113828907 A | 12/2021 | | |
| CN | 113857643 A | 12/2021 | | |
| CN | 214977765 U | 12/2021 | | |
| CN | 111055007 B | 1/2022 | | |
| CN | 215468782 U | 1/2022 | | |
| CN | 114131176 A | 3/2022 | | |
| CN | 217096135 U | 3/2022 | | |
| CN | 113172331 B | 4/2022 | | |
| CN | 114393292 A | 4/2022 | | |
| CN | 111575698 B | 5/2022 | | |
| CN | 111575699 B | 5/2022 | | |
| CN | 113146021 B | 6/2022 | | |
| CN | 114669858 A | 6/2022 | | |
| CN | 216780643 U | 6/2022 | | |
| CN | 111872543 B | 7/2022 | | |
| CN | 112025074 B | 7/2022 | | |
| CN | 113118612 B | 7/2022 | | |
| CN | 113351984 B | 7/2022 | | |
| CN | 114770784 A | 7/2022 | | |
| CN | 114799201 A | 7/2022 | | |
| CN | 114799480 A | * 7/2022 | ............ | B33Y 30/00 |
| CN | 112407338 B | 8/2022 | | |
| CN | 113001005 B | 8/2022 | | |
| CN | 114833439 A | 8/2022 | | |
| CN | 114951954 A | 8/2022 | | |
| CN | 115055699 A | 9/2022 | | |
| CN | 115091022 A | 9/2022 | | |
| CN | 115156523 A | 10/2022 | | |
| CN | 115178855 A | 10/2022 | | |
| CN | 115351514 A | 11/2022 | | |
| CN | 217729675 U | 11/2022 | | |
| CN | 115502543 A | 12/2022 | | |
| CN | 115555583 A | * 1/2023 | ............ | B22F 12/00 |
| CN | 115555700 A | 1/2023 | | |
| CN | 115673528 A | 2/2023 | | |
| CN | 115091025 B | 3/2023 | | |
| CN | 115740727 A | 3/2023 | | |
| CN | 218694877 U | 3/2023 | | |
| CN | 113927151 B | 4/2023 | | |
| CN | 114769922 B | 4/2023 | | |
| CN | 218799795 U | 4/2023 | | |
| CN | 218799797 U | 4/2023 | | |
| CN | 218799801 U | 4/2023 | | |
| CN | 116038093 A | 5/2023 | | |
| CN | 116140783 A | 5/2023 | | |
| CN | 116160108 A | 5/2023 | | |
| CN | 115106641 B | 6/2023 | | |
| CN | 115740726 B | 6/2023 | | |
| CN | 116423033 A | 7/2023 | | |
| CN | 116475558 A | 7/2023 | | |
| CN | 219336363 U | 7/2023 | | |
| CN | 219336364 U | 7/2023 | | |
| CN | 219379326 U | 7/2023 | | |
| CN | 116511543 A | 8/2023 | | |
| CN | 116533519 A | * 8/2023 | ............ | B29C 64/314 |
| CN | 116571769 A | 8/2023 | | |
| CN | 116618816 A | 8/2023 | | |
| CN | 115673526 B | 9/2023 | | |
| CN | 116871656 A | * 10/2023 | ............ | B23K 20/122 |
| CN | 116900465 A | 10/2023 | | |
| CN | 116900467 A | 10/2023 | | |
| CN | 116921840 A | 10/2023 | | |
| CN | 116926531 A | 10/2023 | | |
| CN | 116944661 A | * 10/2023 | ......... | B23K 20/1215 |
| CN | 117047256 A | * 11/2023 | ......... | B23K 20/1215 |
| CN | 220050404 U | 11/2023 | | |
| CN | 117340415 A | 1/2024 | | |
| CN | 117428313 A | 1/2024 | | |
| CN | 220591878 U | 3/2024 | | |
| CN | 117817098 A | 4/2024 | | |
| CN | 117943678 A | 4/2024 | | |
| DE | 19948441 A1 | 4/2001 | | |
| DE | 202015002830 U1 | 4/2015 | | |
| DE | 102014115535 B3 | 3/2016 | | |
| DE | 102015216802 A1 | 3/2017 | | |
| DE | 102016113289 A1 | 1/2018 | | |
| DE | 102019106873 A1 | 9/2020 | | |
| DE | 102019007902 A1 | 5/2021 | | |
| EP | 1206995 A2 | 5/2002 | | |
| EP | 1413384 A2 | 4/2004 | | |
| EP | 3251768 A1 | 12/2017 | | |
| EP | 3703888 A1 | 10/2018 | | |
| EP | 4129552 A1 | 2/2023 | | |
| FR | 3135002 A1 | 11/2023 | | |
| FR | 3139018 A1 | 3/2024 | | |
| GB | 2306366 A | 5/1997 | | |
| GB | 2576260 B | 2/2020 | | |
| GB | 2614889 A | * 7/2023 | .......... | B23K 20/128 |
| IN | 2023/31035542 A | 9/2023 | | |
| JP | H 1147960 A | 2/1999 | | |
| JP | H 11156561 A | 6/1999 | | |
| JP | 2000094159 A | 4/2000 | | |
| JP | 20000334577 A | 12/2000 | | |
| JP | 2003-322135 A | 11/2003 | | |
| JP | 2004025296 A | * 1/2004 | .......... | B23K 20/128 |
| JP | 3563003 B2 | 9/2004 | | |
| JP | 2004261859 A | 9/2004 | | |
| JP | 2004-311640 A | 11/2004 | | |
| JP | 2005-171299 A | 6/2005 | | |
| JP | 2007-061875 A | 3/2007 | | |
| JP | 2009006396 A | 1/2009 | | |
| JP | 2009-090295 A | 4/2009 | | |
| JP | 4299266 B2 | 7/2009 | | |
| JP | 2010-194557 A | 9/2010 | | |
| JP | 5071144 B2 | 11/2012 | | |
| JP | 5573973 B2 | 1/2013 | | |
| JP | 6046954 B2 | 2/2013 | | |
| JP | 2013166159 A | 8/2013 | | |
| JP | 5326757 B2 | 10/2013 | | |
| JP | 5864446 B2 | 2/2016 | | |
| JP | 6201882 B2 | 9/2017 | | |
| JP | 6365752 B2 | 8/2018 | | |
| JP | 2020032429 A | 3/2020 | | |
| JP | 2020059039 A | 4/2020 | | |
| JP | 6909034 B2 | 7/2021 | | |
| JP | 2022-503795 A | 1/2022 | | |
| JP | 7148491 B2 | 10/2022 | | |
| KR | 10-0354387 B1 | 12/2002 | | |
| KR | 10-0772131 B1 | 11/2007 | | |
| KR | 20100113400 A | 10/2010 | | |
| KR | 20110003572 A | 1/2011 | | |
| KR | 20110019270 A | 2/2011 | | |
| KR | 20110088266 A | 8/2011 | | |
| KR | 10-1194097 B1 | 10/2012 | | |
| KR | 10-1230359 B1 | 2/2013 | | |
| KR | 20160128939 A | 11/2016 | | |
| KR | 101704354 B1 | * 2/2017 | ............ | B33Y 30/00 |
| KR | 20180044625 A | 5/2018 | | |
| KR | 2021113973 | 9/2019 | | |
| KR | 20210049085 A | 9/2019 | | |
| KR | 10-2101364 B1 | 4/2020 | | |
| KR | 20200087172 A | 7/2020 | | |
| KR | 20210010980 A | 1/2021 | | |
| KR | 10-2273514 B1 | 6/2021 | | |
| KR | 20210130704 A | 10/2021 | | |
| KR | 20230069412 A | 5/2023 | | |
| KR | 20230134143 A | 9/2023 | | |
| KR | 10-2595360 B1 | 10/2023 | | |

(56) References Cited

FOREIGN PATENT DOCUMENTS

| TW | I688451 B | 3/2020 | |
|---|---|---|---|
| WO | WO 1998/051441 A1 | 11/1998 | |
| WO | WO 2000/020146 A1 | 4/2000 | |
| WO | WO 2009/127981 A2 | 10/2009 | |
| WO | WO 2009/142070 A1 | 11/2009 | |
| WO | WO 2011/017752 A1 | 2/2011 | |
| WO | WO 2012/065616 A1 | 5/2012 | |
| WO | WO 2012/141442 A2 | 10/2012 | |
| WO | WO 2013/076884 A1 | 5/2013 | |
| WO | WO 2014/057948 A1 | 4/2014 | |
| WO | WO 2014/178731 A2 | 11/2014 | |
| WO | WO 2015/060007 A1 | 4/2015 | |
| WO | WO 2015/198910 A1 | 12/2015 | |
| WO | WO 2016/072211 A1 | 5/2016 | |
| WO | WO 2016/106179 A1 | 6/2016 | |
| WO | WO 2016/111279 A1 | 7/2016 | |
| WO | WO 2017/075396 A1 | 5/2017 | |
| WO | WO 2019/099928 A2 | 5/2019 | |
| WO | WO-2019089764 A1 * | 5/2019 | ............. B22F 12/50 |
| WO | WO 2019/115968 A1 | 6/2019 | |
| WO | WO 2019/172300 A1 | 9/2019 | |
| WO | WO 2019/178138 A2 | 9/2019 | |
| WO | WO 2019/178138 A3 | 9/2019 | |
| WO | WO 2019/198290 A1 | 10/2019 | |
| WO | WO 2019/246251 A9 | 12/2019 | |
| WO | WO 2020/015228 A1 | 1/2020 | |
| WO | WO 2020/055989 A1 | 3/2020 | |
| WO | WO 2020/106952 A1 | 5/2020 | |
| WO | WO 2020/201299 A1 | 10/2020 | |
| WO | WO 2021/030693 A2 | 2/2021 | |
| WO | WO 2021/054894 A1 | 3/2021 | |
| WO | WO 2021/067978 A1 | 4/2021 | |
| WO | WO 2021/165545 A1 | 8/2021 | |
| WO | WO 2022/032061 A1 | 2/2022 | |
| WO | WO 2022/159278 A1 | 7/2022 | |
| WO | WO 2022/231423 A1 | 11/2022 | |
| WO | WO 2023/006180 A1 | 2/2023 | |
| WO | WO 2023/087631 A1 | 5/2023 | |
| WO | WO 2023/099872 A1 | 6/2023 | |
| WO | WO 2024/078248 A1 | 4/2024 | |
| WO | WO-2025073141 A1 * | 4/2025 | ............. B23K 20/26 |

OTHER PUBLICATIONS

Grätzel, M., "Advances in friction stir welding by separate control of shoulder and probe", Welding in the World (2021) 54:1931-1941.

Ohashi, T. et al., "Fastenerless-Riveting Utilizing Friction Stir Forming for Dissimilar Materials Joining", Key Engineering Materials, Aug. 2017, ISSN: 1662-9795, vol. 751, pp. 186-191, doi: 10.4028/www.scientific.net/KEM.751.186.

Miedzinski Mattias, "Materials for Additive Manufacturing by Direct Energy Deposition", Chalmers University of Technology Master's Thesis in Materials Engineering, 2017, http://publications.lib.chalmers.se/records/fulltext/253822/253822.pdf.

Mahmood. M, et al. "Metal Matrix Composites Synthesized by Laser-Melting Deposition: A Review", MDPI.com/journal/materials—Materials, 2020, vol. 13, 02593. https://www.mdpi.com/1996-1944/13/11/2593.

Davis, "Theoretical Analysis of Transpiration Cooling of a Liquid Rocket Thrust Chamber Wall", 2006, Theses—Embry-Riddle Aeronautical University, Daytona Beach, Florida, 103 pages.

Luo et al. Effects of Coolants of Double Layer Transpiration Cooling System in the Leading Edge of a Hypersonic Vehicle, Frontiers in Energy Research www.frontiersin.org, Sep. 9, 2021, vol. 9, Article 756820, https://www.frontiersin.org/articles/10.3389/fenrg.2021.756820/full.

Ohashi, T. et al., "Pseudo linear joining for dissimilar materials utilizing punching and Friction Stir Forming", Procedia Manufacturing, 2020, vol. 50, pp. 98-103.

Bobbin Tool Friction Stir Welding Developed, TWI-Global.com, 3 pages, date accessed Nov. 5, 2024.

Stationary Shoulder Friction Stir Welding, TWI-Global.com, 2 pages, date accessed Nov. 5, 2024.

Cold Spray Additive Manufactured Combustion Chamber, Impact Innovations GmbH, https://impact-innovations.com/en/applications/combustion-chamber/, 4 pages, Jun. 24, 2023.

Russell et al. "Performance Improvement of Friction Stir Welds by Better Surface Finish", George C. Marshall Space Flight Center Research and Technology Report 2014, 2 Pages, Jan. 1, 2015.

Wagner, J et al. "Method for Fabricating Metallic Panels with Deep Stiffener Sections" https://www.techbriefs.com/component/content/article/23860-lar-17976-1, Feb. 1, 2016, 5 pages.

Carter, RW et al. "Robotic Manufacturing of 18 ft. (5.5mm) Diameter Cryogenic Fuel Tank Dome Assemblies for the NASA I Rocket", TWI 9th International Symposium on Friction Stir Welding 2012, May 15, 2012, 25 pages.

Zhao et al. "Interfacial Bonding Features of Friction Stir Additive Manufactured Build for 2195-T8 Aluminum-Lithium Alloy" Journal of Manufacturing Processes 38, Jan. 2019, 15 pages.

Li et al, "Cold Spray+ as New Hybrid Additive Manufacturing Technology: A Literature Review" Science and Technology of Welding and Joining, 24(5), Apr. 15, 2019, pp. 420-445.

Khodabakhshi et al., "Surface Modification of a Cold Gas Dynamic Spray-deposited Titanium Coating on Aluminum Alloy by Using Friction-Stir Processing" Journal of Thermal Spray Technology, vol. 28, Aug. 2019, pp. 1185-1198.

Wang et al. "High Performance Bulk Pure Al Prepared Through Cold Spray-friction Stir Processing Compositive Additive Manufacturing" Journal of Materials Research and Technology, 9(4), Jun. 2020, pp. 9073-9079.

Hassan et al. "A Comprehensive Review of Friction Stir Additive Manufacturing (FSAM) of Non-Ferrous Alloys" Materials 16(7): 2723, Mar. 2023, 31 pages.

Zhao et al. "Influence of Tool Shape and Process on Formation and Defects of Friction Stir Additive Manufactured Build" Journal of Materials Engineering, vol. 47 Issue 9, Sep. 2019, pp. 84-92.

Saju, T. P. et al., "Joining dissimilar grade aluminum alloy sheets using multi-hole dieless friction stir riveting process", The International Journal of Advanced Manufacturing Technology, 2021, 112: 285-302.

Rezaeinajad, SS et al., "Solid-State Additive Manufacturing of AA6060 Employing Friction Screw Extrusion", JOM 75: 4199-4211, Aug. 17, 2023, 13 pages.

* cited by examiner

- A: Motor and Gearbox
- B: 3-axis mill (anvil)
- C: Spindle
- D: LC Tool Holder
- E: Upper Shroud
- F: Tool (Screw)
- G: Nose Cone
- H: Wire Feed Mechanism 1. Wire Straightener
2. Mounting Bracket
3. Fuse
4. 14-Pin Connector
5. Lead (67)
6. Idle Roll Arm
7. Guide Tubes
8. Drive Rolls
9. Tension Indicator 106b

104

Vertical Groove Height 10-20% of wire Diameter

Grooves or other feature on the rotating spindle surface. Knurled features can also be implemented.

Thread Angle

Major Diameter

Minor Diameter

Pitch Diameter

Pitch

Gap Between the Threaded Rod and Housing d1 = 0.4 to 0.8 x Wire Diamerter

G1

112

Thread Pitch =0.25 to 0.75 x Wire Diameter

108

104

200

Deposited Material

100A

100A

Deposited Material

308B

310

312

319    316    317

112

308B

319

G1

308B

310

310

308B 310   318

310

310

316

308

310

Converging Cone to
Promote Material Compression

Close Die to Guide Material
Flow and Print Profile

308

Close Die to Guide Material
Flow and Print Profile

Open Die to Allow Flexible
Print Tool Path

308

Converging Cone to
Promote Material Compression

308

Printed Material
with Clean Edges

Printed Material
with Clean Edges

740

742

744

748

745

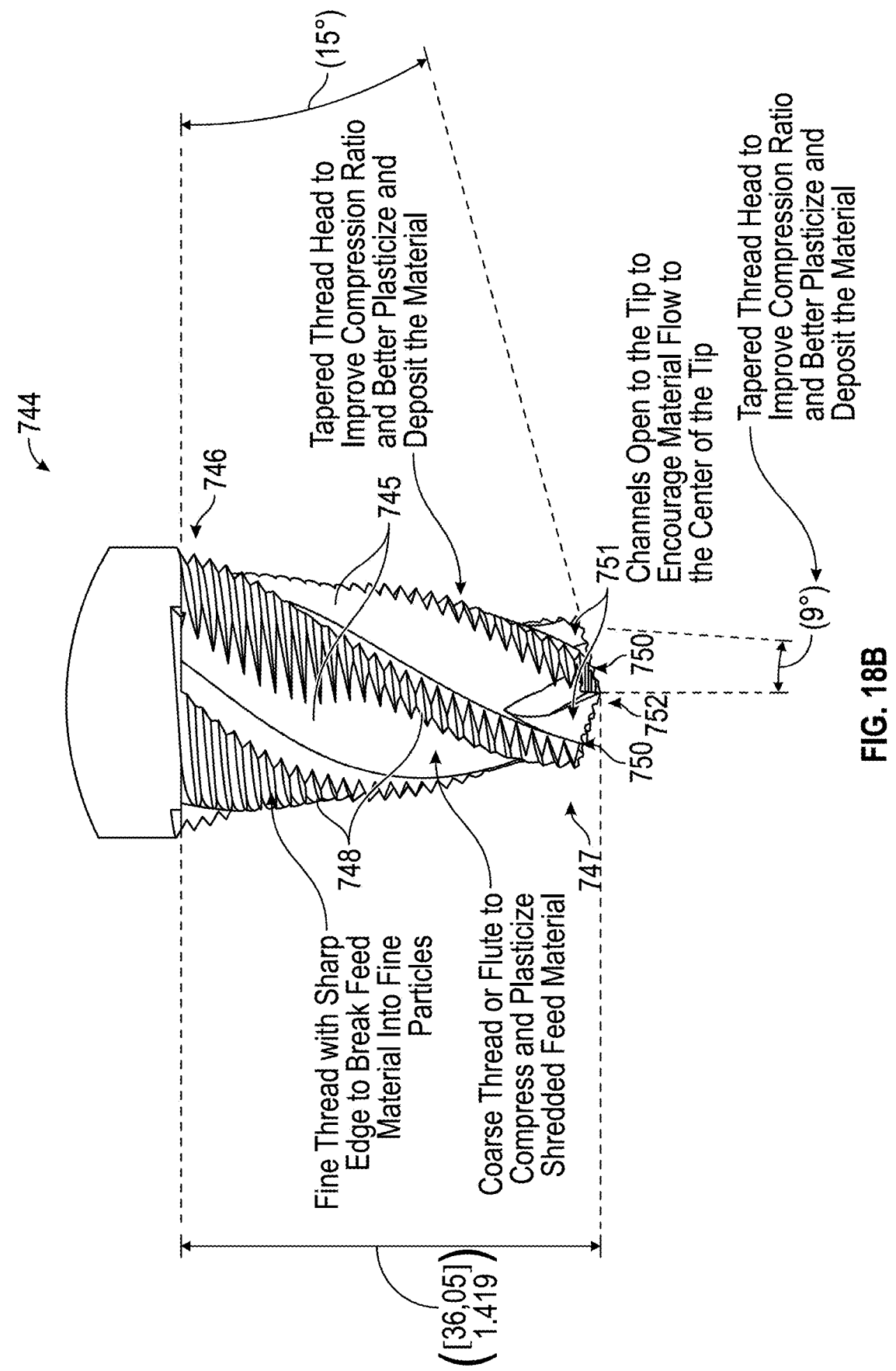

744

746

(15°)

Tapered Thread Head to Improve Compression Ratio and Better Plasticize and Deposit the Material

745

751
Channels Open to the Tip to Encourage Material Flow to the Center of the Tip

750

752

750

(9°)

Tapered Thread Head to Improve Compression Ratio and Better Plasticize and Deposit the Material

748

Fine Thread with Sharp Edge to Break Feed Material Into Fine Particles

Coarse Thread or Flute to Compress and Plasticize Shredded Feed Material

Panels and Stringers Aligned in Tools

Lower Surface of
the Flat Panel

504

Tip of the Screw is Slightly
Below the Lower Surface of
the Flat Panel

Relative Position of the Screw and
the Panels and Stringer

Finished Weld

504

Free Forming

Welding

Joining

Local Pad-Up

1

WIRE-FEED FRICTION STIR ADDITIVE MANUFACTURING SYSTEMS, DEVICES, AND METHODS

CROSS-REFERENCE TO RELATED APPLICATIONS

This application claims the benefit of U.S. Provisional Patent Application No. 63/608,991, filed on Dec. 12, 2023, entitled WIRE FEED SOLID STATE FRICTION STIR ADDITIVE DEPOSITION, and U.S. Provisional Patent Application No. 63/611,054, filed on Dec. 15, 2023, entitled WIRE-FEED FRICTION STIR ADDITIVE MANUFAC-TURING SYSTEMS AND METHODS, each of which is hereby incorporated by reference in its entirety.

BACKGROUND

Field

The technology relates generally to additive friction stir deposition (AFSD) and friction stir additive manufacturing (FSAM) systems and processes. In some embodiments, the systems are wire-feed systems that feed wires through a non-rotating shoulder and into a space between an inner wall of the non-rotating shoulder and a rotating pin positioned within a channel extending through a length of the non-rotating shoulder. In other embodiments, the systems can be pellet fed, powder fed, or bar fed. In some embodiments, the systems have nosecones with slots configured to receive material as the system is used to join adjacent work-pieces and a stiffener.

Description of the Related Art

FSAM systems are typically powder or bar fed systems. Material is received in a receiving end of a channel of a rotating shoulder. The material is softened within the chan-nel as it travels to a deposition end. The material then exits the deposition end in a softened state.

SUMMARY

The embodiments disclosed herein each have several aspects no single one of which is solely responsible for the present disclosure's desirable attributes. Without limiting the scope of the present disclosure, its more prominent features will now be briefly discussed. After considering this discussion, and particularly after reading the section entitled "Detailed Description" one will understand how the features of the embodiments described herein provide advantages over existing additive manufacturing systems.

In one aspect, a friction stir additive manufacturing sys-tem includes a spindle, a housing, and a feeding system. The spindle is configured to rotate about a central axis. The housing is configured to receive at least a portion of the spindle. The housing is configured to remain stationary relative to the spindle. The housing includes a wire inlet extending between an exterior surface of the housing and an interior surface of the housing and a track extending from the wire inlet and partially around a circumference of an interior surface of the housing. The feeding system is configured to receive a wire from a roller and feed the wire through the wire inlet and into the track of the housing.

In some embodiments, the system includes a gap between the interior surface of the housing and an exterior surface of the spindle. In some embodiments, the track comprises a depth that is less than a diameter of the wire fed by the feeding system and when the wire is fed through the wire inlet, the wire extends out of the track and protrudes into the gap. In some embodiments, an outer surface of the spindle comprises threads or vertical ridges. In some embodiments, a longitudinal axis of the wire inlet is perpendicular to the central axis of the spindle. In some embodiments, a longi-tudinal axis of the wire inlet does not intersect the central axis of the spindle. In some embodiments, the wire inlet is offset from the central axis of the central axis of the spindle.

In another aspect, a friction stir additive manufacturing system includes a spindle, a housing, and a feeding system. The spindle is configured to rotate about a central axis. The housing is configured to receive at least a portion of the spindle. The housing is configured to remain stationary relative to the spindle. The housing includes a wire inlet extending through a side wall of the housing and offset from the central axis of the spindle, and a track extending from the wire inlet and formed in an interior surface of the housing. The feeding system is configured to feed a wire through the wire inlet and into the track of the housing.

In some embodiments, the track has a tear drop shape. In some embodiments, a longitudinal axis of the wire inlet does not intersect the central axis of the spindle. In some embodi-ments, the system includes a gap between the interior surface of the housing and an exterior surface of the spindle. In some embodiments, the track includes a depth that is less than a diameter of the wire fed by the feeding system and when the wire is fed through the wire inlet the wire extends out of the track and protrudes into the gap. In some embodi-ments, the track extends partially around a circumference of the interior surface of the housing. In some embodiments, the track extends around an entire circumference of the interior surface of the housing. In some embodiments, the track extends in multiple rotations around a circumference of the interior surface of the housing. In some embodiments, an outer surface of the spindle comprises threads or vertical ridges.

In another aspect, a method includes feeding a wire through a wire inlet extending through a sidewall of a housing of a friction stir additive manufacturing device and into a track formed in an interior surface of the housing. The method also includes rotating a spindle positioned within the housing about a central axis to soften the wire as it is fed into a gap between the interior surface of the housing and an exterior surface of the spindle. The method also includes depositing softened material on to a substrate as it exits a deposition end of the housing.

In some embodiments, the method includes advancing the friction stir additive manufacturing device across the sub-strate as the softened material is deposited. In some embodi-ments, the method includes feeding the wire through the wire inlet further comprises feeding the wire through a roller configured to guide the wire into a wire sleeve aligned with the wire inlet. In some embodiments, when the wire is fed into the track, the wire extends out of the track and protrudes into the gap.

In another aspect, a friction stir additive manufacturing system configured to extrude a material includes a spindle, a housing, and a feeding system. The spindle is configured to rotate about a central axis. The spindle includes a conical portion having a plurality of threads at a deposition end of the spindle. The housing is configured to remain stationary relative to the spindle. The housing includes a wire inlet extending through a side wall of the housing. An interior surface of the side wall defining a truncated cone terminat-ing at a material exit. The truncated cone is configured to receive the conical portion of the spindle. The feeding system is configured to feed a wire through the wire inlet and into a gap between the spindle and the truncated cone of the housing.

In some embodiments, the conical portion of the spindle includes a plurality of notches including cutting edges. The plurality of notches is circumferentially spaced about the conical portion of the spindle. In some embodiments, the plurality of notches each include a smooth surface. In some embodiments, sets of the plurality of threads are positioned between adjacent notches. In some embodiments, sets of the plurality of threads are positioned adjacent at least three edges of each notch. In some embodiments, the conical portion comprises a twisting helical shape. In some embodiments, the conical portion includes a plurality of indentations defining a spiral pattern, each indentation defined on a first side by an abrupt edge and on a second side by a curved edge. In some embodiments, sets of the plurality of threads are positioned on the abrupt edges. In some embodiments, the spindle is configured to move along the central axis between a flush position, a retracted position, and a protruding position during use. In some embodiments, when the spindle is in the flush position, a tip of the spindle is substantially coplanar with the material exit of the truncated cone. In some embodiments, when the spindle is in the retracked position, a tip of the spindle is retracted within the truncated cone. In some embodiments, when the spindle is in the protruding position, a tip of the spindle protrudes through the truncated cone and through the material exit. In some embodiments, the housing includes a deposition surface surrounding the material exit. The deposition surface is configured to contact one or more work surfaces as material is extruded from the material exit. In some embodiments, the deposition surface is configured to contact a surface of a single work-piece. In some embodiments, the deposition surface is configured to contact a previously deposited layer of material when depositing an additional layer of material. In some embodiments, the deposition surface is configured to contact surfaces of two adjacent work-pieces. In some embodiments, the housing comprises one or more cooling channels.

In another aspect, a method includes feeding a wire through a wire inlet extending through a side wall of a housing of a friction stir additive manufacturing device, the side wall defining a truncated cone terminating at a material exit. The method also includes rotating a spindle positioned within the housing about a central axis, the spindle including a conical portion having a plurality of threads. The method also includes feeding the wire into a gap between an interior surface of the housing and an exterior surface of the spindle. The method also includes cutting the wire with the plurality of threads. The method also includes softening the wire. The method also includes depositing softened material on to a substrate as it exits the material exit.

In some embodiments, the method includes advancing the friction stir additive manufacturing device across the substrate as the softened material is deposited. In some embodiments, the method includes moving a tip of the spindle from a first position within the housing to a second position where the tip extends out of the housing. In some embodiments, feeding the wire through the wire inlet includes feeding the wire through a roller configured to guide the wire into a wire sleeve aligned with the wire inlet and preheating the wire when passing through the wire sleeve.

In another aspect, a system includes a friction stir additive manufacturing device and a control system. The friction stir additive manufacturing device includes a spindle, a housing, and a feeding system. The spindle is configured to rotate about a central axis and move along the central axis from a first position to a second position. The housing is configured to receive at least a portion of the spindle. The housing is configured to remain stationary relative to the spindle. The housing includes a wire inlet extending through a side wall of the housing. The feeding system is configured to feed a wire through the wire inlet and into a gap between the spindle and the housing. The control system is configured to move the friction stir additive manufacturing device during use.

In some embodiments, the control system includes a robotic arm configured to move the friction stir additive manufacturing device during use. In some embodiments, the control system includes a gantry-based based platform configured to move the friction stir additive manufacturing device during use. In some embodiments, the friction stir additive manufacturing device is configured to deposit material in a direction opposite a direction of gravity. In some embodiments, the friction stir additive manufacturing device includes one or more thermocouples configured to collect temperature data for a closed loop control of printing parameters. In some embodiments, system includes a tooling system configured to move a part or structure being formed by the friction stir additive manufacturing device during use.

In another aspect a friction stir additive welding device configured to join a first work-piece and second work-piece includes a nosecone, a screw, and a slot. The nosecone includes a channel extending along a central axis of the nosecone to a first end of the nosecone and a curved recess extending from a perimeter of the channel. The screw is configured to rotate within the channel. The slot includes a passageway between a slot entrance in an outer sidewall of the nosecone and a slot exit in the channel of the nosecone. The slot is configured to receive a portion of a structure positioned between the first work-piece and the second work-piece at the slot entrance and through the slot exit toward the screw as the nosecone advances across a top surface of the first work-piece and a top surface of the second work-piece.

In some embodiments, the structure is a stiffener. In some embodiments, the first end of the nosecone includes a first surface angled relative to the first work-piece and the second work-piece when the central axis of the nosecone is oriented perpendicular to surfaces of the first work-piece and the second work-piece. In some embodiments, the first end of the nosecone includes a second surface parallel to the first work-piece and the second work-piece when the central axis of the nosecone is oriented perpendicular to surfaces of the first work-piece and the second work-piece. In some embodiments, a portion of the curved recess is formed in the second surface. In some embodiments, wherein a portion of the curved recess is formed in the first surface. In some embodiments, the slot includes a width that decreases as the slot extends between the slot entrance in the outer sidewall of the nosecone and the slot exit in the channel of the nosecone. In some embodiments, the slot includes a first portion and a second portion. The first portion having a narrowing width and the second portion having a constant width. In some embodiments, the slot is configured to reduce motion of the nosecone perpendicular to a direction the nosecone advances along a weld line between the first work-piece and the second work-piece. In some embodiments, the screw includes a plurality of threads that are configured to break apart and plasticize the portion of the structure as the nosecone is advanced along a weld line between the first work-piece and the second work-piece.

In another aspect, a friction stir additive welding device configured to join a first work-piece and second work-piece includes a nosecone, a channel, and a slot. The channel extends along a central axis of the nosecone. The channel is configured to receive a rotating screw. The slot includes a first opening in an outer sidewall of the nosecone, a second opening in a wall of the channel of the nosecone, and a passageway through the nosecone between the first opening and the second opening. The slot is configured to receive a portion of a structure positioned between the first work-piece and the second work-piece.

In some embodiments, a first end of the nosecone includes a surface angled relative to the first work-piece and the second work-piece when the central axis of the channel is oriented perpendicular to surfaces of the first work-piece and the second work-piece. In some embodiments, a width of the passageway decreases between the first opening and the second opening. In some embodiments, the passageway includes a first portion and a second portion. The first portion having a narrowing width and the second portion having a constant width. In some embodiments, a first end of the nosecone includes a curved recess configured to shape an outer profile of a weld line as the nosecone is advanced along the weld line between the first work-piece and the second work-piece. In some embodiments, the slot is configured to reduce motion of the nosecone perpendicular to a direction the nosecone advances as the nosecone is advanced along a weld line between the first work-piece and the second work-piece. In some embodiments, the device includes the rotating screw. The rotating screw includes a plurality of threads that are configured to break apart and plasticize the portion of the structure as the nosecone is advanced along a weld line between the first work-piece and the second work-piece.

In another aspect, a method of joining two parts and a stiffener includes advancing a nosecone of a friction stir additive welding device along a weld line between a first work-piece and a second work-piece. The method also includes receiving in a slot of the nosecone a portion of a structure positioned between the first work-piece and the second work-piece. The method also includes rotating a screw positioned within a channel of the nosecone while advancing the friction stir additive welding device along the weld line, the rotation of the screw plasticizing the portion of the structure positioned between the first work-piece and the second work-piece. The method also includes joining the first work-piece, the second work-piece, and the stiffener together.

In some embodiments, the rotation of the screw plasticizes portions of the first work-piece and the second work-piece. In some embodiments, the method includes advancing a tip of the screw to a position past first surfaces of the first work-piece and second work-piece and second surfaces of the first work-piece and the second work-piece, the second surfaces opposite the first surfaces. In some embodiments, the method also includes, as the nosecone is advanced along the weld line between the first work-piece and the second work-piece, shaping the weld line using a curved recess in a first end of the nosecone. In some embodiments, rotating the screw includes breaking apart the portion of the stiffener using threads of the screw. In some embodiments, the slot includes a width that decreases as the slot extends from an outer sidewall of the nosecone to the channel, and the method also includes reducing motion of the nosecone perpendicular to a direction the nosecone advances as the portion of the stiffener passes through the decreased width portion of the slot. In some embodiments, the method also includes feeding material through a sidewall of the nosecone as the nosecone is advanced along the weld line between the first work-piece and the second work-piece.

In another aspect, a friction stir additive welding device configured to join a first work-piece and second work-piece includes a nosecone and a screw. The nosecone includes a sidewall and a channel. The sidewall extends from a first end to a second end. The first end is configured to couple the nosecone to a robotic arm and the second end has a surface configured to be advanced along a weld line between the first work-piece and the second work-piece. The channel extends from the first end to the second end along a longitudinal axis of the nosecone. The screw is positioned within the channel. A central axis of the screw defines an angle that is less than 90 degrees relative to a plane that is perpendicular to surfaces of the first work-piece and the second work-piece as the surface of the nosecone advances along the weld line between the first work-piece and the second work-piece.

In some embodiments, when the nosecone is advanced along the weld line between the first work-piece and the second work-piece, the angle is a positive angle. In some embodiments, when the nosecone is advanced along the weld line between the first work-piece and the second work-piece, the angle is a negative angle. In some embodiments, a longitudinal axis of the nosecone and the plane perpendicular to surfaces of the first work-piece and the second work-piece define a non 90 degree angle. In some embodiments, the surface includes a first portion and a second portion. The first portion is in a first generally horizontal plane and the second portion is in second generally horizontal plane that is different than the first plane. In some embodiments, the device includes a curved recess in the surface of the second end. The curved recess is configured to shape an outer profile of the weld line as the nosecone is advanced along the weld line between the first work-piece and the second work-piece. In some embodiments, the curved recess extends from a perimeter of the channel to an outer edge of the surface of the second end. In some embodiments, the curved recess is formed in a trailing end of the surface of the second end as the nosecone is advanced along the weld line between the first work-piece and the second work-piece. In some embodiments, the device includes a slot including a passageway between a slot entrance in an outer sidewall of the nosecone and a slot exit in the channel of the nosecone. The slot is configured to receive a portion of a structure positioned between the first work-piece and the second work-piece. In some embodiments, the screw is configured to penetrate a thickness of the first work-piece and a thickness of the second work-piece as the surface advances along the weld line between the first work-piece and the second work-piece. In some embodiments, the screw is configured penetrate an entire thickness of the first work-piece and an entire thickness of the second work-piece as the surface advances along the weld line between the first work-piece and the second work-piece.

In another aspect, a friction stir additive welding device configured to join a first work-piece and second work-piece includes a nosecone and a screw. The nosecone includes a sidewall and a channel. The sidewall extends from a first end to a second end. The first end is configured to couple the nosecone to a robotic arm and the second end having a surface configured to be advanced along a weld line between the first work-piece and the second work-piece. The channel extends from the first end to the second end along a central axis of the nosecone. The central axis of the channel defines an angle that is less than 90 degrees relative to a plane that is perpendicular to surfaces of the first work-piece and the second work-piece as the surface of the nosecone advances along the weld line between the first work-piece and the second work-piece. The screw is positioned within the channel.

In some embodiments, when the nosecone is advanced along the weld line between the first work-piece and the second work-piece, the angle is a positive angle. In some embodiments, when the nosecone is advanced along the weld line between the first work-piece and the second work-piece, the angle is a negative angle. In some embodiments, the device includes a recess in the surface of the second end. The recess is configured to shape an outer profile of the weld line as the nosecone is advanced along the weld line between the first work-piece and the second work-piece.

In another aspect, a method of joining two parts includes advancing a nosecone of a friction stir additive welding device along a weld line between a first work-piece and a second work-piece. The method also includes rotating a screw positioned within a channel of the nosecone while advancing the friction stir additive welding device along the weld line. A central axis of the screw defines an angle less than 90 degrees relative to a plane that is perpendicular to surfaces of the first work-piece and the second work-piece. The method also includes joining the first work-piece and the second work-piece together.

In some embodiments, the method also includes shaping an outer profile of the weld line with a curved recess in a surface of a trailing end of the nosecone. In some embodiments, the angle is a positive angle. In some embodiments, the angle is a negative angle. In some embodiments, the method also includes penetrating the surfaces of the first work-piece and the second work-piece with a tip of the screw. In some embodiments, the method also includes penetrating entire thicknesses of the first work-piece and the second work-piece with a tip of the screw.

In another aspect, a friction stir additive welding screw includes a first portion and a second portion. The first portion is configured to be coupled to a friction stir additive welding device. The second portion is configured to penetrate a work-piece. The second portion includes a plurality of large threads, a plurality of fine threads positioned along an edge of each large thread, and a plurality of teeth at a tip of the second portion. Each large thread extends in a generally longitudinal direction.

In some embodiments, the plurality of fine threads extend generally perpendicular to a longitudinal axis of the friction stir additive welding screw. In some embodiments, each thread of the plurality of large threads curves from a first height at a first position along a longitudinal axis of the friction stir additive welding screw to a second height at a second position along the longitudinal axis of the friction stir additive welding screw. The second position is different than the first position. In some embodiments, wherein each thread of the plurality of fine threads has a generally triangular shape. In some embodiments, the friction stir additive welding screw includes a smooth surface positioned between adjacent edges of the plurality of large threads. In some embodiments, the tip of the second portion is not flat. In some embodiments, the plurality of fine threads are configured to cut and break material into smaller pieces of material. In some embodiments, the plurality of large threads are configured to compress the smaller pieces of material and move the compressed smaller pieces toward the tip. In some embodiments, the plurality of teeth are configured to plasticize and compress material along a weld line. In some embodiments, the plurality of teeth are configured to move plasticized material toward a weld line. In some embodiments, each large thread of the plurality of large threads includes a first portion extending in a first direction away from a central axis of the screw and a second portion extending in a second direction toward the central axis of the screw. In some embodiments, each thread of the plurality of fine threads comprises a sharp edge. In some embodiments, the plurality of fine threads are recessed into surfaces of the plurality of large threads.

In another aspect, a method of joining a first work-piece and a second work-piece with a stiffener includes advancing a friction stir additive welding device along a weld line between the first work-piece and the second work-piece. A first portion of the stiffener extends above first surfaces of the first work-piece and the second work-piece and a second portion of the stiffener extends below second surfaces of the first work-piece and the second work-piece opposite the first surfaces. The friction stir additive welding device comprising a rotating screw. The method also includes contacting the stiffener with the rotating screw. The method also includes cutting and breaking the stiffener into smaller pieces using a plurality of fine threads of the rotating screw. The method also includes compressing and moving the smaller pieces toward the weld line using a plurality of large threads of the rotating screw. The method also includes plasticizing and compressing material along the weld line using a plurality of teeth of the rotating screw.

In some embodiments, the method also includes penetrating a thickness of the first work-piece and the second work-piece with a tip of the rotating screw. In some embodiments, an entire thickness of the first work-piece and an entire thickness of the second work-piece are penetrated by the rotating screw. In some embodiments, the method also includes receiving the stiffener through a slot in a nosecone of the friction stir additive welding device. In some embodiments, a longitudinal axis of the rotating screw is angled relative to surfaces of the first work-piece and the second work-piece as the friction stir additive welding device is advanced along the weld line. In some embodiments, the smaller pieces are moved down smooth surfaces between adjacent edges of the plurality of large threads. In some embodiments, the method also includes feeding material through a shoulder into a central channel of the friction stir additive welding device, and plasticizing the material using the rotating screw.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity.

The relative dimensions and proportions as shown are not intended to limit the present disclosure. It will be readily understood that the aspects of the present disclosure, as generally described herein, and illustrated in the figures, can be arranged, substituted, combined, and designed in a wide variety of different configurations, all of which are explicitly contemplated and make part of the present disclosure.

FIG. 18B is a detailed view of a tip of the spindle of FIG. 18A.

DETAILED DESCRIPTION

Described here are embodiments of systems and methods that provide improvements over existing additive friction stir deposition (AFSD) and friction stir additive manufacturing (FSAM) systems and processes. AFSD is a type of FSAM. AFSD can be a large-scale additive manufacturing technology, which is relatively new and increasingly gaining industrial relevance. Further improvements in this field can lead to better bonding and material properties.

Embodiments of the present disclosure are described with reference to various wire-feed systems for friction stir additive deposition systems and techniques. It will be understood, however, that embodiments of the present disclosure are not limited to wire-feed systems and the present disclosure can be suitably implemented in other types of systems, for example pellet fed systems, powder fed systems, bar fed systems, or combinations of these systems. For example, embodiments of the present disclosure can include a system that feeds wire-shaped material and bar-shaped material into a housing (also referred to herein as a stator) of an AFSD or FSAM system. Some systems according to the present disclosure are fed by structures received through a slot in a housing of the system. Systems according to the present disclosure can be used to build large metallic structures through free form additive manufacturing and welding. The systems can deposit various metals and metal matrix composites at solid state to form a high quality part or weld structures or work-pieces together. Embodiments of the present disclosure offer significant improvements in build quality and consistency. Accordingly, systems and methods according to the present disclosure can be advantageously used for large scale additive manufacturing of metallic and metal matrix composites.

Systems and methods according to the present disclosure can allow for manufacturing processes that combine different materials together with seamless transition between materials. In embodiments of the present disclosure that use wire as a filler material, the wire feed systems can allow wires of different gauges and even different materials to be used at the same time. Feeding the additive material in the form of a wire enables uses and applications of this technology in previously prohibitive environments, as this assembly can be used in a compact size and be easy to control. The deposition head design can support a very large window of operation by adjusting the number of wires and wire gauges. Furthermore, system and methods according to the present disclosure offer significant improvements in energy efficiency.

Figure 1A:
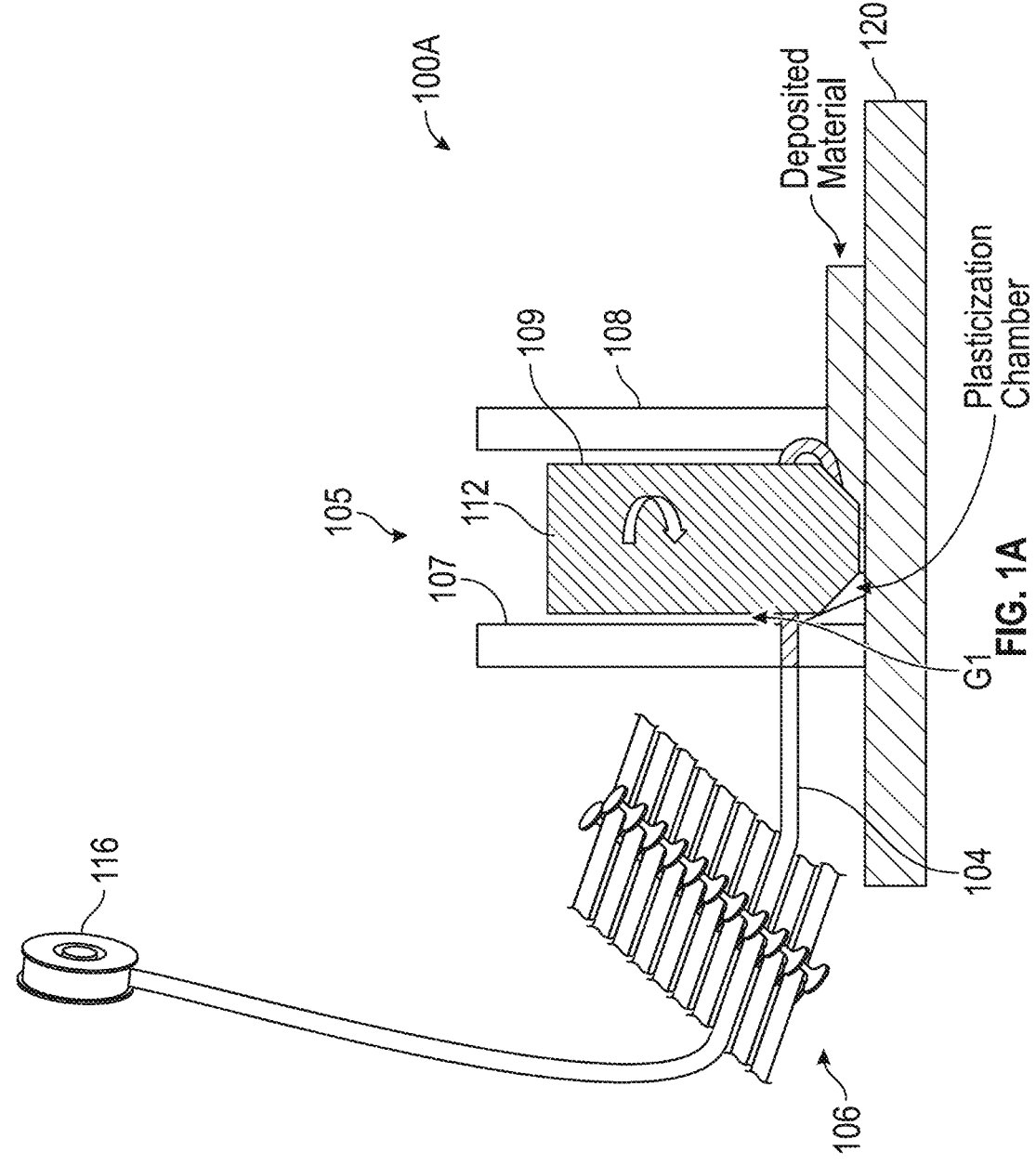
FIGS. 1A-1C are schematic illustrations of example embodiments of wire-feed additive manufacturing systems according to an embodiment of the present disclosure.
Figure 1B:
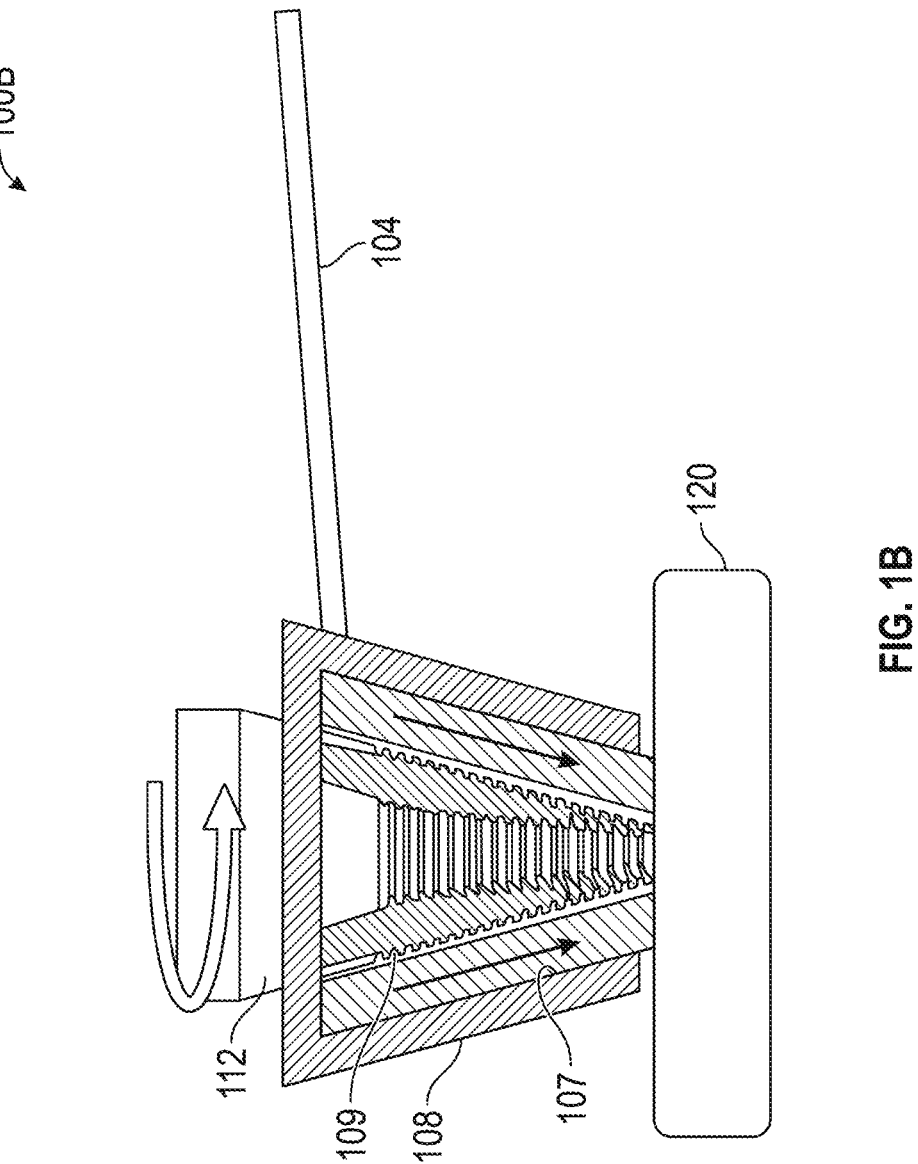
Figure 1C:
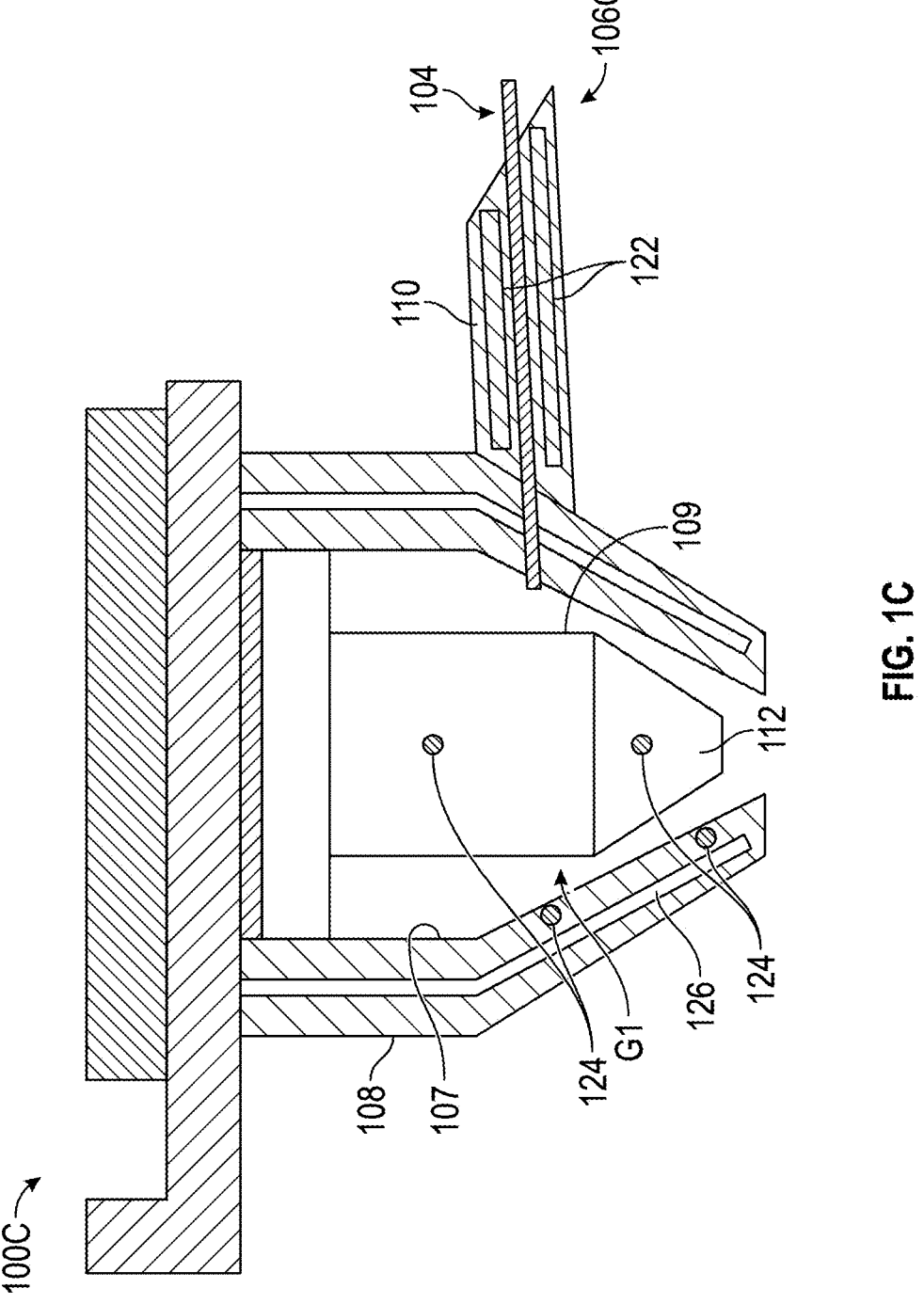
Figure 2:
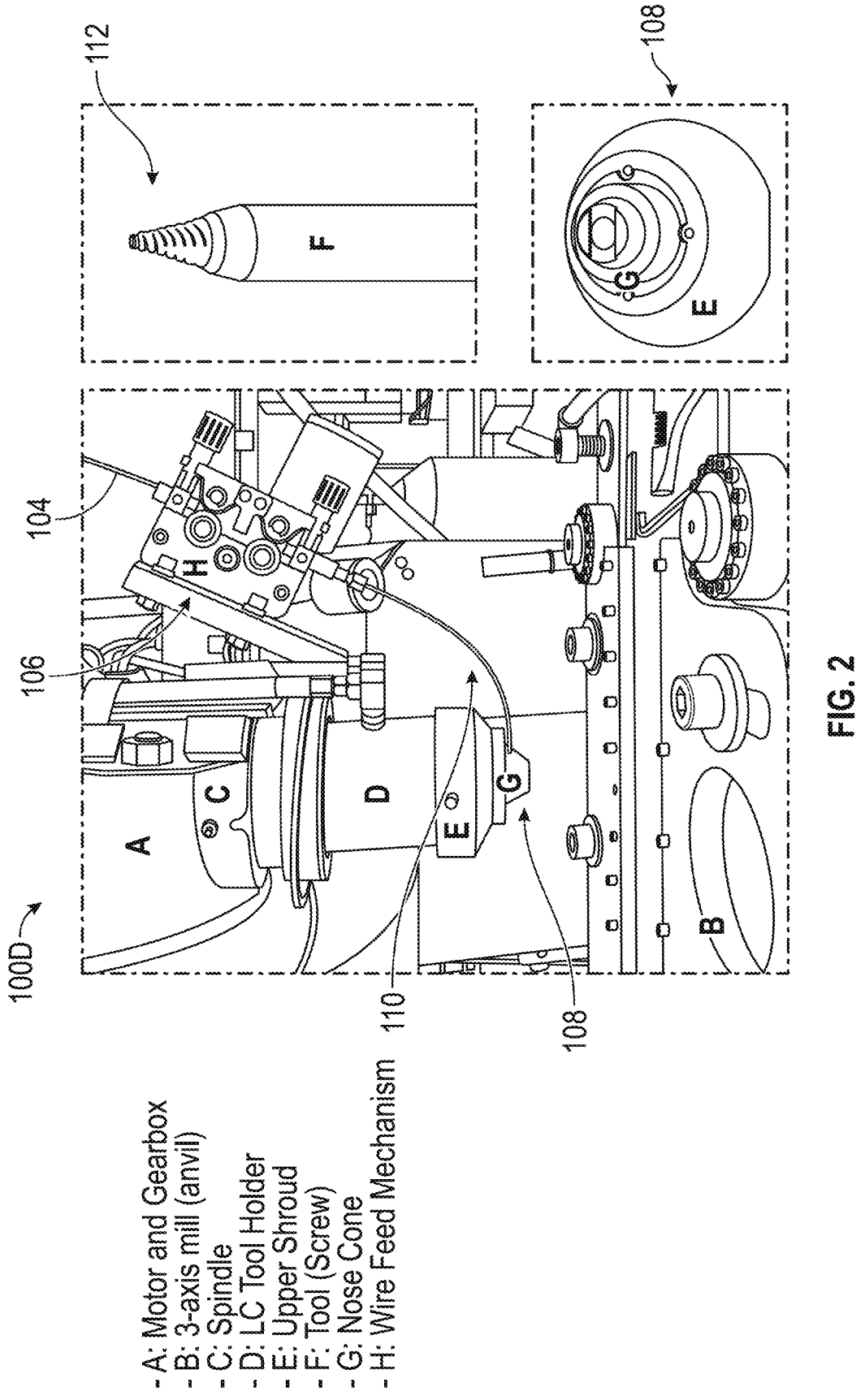
FIG. 2 is another example embodiment of a wire-feed additive manufacturing system according to an embodiment of the present disclosure.
Figure 3:
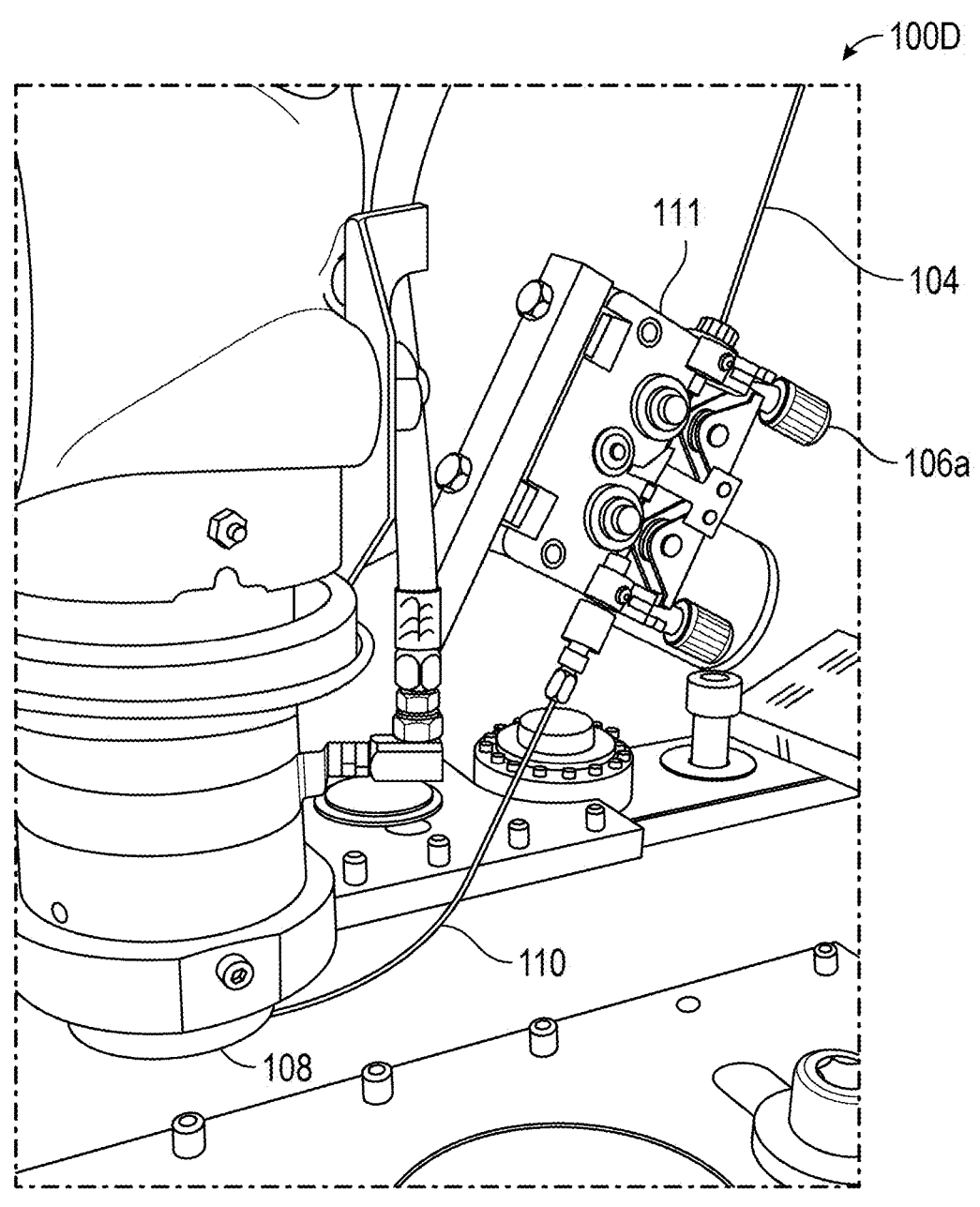
FIG. 3 is another example embodiment of a wire-feed additive manufacturing system according to an embodiment of the present disclosure.
Figure 4:
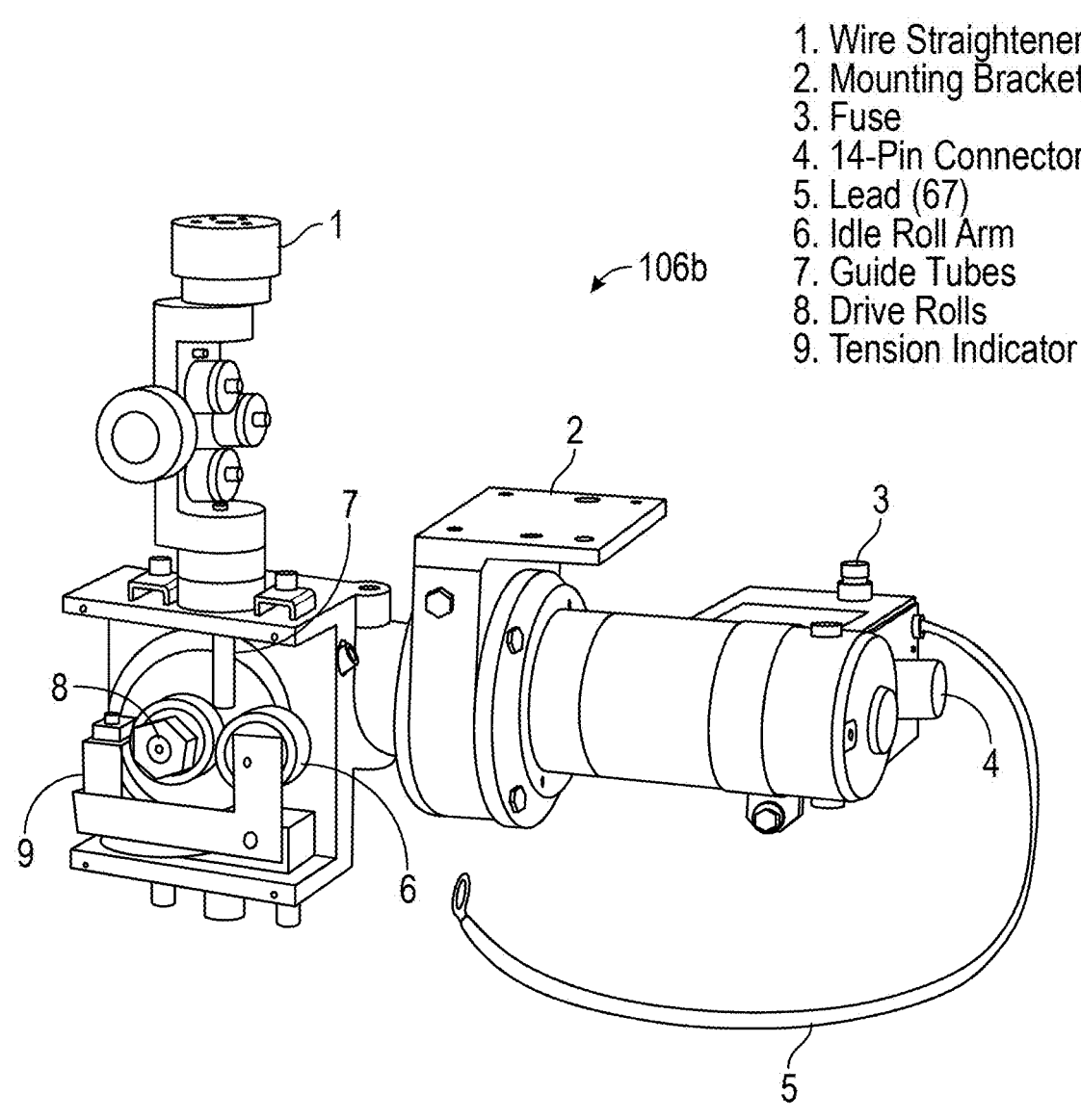
FIG. 4 is an example wire feeder system according to an embodiment of the present disclosure.

FIGS. 1A-3 illustrate example systems 100A, 100B, 100C, and 100D according to embodiments of the present disclosure. FIG. 3 illustrates an example wire feeder system 106*a*. The wire feeder system 106*a* can include a wire feed assist. The wire feed assist 111 can push or pull wire material at a desired rate. The wire feed assist 111 can assist in providing continuity of feed material through the wire feeder system 106*a*. FIG. 4 illustrates another example wire feeder system 106*b* that can be implemented in systems 100A-100D. The wire feeder system 106*b* does not include a wire feed assist. In some embodiments, a wire feed assist can be included with the wire feeder system 106*b*. The systems 100A-100D can be AFSD or FSAM systems. The systems 100A-100D can be wire fed systems. The systems 100A-100D can include a housing 108 configured to receive one or more wires 104. As illustrated in FIG. 1A, in one embodiment of the system 100A, a single wire 104 or multiple wires 104 can be flexibly fed to and into the housing 108. The housing 108 can be a stationary or non-rotating housing 108. In some embodiments, the housing 108 can include a channel 105. A rotating spindle 112 can be positioned within the housing 108, for example, within the channel 105. The spindles described herein may also be referred to as screws or pins. The single or multiple wires 104 can be fed from one or more wire spools 116. The system 100A can include a wire feeding system 106 configured to feed multiple wires to and into the housing 108 simultaneously. The system 100C can include a wire feeding system 106C configured to feed a single wire 104 to and into the housing 108. The wire feeding system 106C may include a sleeve 110 for guiding the wire 104 into the housing 108. The system 100D can include a wire feeding 106D configured to feed a single wire 104 to and into the housing 108.

As explained above, it will be understood that the housing 108 may be "stationary" relative to other components of the system 100 (for example, an upper shroud or a wire feeder) while the housing 108 moves relative to an environment in which the system 100 is moving. The housing 108 can also be referred to as a cartridge, a dispensing nozzle, a shoulder, a stator, and a nosecone. When the rotating spindle 112 is positioned within the housing 108, a gap G1 may exist between an inner wall 107 of the housing 108 and an outer wall 109 of the rotating spindle 112, as shown in FIGS. 1A-1C. Material, such as a wire or wires, can be received into the gap G1 as the wire(s) are fed through the wall of the housing 108.

In some instances, the inner surface 107 of the housing 108 can define a generally cone shaped area. The inner surface 107 of the housing 108 can be a smooth conical surface. The shape of the rotating spindle 112 can generally correspond to the inner surface 107 of the housing 108 and include a generally cone-shaped portion. The generally cone-shaped features of the housing 108 and the rotating spindle 112 can assist in directing the material, such as a wire 104, toward a deposition zone. The generally cone-shaped features may also assist in material compression prior to and during deposition.

In some embodiments, the wire 104 can be fed into the housing 108 using a wire feeder or a wire feed system 106, 106C, 106D. The wire feeder 106C may include heating cartridges 122 capable of preheating or heating the wire 104 as it is fed into the gap G1 between the inner surface 107 of the housing 108 and the outer surface 109 of the rotating spindle 112, as shown in FIG. 1C. The heating cartridges 122 may assist in softening of the material, in addition to friction imparted by the spindle 112.

The systems 100A-100D may also include one or more thermocouples 124. The thermocouples 124 may be positioned on or embedded in the rotating spindle 112 and/or the inner wall 107 of the housing 108, as shown in FIG. 1C. The thermocouples 124 may be used to measure temperature within the system 100 during operation. The system 100 may also include one or more cooling channels 126 integrated into the housing 108, as shown in FIG. 1C.

The spindle 112 can rotate at a predetermined speed. The spindle 112 can rotate at a speed between about 100 RPM to about 1,500 RPM, for example, about 100 RPM, about 200 RPM, about 300 RPM, about 400 RPM, about 500 RPM, about 600 RPM, about 700 RPM, about 800 RPM, about 900 RPM, about 1,000 RPM, about 1,100 RPM, about 1,200 RPM, about 1,300 RPM, about 1,400 RPM, about 1,500 RPM, more or less, or any value in between. The rotation of the spindle 112 can assist in pulling the wire 104 through the housing 108 and into a space or the gap G1 between the housing 108 and the spindle 112. The gap G1 may be defined, at least in part, by the spindle tip and the housing 108. The speed of the spindle 112 rotation can change during use. For example, the speed of rotation of the spindle 112 can start relatively slow and gradually increase or ramp up to faster speeds. A relatively slow initial rotational speed can reduce a risk that the wire 104 breaks as the wire 104 is fed into the system 100A-100D. The housing 108 with the spindle 112 can be pressed against a substrate 120 or a previously deposited layer of material. Friction-induced heat softens and plasticizes the wire(s) 104. The softened material can exit the system 100A-100D and be deposited on the substrate 120 or previously deposited layer of material. The deposition of softened material can be executed in a single layer or multiple layers to form structures, parts, joints, and welds, for example to bind separate materials.

Material can be deposited in an additive manufacturing process by wrapping a material, for example the wire 104, around the spindle 112 rotating inside the housing 108. The system 100A-100D can be a wire-feed friction stir additive manufacturing (WF-FSAM) system, also referenced herein as a wire-feed system. As shown in FIGS. 1A-1C, the wire-feed system 100A-100D can include the housing 108 and the rotating spindle 112 positioned within the housing 108. As the wire-feed system 100A-100D moves relative to a substrate, a work-piece, or within a work environment, the housing can be stationary relative to other components of the wire-feed system (such as an upper shroud or a wire feeder) while the spindle 112 rotates inside the housing 108. Although the housing can be described as stationary relative to other non-spindle components of the system 100A-100D, it will be understood that the system 100A-100D, including the housing 108, the upper shroud, the wire feeder, and the spindle 112, can be configured to move in 3 translational degrees of motion and 3 rotational degrees of motion.

The gap G1 can be a clearance or space between an inner wall of the housing 108 and an outer wall of the spindle 112. A wire-feed system according to embodiments of the present disclosure, such as system 100D as shown in FIGS. 2 and 3, can be used to feed one or more wires 104 into the clearance or space between the housing 108 and the spindle 112. The wire-feed system 100A-100D can assist in continuous feeding of material. The rotation of the spindle can assist in pulling the wire 104 into the system 100A-100D. The wire-feed system 100A-100D can allow the deposition of material while the additive manufacturing is in any orientation as the system 100A-100D is not gravity based. As the spindle 112 rotates, the wire can soften due to friction and heat. While the spindle 112 is rotating, the wire-feed system 100A-100D can be moved across a substrate or a surface to deposit the softened material. An example WF-FSAM system according to an embodiment of the present disclosure, including a wire feeding system, a wire feed sleeve, and a housing (or nosecone), is illustrated in FIGS. 2 and 3.

The wire-feed system 100A-100D can be used to deposit a softened material to a deposition zone. For example, the softened material can be a wire that has passed through and softened by interaction with the rotating spindle 112. The wire 104 can be a thread or rod. The wire 104 can be solid or hollow. The wire 104 can be a metal wire. The deposition zone can include the area where the softened material exits the wire-feed system and/or the area where the softened material contacts a surface. The deposition zone can move as the wire-feed system is moved across the surface. The deposition zone can be an area between the wire-feed system and the surface. The deposition zone can include the area where the softened material is deposited.

The wire-feed system 100A-100D can be configured to move across the surface of a substrate or work-piece. In one example, the wire-feed system 100A-100D moves in a transverse direction relative to the substrate. For example, the direction of movement of the wire-feed system 100A-100D can be generally parallel to the substrate. As the wire-feed system 100A-100D is being moved across the surface of the substrate, the softened material can continue to be deposited to the deposition zone. The movement of the wire-feed system 100A-100D and the deposition of the softened material can form a structure or part. Alternatively, the substrate or work-piece can be moved relative to the housing 108 to form a structure or part.

Figure 5A:
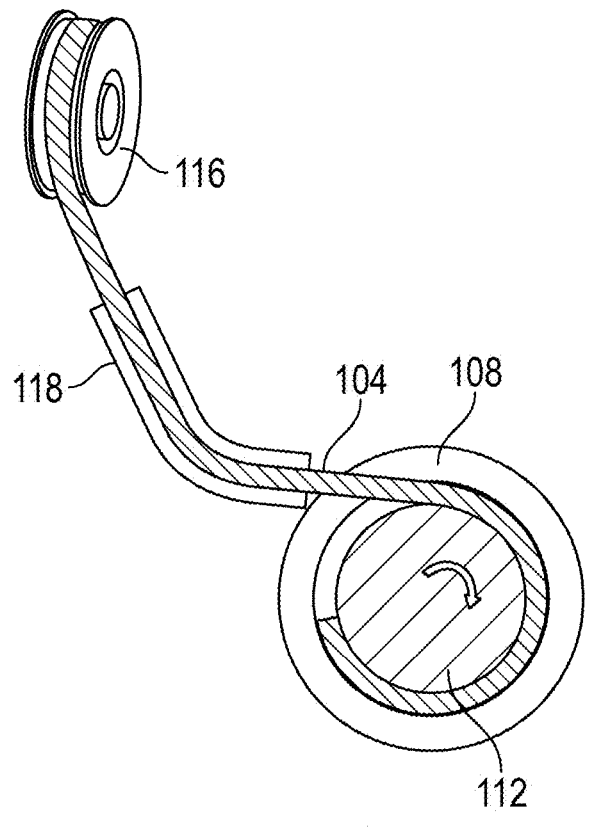
FIG. 5A is a top view of another example embodiment of a wire-feed additive manufacturing system according to an embodiment of the present disclosure.
Figure 5B:
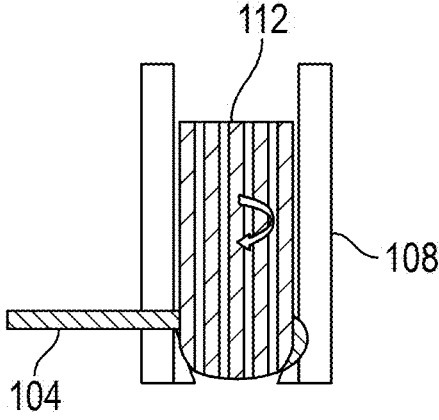
FIG. 5B is a side view of the system of FIG. 5A with a spindle including surface textures.

As illustrated in FIGS. 5A and 5B, a wire 104 can be guided from the wire spool 116 into the housing 108 as the spindle 112 rotates. In some embodiments, the wire 104 can be fed through a wire sleeve 118. In some embodiments, the spindle 112 can have a smooth exterior surface. Alternatively, the exterior surface of the spindle 112 can be textured, for example with parallel vertical ridges, to enhance engagement with the wire. Optionally, a feed roller can be used to push the wire into the cartridge, for example, when the rotating spindle is not generating a threshold pull force on the wire.

Figure 5C:
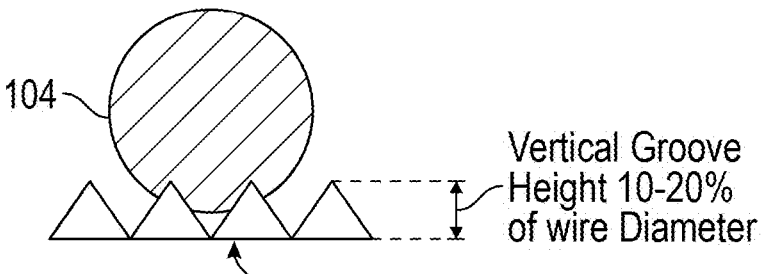
FIG. 5C schematically illustrates example surface textures engaging a wire material.

FIG. 5C illustrates example features of the rotating spindle 112 according to an embodiment of the present disclosure. Example surface features are shown as triangles or ridges and valleys or grooves. The surface features are shown interacting with the wire 104. The surface features can interact with the wire 104 being fed into the gap G1 between the housing 108 and the spindle 112. In some embodiments, the surface features can be grooves or knurled features. The grooves can be vertical grooves. The grooves can have a vertical height that is 10-20% of the wire diameter. It will be understood that the rotating spindle 112 is illustrated schematically in FIG. 5C as having surface features aligned generally perpendicular to the axis of the rotating spindle 112, and as illustrated in another example in FIG. 5D described in further detail below. In such embodiments, points of the surface features configured to contact the wire 104 may be aligned generally linearly. It will also be understood that that the rotating spindle 112 according to embodiments of the present disclosure can have surface features aligned generally parallel to the axis of the rotating spindle 112, as illustrated in FIG. 5B. Points of the surface features configured to contact the wire 104 may be aligned generally along a curve.

Figure 5D:
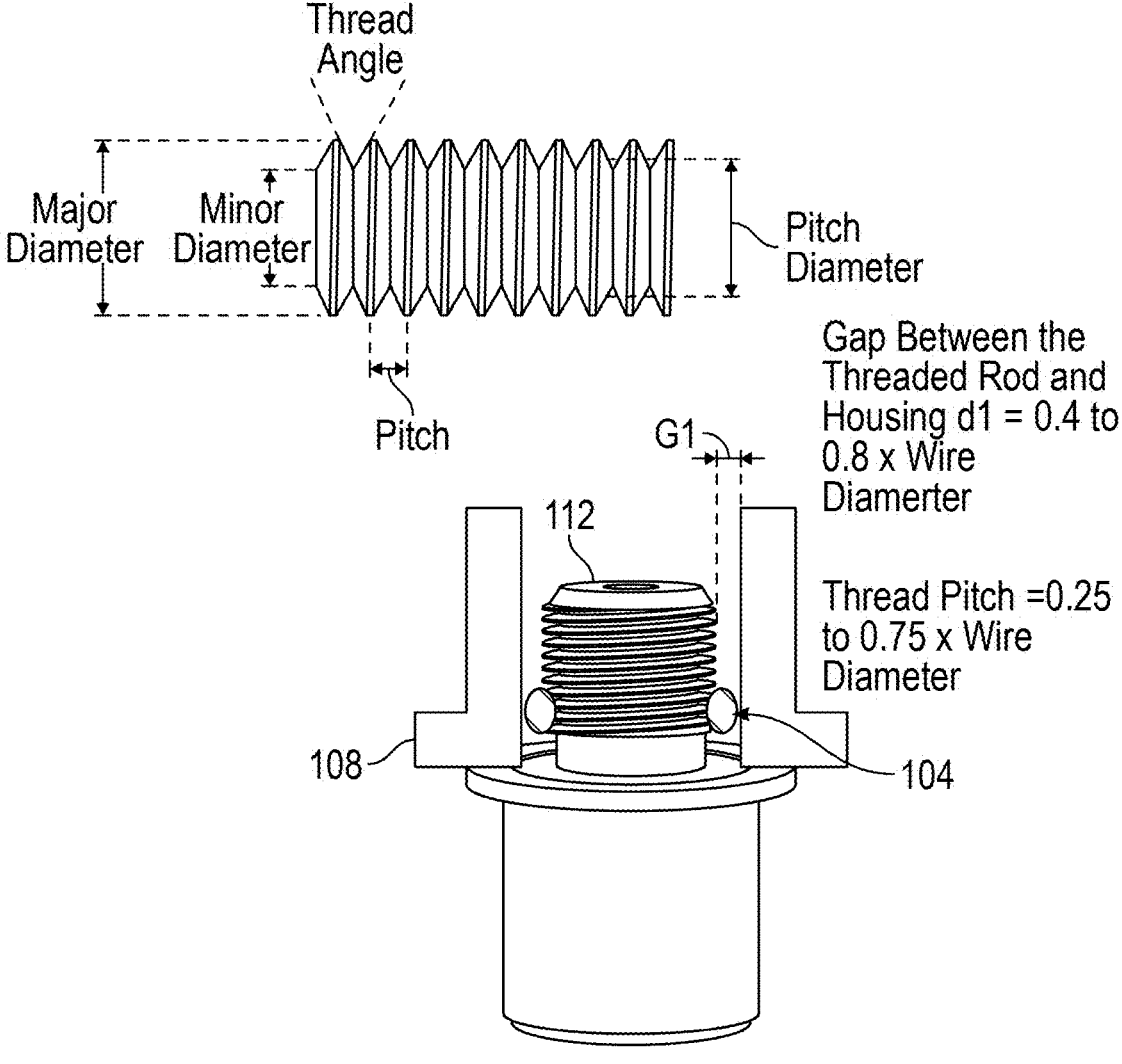
FIG. 5D illustrates another example embodiment of a wire-feed additive manufacturing system with a threaded spindle according to an embodiment of the present disclosure.

FIG. 5D illustrates an example spindle 112 having fine thread features configured to assist wire feeding according to an embodiment of the present disclosure. The wire 104 can be fed into the gap G1 between the rotating spindle 112 and the housing 108. In this example, the rotating spindle 112 includes a threaded rod that interacts with the wire 104 fed into the housing 108. In some non-limiting embodiments, the gap G1 is about 0.4 to about 0.8 times the diameter of the wire 104 fed into the housing 108. In some non-limiting embodiments, the thread pitch of the threaded rod is about 0.25 to about 0.75 times the diameter of the wire fed 104 into the housing 108. Embodiments of the present disclosure including a threaded rod with fine thread features can advantageously feed wire 104 into the housing 108 with improved energy efficiency and consistency.

Figures 6A, 6B, 6C:
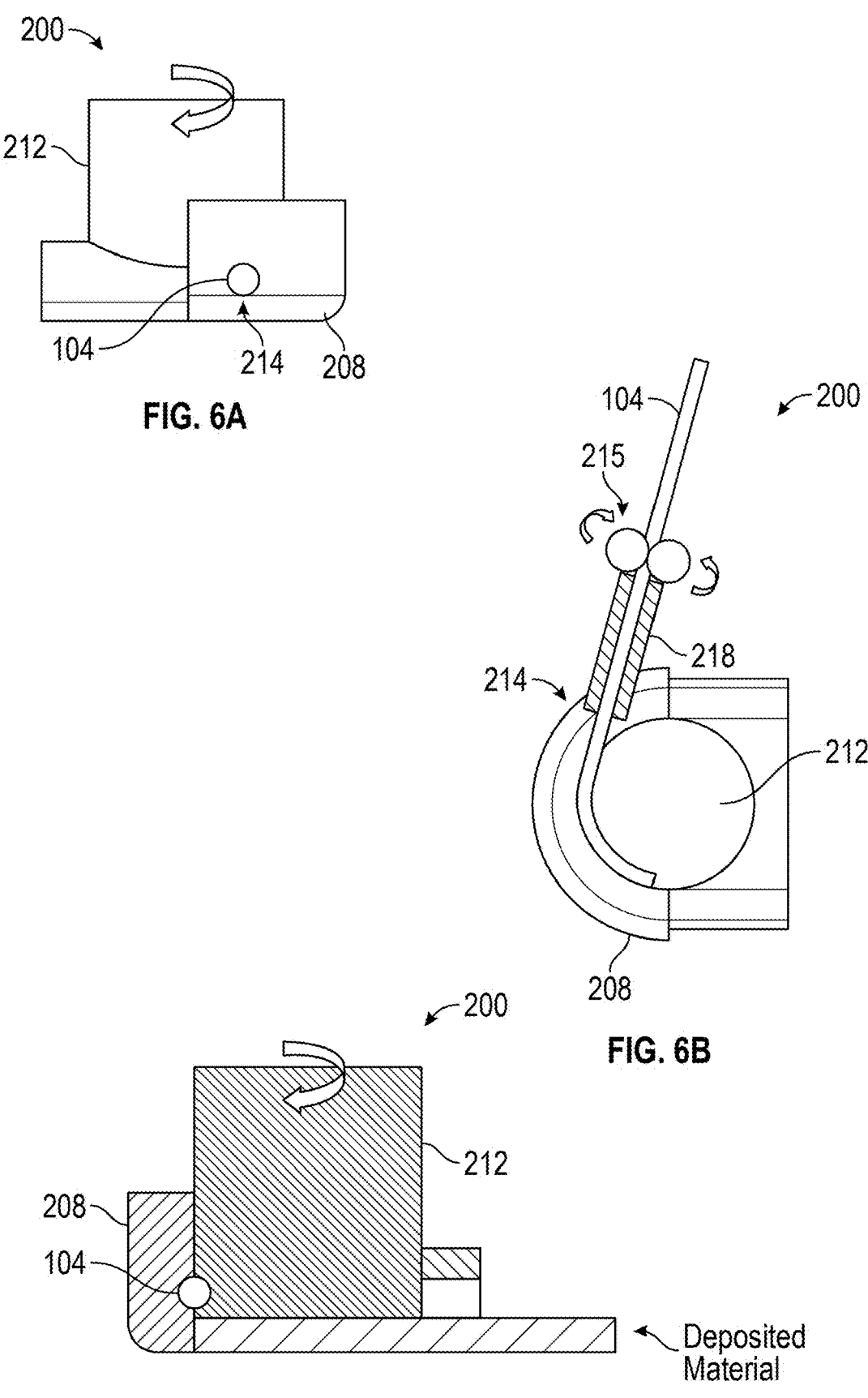
FIG. 6A is a side view of another example embodiment of a wire-feed additive manufacturing system having a wire material fed through a wire inlet in a housing of the system according to an embodiment of the present disclosure.
FIG. 6B is a top view of the system of FIG. 6A.
FIG. 6C is a cross-sectional side view of the system of FIG. 6A.

FIGS. 6A-6C illustrate views of another system 200 according to an embodiment of the present disclosure. FIG. 6A illustrates a side view of the system 200. FIG. 6B illustrates a top view of the system 200. FIG. 6C illustrates a cross-sectional side view of the system 200. Embodiments of the example system 200 shown in FIGS. 6A-6C may include any of the features of the systems discussed above or below, and should not be limited to the particular embodiments described. For example, features of one embodiment may be combined with features of another embodiment. The particular modifications shown in FIGS. 6A-6C will now be discussed in detail, and features not discussed will be understood to be similar, or identical, to those discussed elsewhere herein. Some or all of the modifications discussed with respect to FIGS. 6A-C may be incorporated into the other embodiments described herein.

The system 200 may include a housing 208 or cartridge and a rotating spindle 212. The system 200 may include a wire inlet 214. A sidewall of the housing 208 can include the wire inlet 214. FIG. 6B also illustrates example auxiliary wire feeding rollers 215. The example auxiliary wire feeding rollers 215 can assist in feeding wire 104 into the system 200. In the example system 200, the wire 104 can be fed through a sleeve 218 by the auxiliary wire feeding rollers 215. In this embodiment, the sleeve 218 can be inserted in the wire inlet 214 provided in a side wall of the housing 208.

The wire 204 can be configured to pass through the sleeve 218 and into a space between the housing 208 and the spindle 212 via the wire inlet 214. In another non-limiting example, such as illustrated in FIG. 5A, the sleeve 118 is not inserted in a wire inlet.

Figures 7A, 7B, 7C, 7D, 7E:
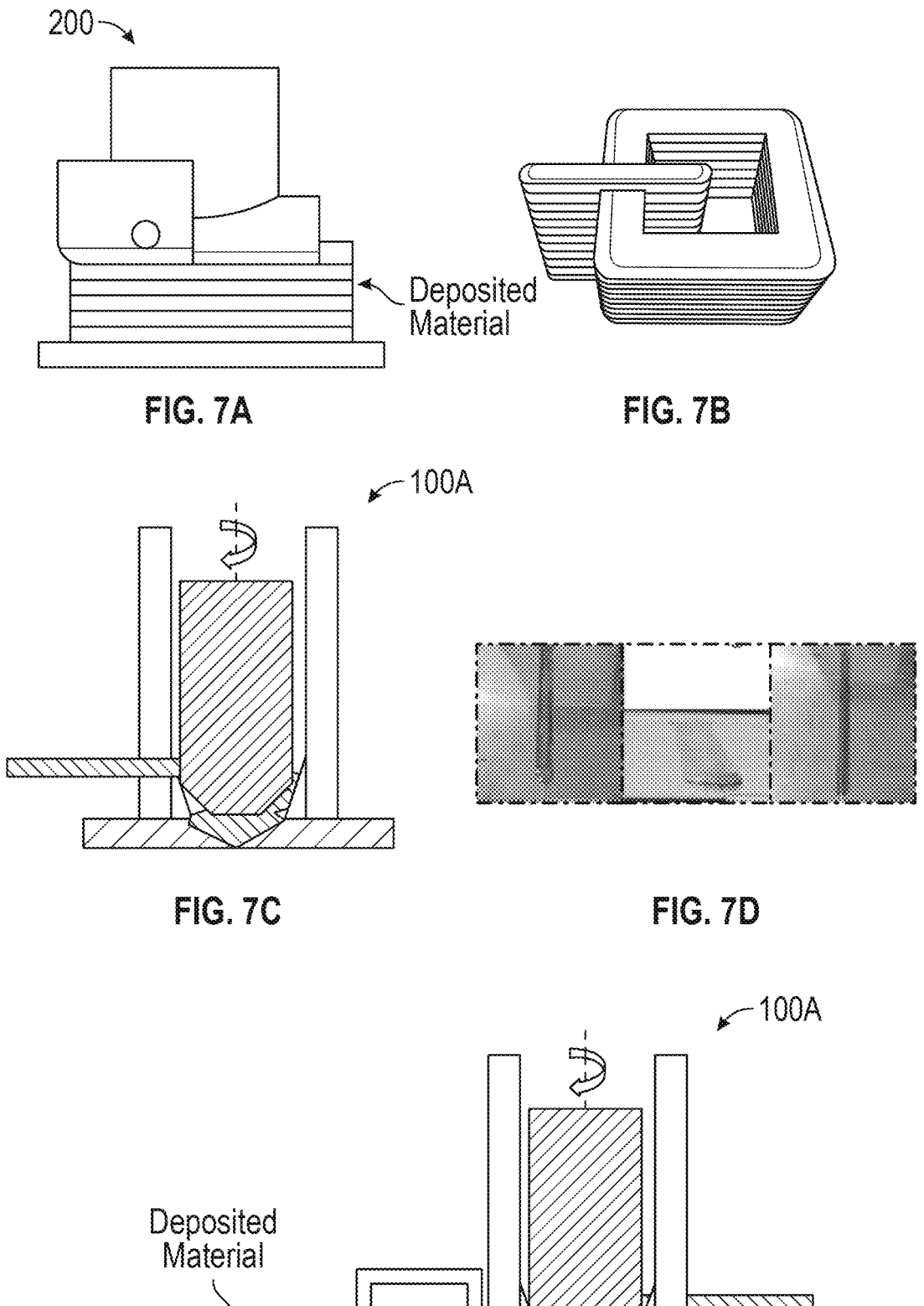
FIG. 7A illustrates the system of FIG. 6A being used for freeform additive manufacturing according to an embodiment of the present disclosure.
FIG. 7B illustrates a part or structure formed using freeform additive manufacturing according to an embodiment of the present disclosure.
FIG. 7C illustrates a cross-sectional view of a system according to an embodiment of the present disclosure being used to join two panels or work-pieces.
FIG. 7D illustrates a weld line joining two panels or work-pieces according to an embodiment of the present disclosure.
FIG. 7E illustrates a cross-sectional view of a system being used to join a panel or a work-piece with a stiffener according to an embodiment of the present disclosure.

FIGS. 7A-7E illustrate example applications in which embodiments of the present disclosure can be implemented. Such applications include, but are not limited to, freeform additive manufacturing and welding, including joining a first panel and a second panel and joining a stiffener and a stiffener panel. FIG. 7A illustrates the system 200 being used for freeform additive manufacturing. While system 200 is shown, any system according to the present disclosure may be used. FIG. 7B illustrates an example structure formed through free form additive manufacturing using embodiments of systems according to the present disclosure. FIG. 7C illustrates system 100A being used to join two panels or work-pieces together. While system 100A is shown, any system according to the present disclosure may be used. FIG. 7D illustrates example weld lines formed to join two panels or work-pieces using embodiments of systems according to the present disclosure. FIG. 7E illustrates system 100A being used to join a stiffener and a panel or work-piece. While system 100A is shown, any system according to the present disclosure may be used. Systems and methods according to embodiments of the present disclosure can facilitate significant improvements in the build quality and consistency of the final material, including building structures of different sizes, including large or ultra-large metal structures. Advantageously, embodiments of the present disclosure can utilize a variety of materials and allow seamless transition between materials.

Figure 8A:
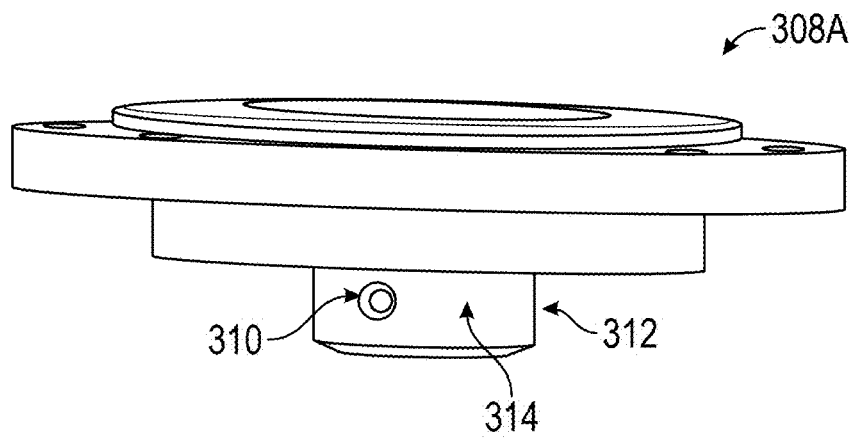
FIG. 8A is a perspective view of a housing having a wire inlet according to an embodiment of the present disclosure.
Figure 8B:
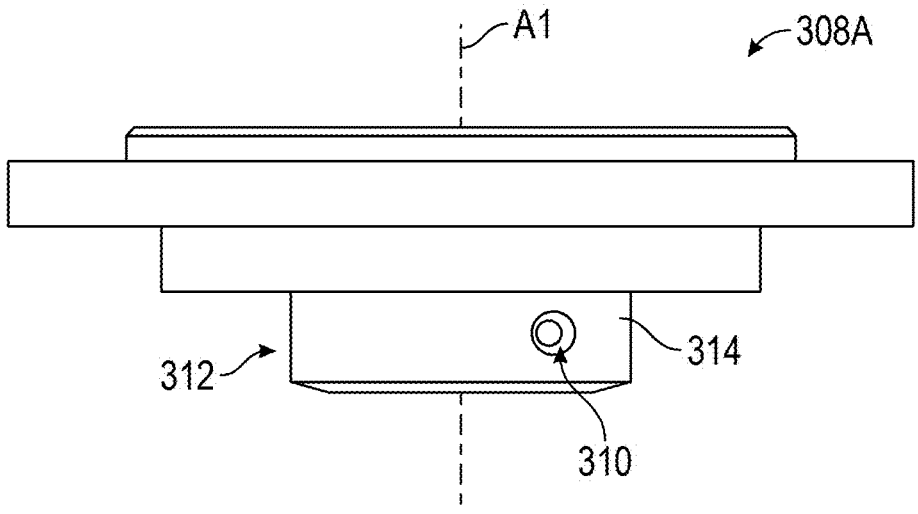
FIG. 8B is a side view of the housing of FIG. 8A.
Figure 9A:
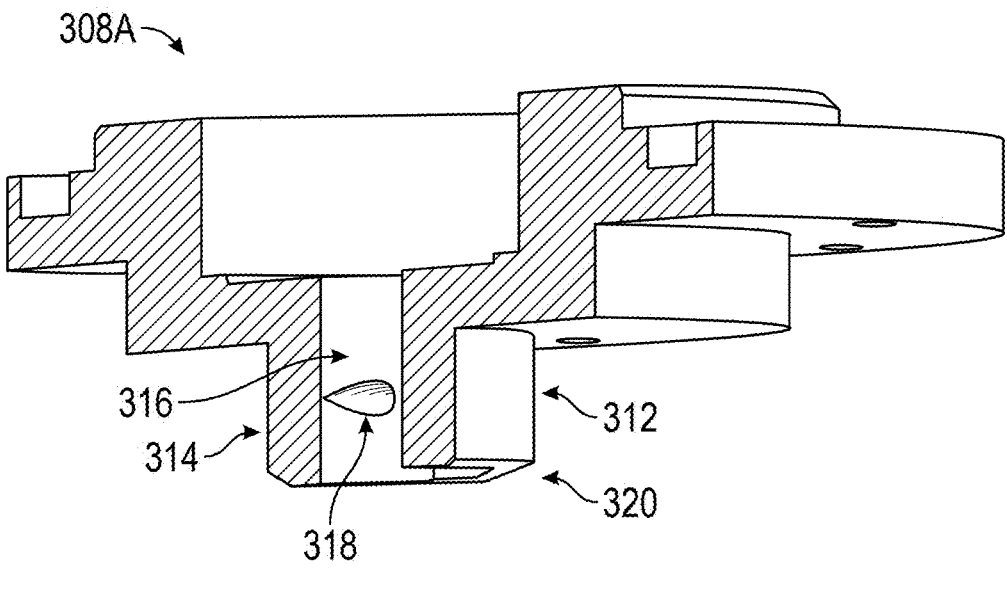
FIG. 9A is a cross-sectional perspective of the housing of FIG. 8A.
Figure 9B:
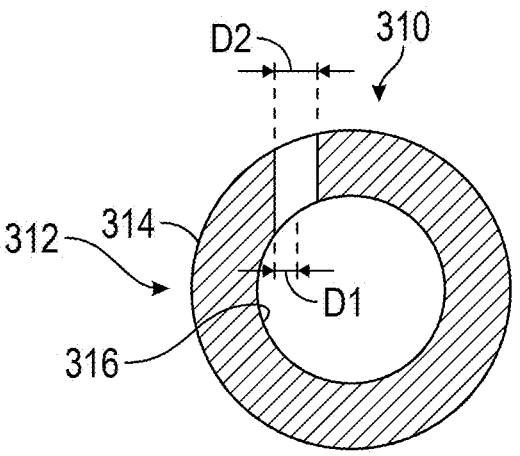
FIG. 9B is a cross-sectional top view of the housing of FIG. 8A.

FIGS. 8-9B illustrate another example housing 308A according to an embodiment of the present disclosure. FIGS. 9A and 9B are cross-sectional views of the housing 308A according to an embodiment of the present disclosure. FIGS. 10A-10F illustrate still another example housing 308B according to an embodiment of the present disclosure. As will be described in detail below, embodiments of the housing 308B can have a converging cone shape. The converging or truncated cone can receive the conical portion of the spindle 312. Embodiments of the example housings 308A, 308B shown in FIGS. 8-10F may include any of the features of the systems discussed above or below, and should not be limited to the particular embodiments described. For example, features of one embodiment may be combined with features of another embodiment. The particular modifications shown in FIGS. 8-10F will now be discussed in detail, and features not discussed will be understood to be similar, or identical, to those discussed elsewhere herein. Some or all of the modifications discussed with respect to FIGS. 8-10F may be incorporated into the other embodiments described herein.

The housing 308A, 308B can include a wire inlet 310 extending through a side wall 312 of the housing 308A, 308B, between an exterior surface 314 of the housing 308A, 308B and an interior surface 316 of the housing 308A, 308B. The wire inlet 310 is visible in FIGS. 8A, 8B, 10B, and 10C. The wire inlet 310 can be positioned at or near a deposition end of the housing 308A, 308B. The distance the wire inlet 310 is positioned from the deposition end of the housing 308A, 308B may be dependent upon the geometry of the housing 308A, 308B, for example, the size and shape of the housing 308A, 308B. In non-limiting embodiments, the distance a mid-point of the wire inlet 310 is spaced from the deposition end of the housing 308A, 308B can be about 0.10 inches, 0.15 inches, 0.20 inches, 0.25 inches, 0.30 inches, 0.35 inches, 0.40 inches, 0.45 inches, 0.50 inches, or more or less, or any value in between. In one non-limiting embodiment, the distance a mid-point of the wire inlet 310 is spaced from the deposition end of the housing 308A, 308B is about 0.25 inches. In another non-limiting embodiment, the distance a mid-point of the wire inlet 310 is spaced from the deposition end of the housing 308A, 308B is about 0.30 inches. In one non-limiting embodiment, the distance a bottom edge of the wire inlet 310 is spaced from the deposition end of the housing 308A, 308B is about 0.15 inches. In another non-limiting embodiment, the distance a bottom edge of the wire inlet 310 is spaced from the deposition end of the housing 308A, 308B is about 0.20 inches. In one non-limiting embodiment, the distance a top edge of the wire inlet 310 is spaced from the deposition end of the housing 308A, 308B is about 0.35 inches. In another non-limiting embodiment, the distance a top edge of the wire inlet 310 is spaced from the deposition end of the housing 308A, 308B is about 0.40 inches.

The cross-sectional shape of the wire inlet opening in the exterior surface 314 of the housing 308A, 308B can be circular. Referring now to the embodiment of FIGS. 8-9B, the wire inlet 310 can be aligned normal to a central axis the housing 308A. The wire inlet 310 can be angled relative to the central axis of the housing 308A. The wire inlet 310 can be positioned offset from a central axis A1 of the housing 308A, as shown in FIGS. 8B and 9B. For example, a longitudinal axis of the wire inlet 310 may not intersect the central axis A1. The wire inlet 310 can be offset from the central axis A1 up to about 0.290 inches in either direction, for example, 0.050 inches, 0.100 inches, 0.150 inches, 0.200 inches, 0.250 inches, 0.300 inches, or more or less, or any value in between. In other non-limiting embodiments, the wire inlet 310 is not positioned offset from the central axis A1 of the housing 308A. In such embodiments, a longitudinal axis of the wire inlet 310 can interact the central axis A1. The longitudinal axis of the wire inlet 310 can be generally perpendicular to the central axis A1. The offset positioning of the wire inlet 310 can result in an opening in the exterior surface 314 having an oval shape. In some embodiments, the wire inlet 310 can include a track 318 formed in the interior surface 316 of the housing 308A as shown in FIGS. 9A and 9B. The track 318 can be a groove or cut-out that extends a depth into the side wall 312 in a direction toward the exterior surface 314 of the housing 308A, and also extends partially along the circumference of the interior surface 316 of the housing (for example, in a direction the spindle is rotating). The depth of the track 318 can vary, for example the depth D1 can be less than the depth D2. When the depth is less than the width of the wire fed into the wire inlet, a portion of the wire can extend out of the track 318. The track 318 can be tapered or scarfed. In some embodiments, the track 318 can have a tear drop shape. The tear drop shape may be a result of the wire inlet 310 being positioned offset from the central axis A1. Accordingly, in embodiments of the present disclosure, wire can be fed into the housing 308A through a side wall 312 of the housing 308A, as opposed to, for example, a top or upper wall of the housing. As wire is fed through the wire inlet 310, the wire can follow and be guided along the track 318 and then into a space that is between the interior surface 316 of the housing 308A and the rotating spindle (not shown). As described above, the space can be provided between the interior surface 316 of the housing 308 (in which the track 318 is formed) and an exterior surface of a spindle rotating within the housing.

The track 318 can extend at least partially around a circumference of the interior surface 316 of the housing. In some embodiments, the track 318 can be a partial track that does not extend around the entire circumference of the interior surface 316. Such an embodiment is illustrated in FIG. 8. In some embodiments, the track 318 can extend one or more full rotations around the interior surface 316 of the housing 308A. In some embodiments, the track 318 can extend a single rotation around the circumference of the interior surface 316 of the housing 308. In some embodiments, the track 318 can extend multiple rotations around the circumference of the interior surface 316 of the housing 308A.

In some embodiments, the track 318 may have a depth (D) that is less than a diameter of the wire fed into the housing 308A, for example depth D1. As the wire is fed along and guided by the track 318, a portion of the wire may extend out of the track 318 and protrude into the space between the interior surface 316 of the housing 308A and the rotating spindle, such that the wire is partially embedded in the side wall 312 of the housing 308A as the wire is being fed into the space.

The track 318 may be positioned at or near a deposition end 320 of the housing 308A. As the wire is fed along and guided by the track 318, plasticization of the wire can occur at or near the deposition end 320 of the housing 308A. The rotation of the spindle within the housing 308 can assist in pulling the wire into any of the systems according to the present disclosure.

Figure 10A:
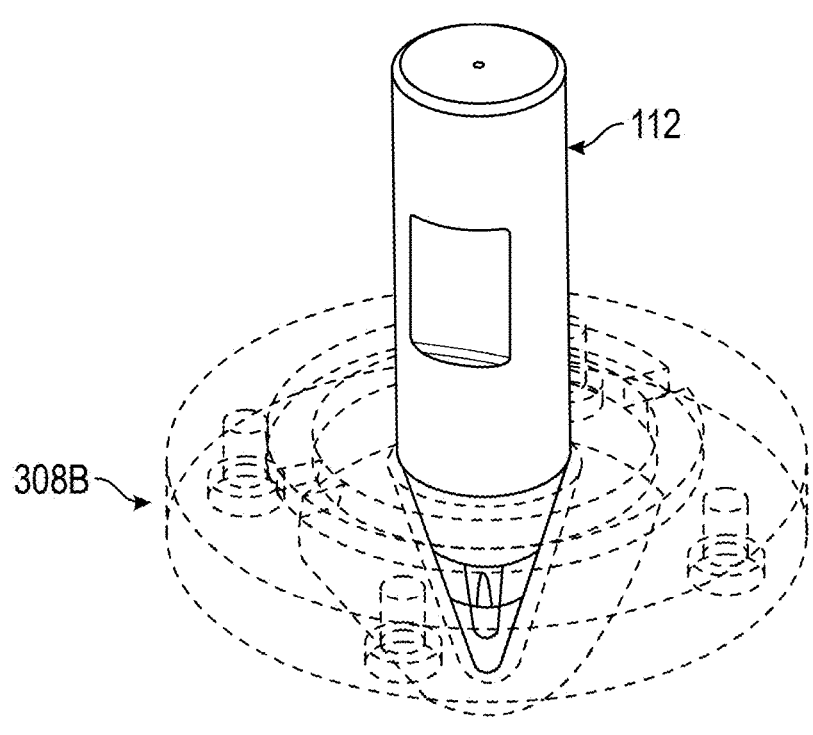
FIGS. 10A and 10B illustrate perspective views of another example system having a spindle and a housing with a wire inlet according to an embodiment of the present disclosure.
Figure 10B:
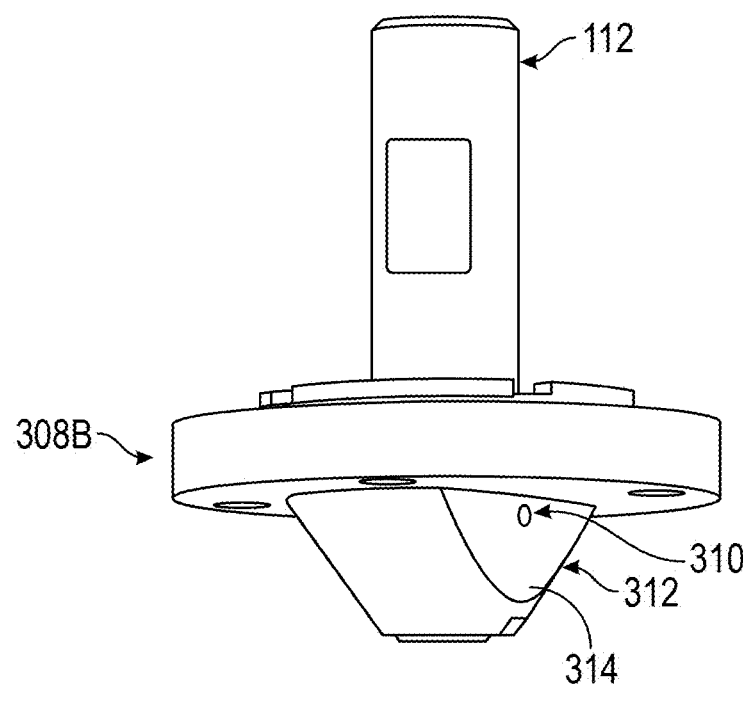
Figures 10C, 10D:
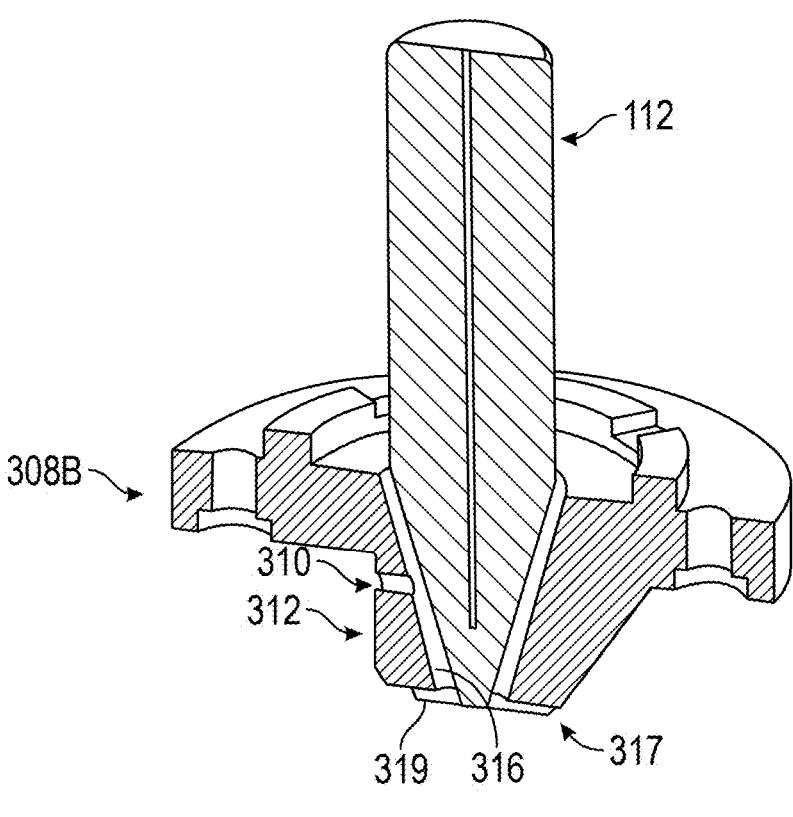
FIGS. 10C and 10D illustrate cross-sectional views of the system of FIGS. 10A and 10B.

In some embodiments, the wire inlet 310 can be aligned normal to a central axis of the housing 308A, 308B or have different pitch angles and/or be offset. In some embodiments, the wire inlet 310 can be positioned at or near the deposition end of the housing 308A, 308B to decrease or limit the distance between the wire inlet 310 and the deposition end. The positioning of the wire inlet 310 at or near the deposition end of the housing 308A, 308B can confine the force exerted on the wire. The housing 308B having a converging cone shape can promote material compression, as shown in FIGS. 10A-10D. In some embodiments, the interior surface 316 of the housing 308B can define a truncated cone terminating at a material exit 317, as shown in FIG. 10C. The truncated cone can eliminate the need for the track 318. Shearing can occur within the housing which can reduce the downward force required to move the softened material.

Figure 10E:
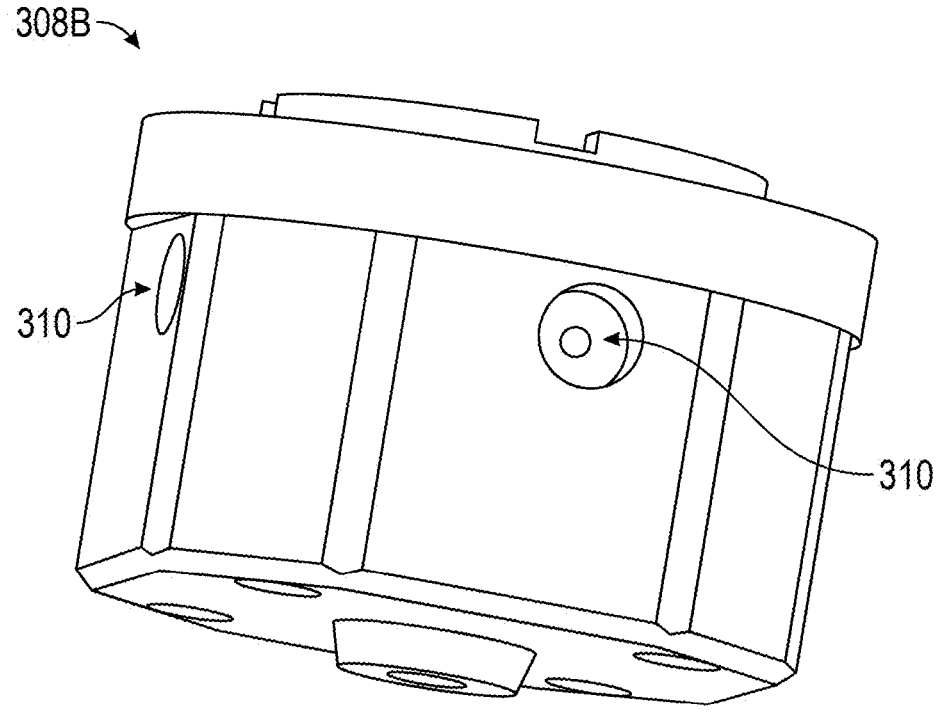
FIG. 10E is a perspective view of another example housing according to an embodiment of the present disclosure.
Figure 10F:
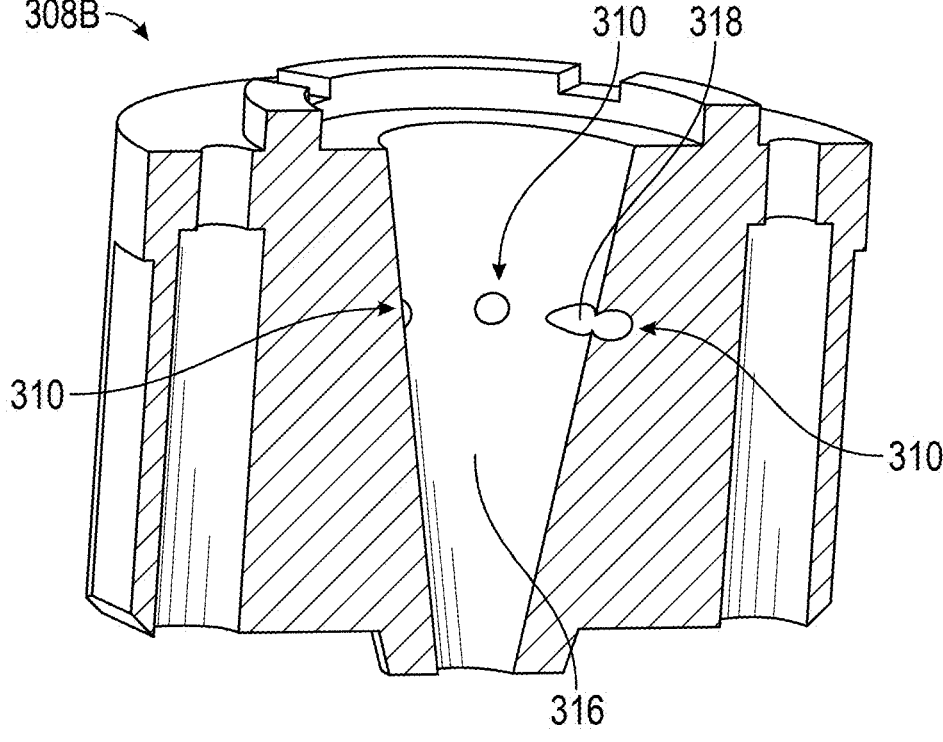
FIG. 10F is a cross-sectional view of the housing of FIG. 10E.

Referring now to the embodiment of FIGS. 10E and 10F, in some instances, the housing 308A, 308B may include more than one wire inlet 310, allowing multiple wires to be fed into the wire-feed system simultaneously. The wire inlets 310 may be circumferentially spaced about the housing 308A, 308B. In some embodiments, the wire inlets 310 may be uniformly spaced. In other embodiments, the wire inlets 310 may not be uniformly spaced. In some embodiments, one or more of the wire inlets 310 may include a track 318 formed in the interior surface 316 of the housing 308A, 308B. In some embodiments, the wire inlets 310 may be at the same height along the central axis of the housing 308A, 308B. In some embodiments, the wire inlets 310 may be at different heights along the central axis of the housing 308A, 308B.

In some embodiments, the material exit 317 can be surrounded by a deposition surface 319. The deposition surface 319 can be configured to contact one or more work surfaces as material is extruded from the material exit 317. In some embodiments, the deposition surface 319 is configured to contact a surface of a single work-piece. In some embodiments, the deposition surface 319 is configured to contact surfaces of two adjacent work-pieces. In some embodiments, the deposition surface 319 is configured to contact a previously deposited layer of material when depositing an additional layer of material.

Figure 11A:
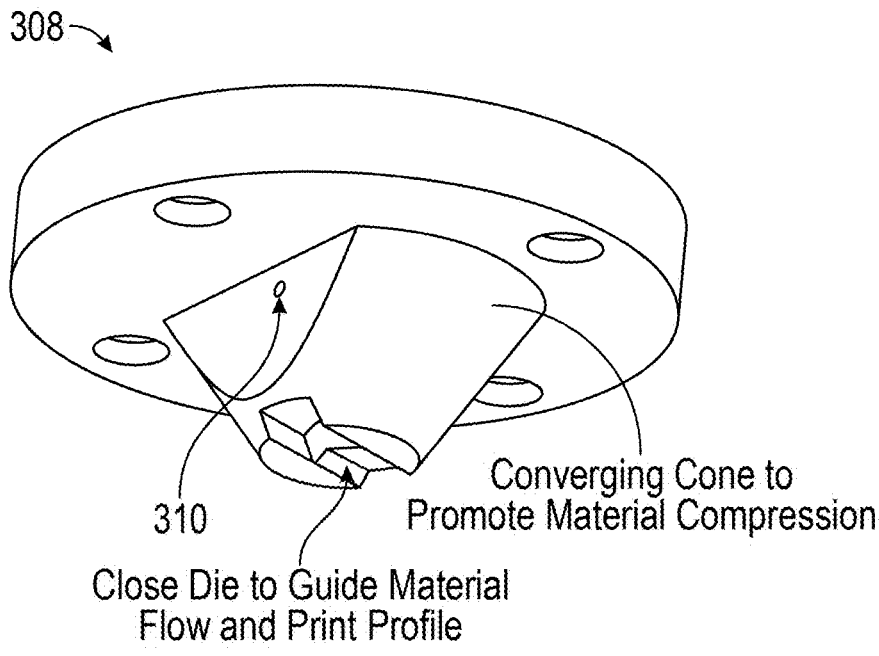
FIGS. 11A and 11B illustrate an example housing having a closed die according to an embodiment of the present disclosure.
Figure 11B:
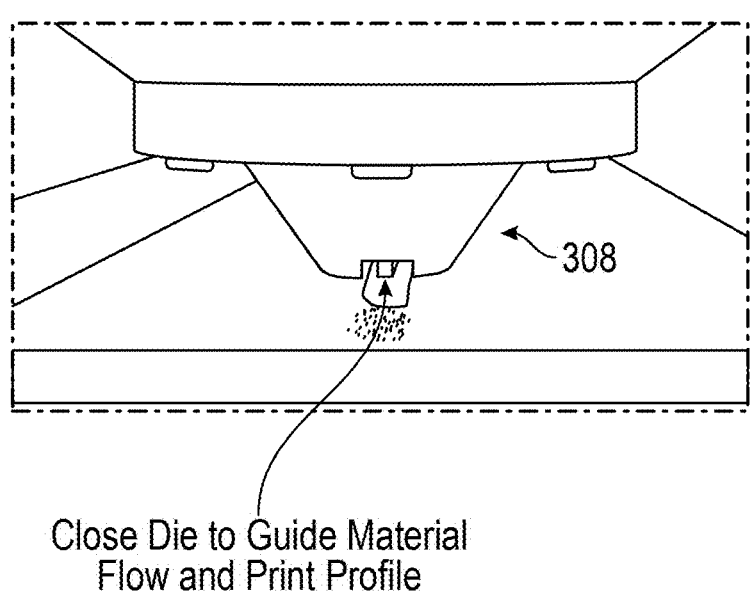
Figure 12A:
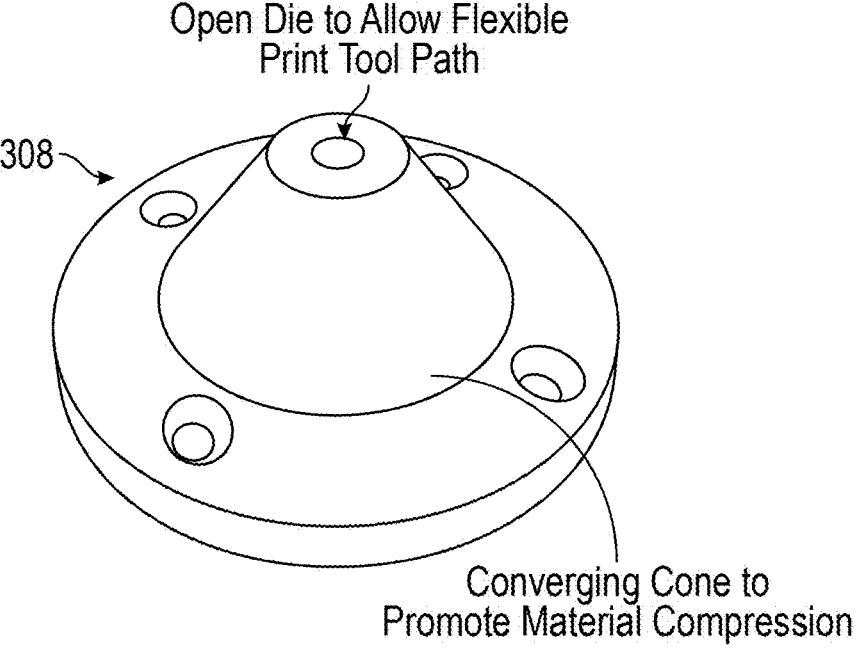
FIGS. 12A and 12B illustrate an example housing having an open die according to an embodiment of the present disclosure.
Figure 12B:
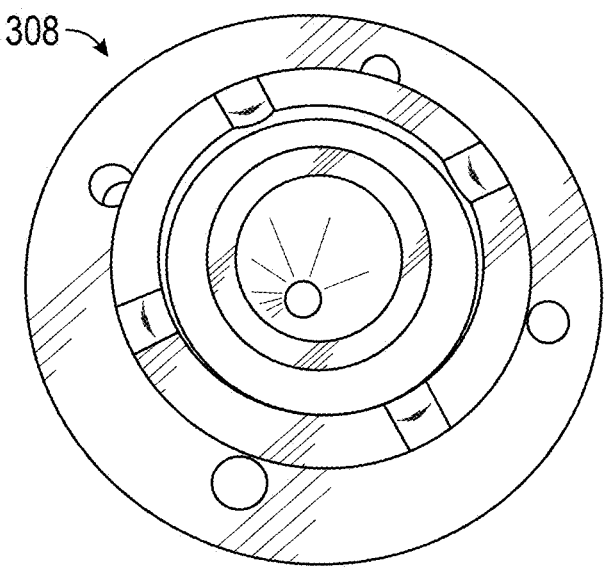
Figure 13A:
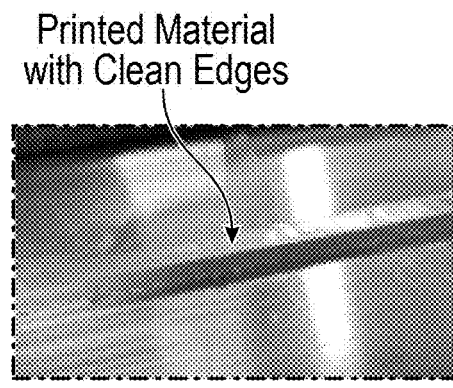
FIGS. 13A and 13B illustrate material deposited with a system having a closed die according to an embodiment of the present disclosure.
Figure 13B:
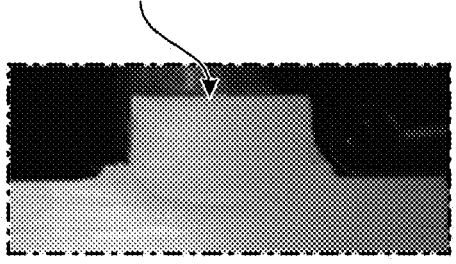
Figure 13C:
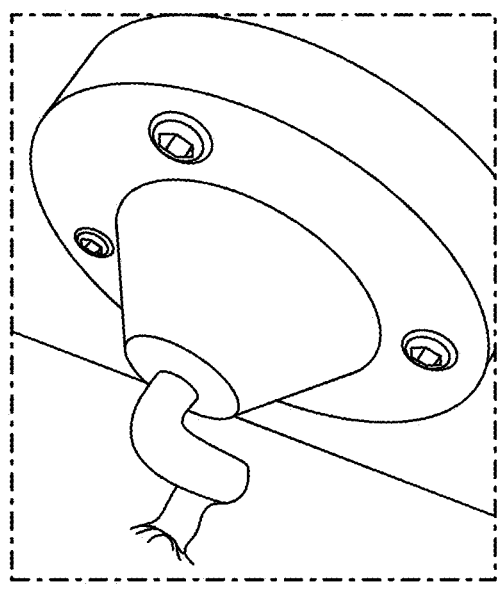
FIG. 13C illustrates material extruded through a system without substrate contact according to an embodiment of the present disclosure.
Figures 13D, 13E:
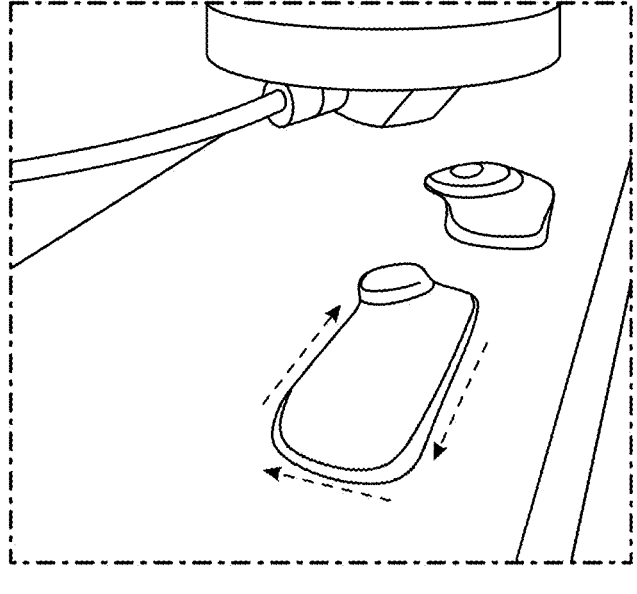
FIG. 13D illustrates material deposited with a system having an open die according to an embodiment of the present disclosure.
FIG. 13E illustrates residual plasticized material in a housing according to an embodiment of the present disclosure.
Figure 13F:
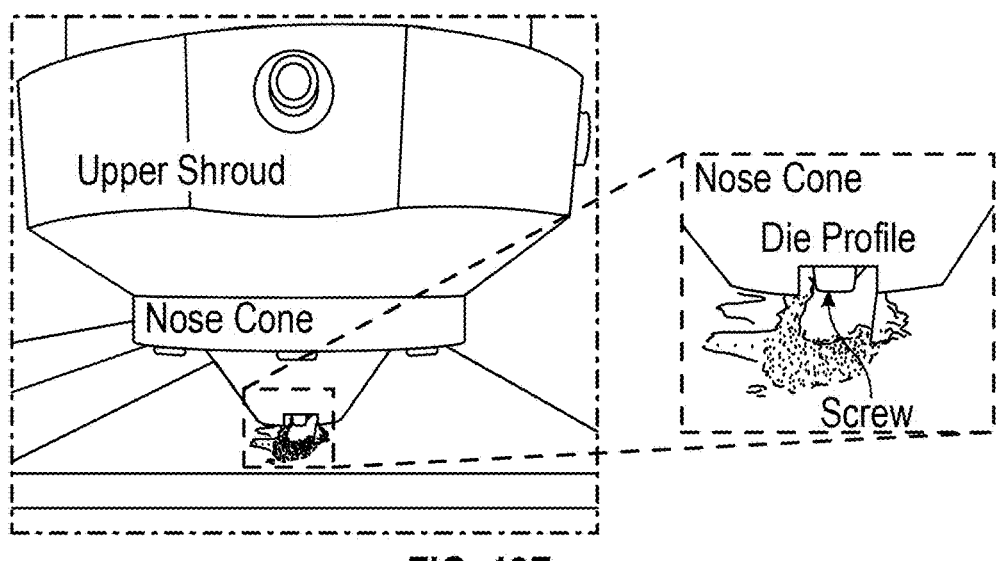
FIG. 13F illustrates a system with a semi-closed die depositing material according to an embodiment of the present disclosure.
Figure 13G:
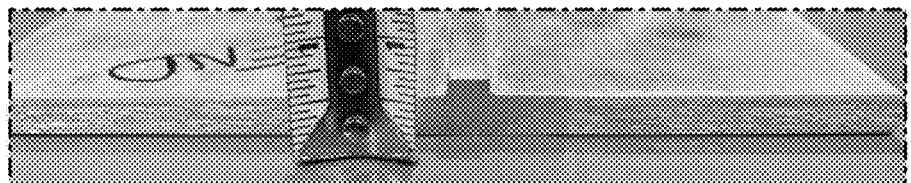
FIGS. 13G-13I illustrate material deposited with a system having a semi-closed die according to an embodiment of the present disclosure.
Figure 13H:
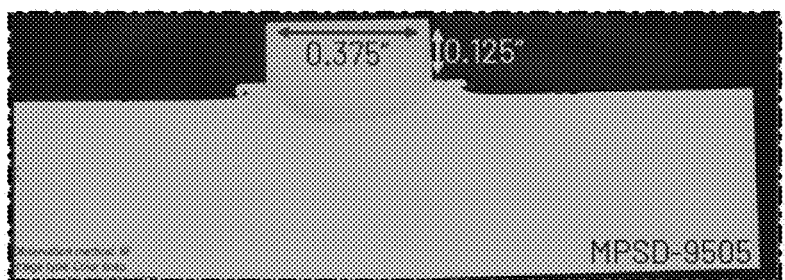
Figure 13I:
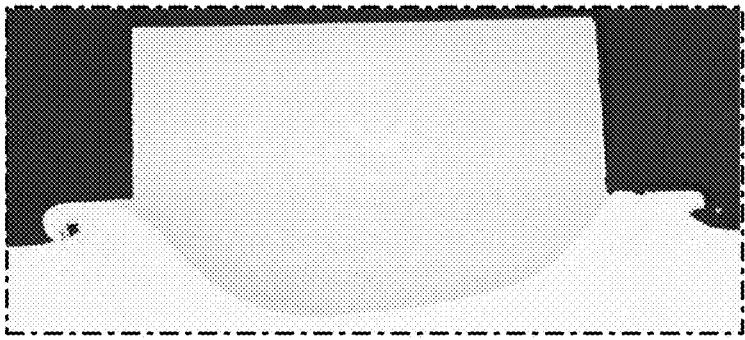

The housing 308B may include an open die (for example, shown in FIGS. 12A and 12B) or a closed die (for example, shown in FIGS. 11A and 11B). The use of an open die may allow for a flexible print tool path. If a closed die is used, the orientation of the die can be adjusted as needed. The use of a closed die may assist in guiding material flow and controlling the print or deposition profile. FIGS. 13A-13B illustrate an example closed die in use and example printed material with clean edges that was deposited using the example closed die. FIG. 13C illustrates an example extrusion of softened material without substrate contact, for example, without the die contacting a substrate during use. The example extrusion can be formed using an open die such as that illustrated in FIGS. 12A and 12B. FIG. 13D illustrates softened material deposited using an example open die. FIG. 13E illustrates an example open die with residual plasticized material. FIG. 13F illustrates an example system with a semi-closed die being used to deposit softened material. FIGS. 13G-13I illustrate example profiles of deposited material using embodiments of the wire-feed system. In FIG. 13F a profile of the deposited material generally corresponds to the profile of a semi-closed die according to an embodiment of the present disclosure.

Example Embodiments of Spindles According to the Present Disclosure

Figure 14:
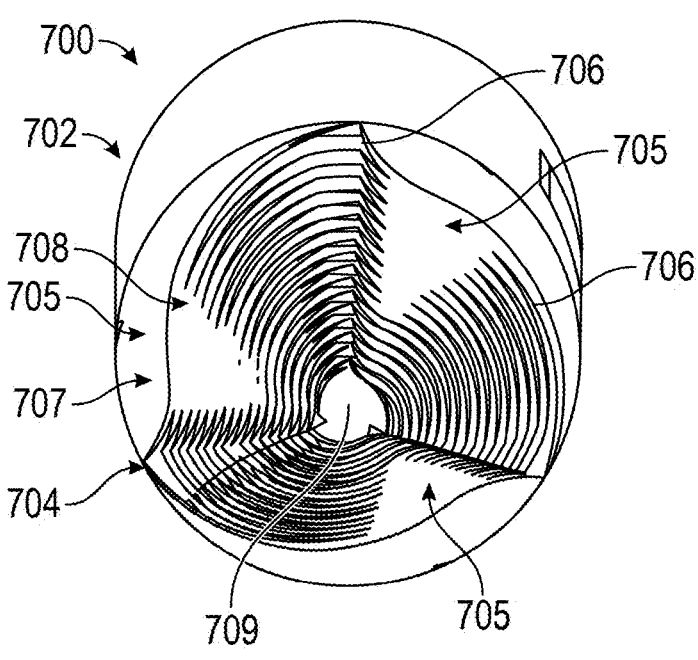
FIG. 14 is a bottom perspective view of an example spindle according to an embodiment of the present disclosure.
Figure 15:
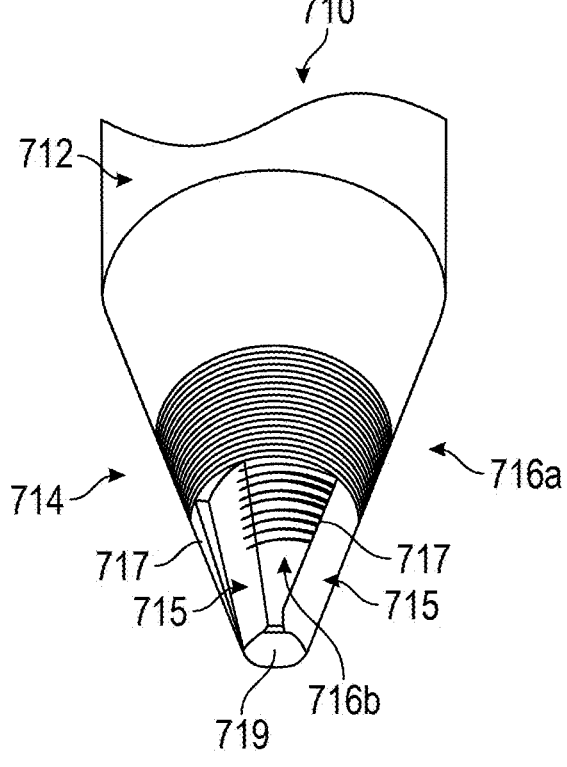
FIG. 15 is a perspective view of an example spindle according to an embodiment of the present disclosure.

FIGS. 14-18C illustrate views of example spindles configured to rotate within a housing according to embodiments of the present disclosure. As described above, the spindle may have a cone-shaped portion. The cone-shaped portion may be at the substrate-facing end or tip of the spindle. The cone-shaped portion of the spindle may include various surface features that assist in pulling the wire(s) into the gap between the inner surface of the housing and the outer surface of the spindle as it rotates. Example surface features include notches or slots having cutting edges. The notches or slots may be circumferentially spaced about the tip of the spindle. The spindle may also include horizontal threads. The horizontal threads may be positioned between adjacent notches. Horizontal threads may also be positioned in areas of the spindle not including notches. For example, horizontal threads may be positioned above the notches as shown in FIG. 15. In some instances, the threads may extend into the notches, for example, as shown in FIGS. 15, 16A, and 16B. The spindle (or referred to as a pin) may be configured to absorb forces during use. The surface features on the spindle can assist in pushing the wire and/or softened material down toward the deposition end of the housing as the spindle rotates. The spindle can assist in blending or bonding the softened material and substrate material. In some embodiments, the surface features can shear a wire being fed into the housing prior to plasticization of the wire.

FIG. 14 illustrates an example embodiment of a spindle 700 according to an embodiment of the present disclosure. Embodiments of the example spindle 700 shown in FIG. 14 may include any of the features of the systems discussed above or below, and should not be limited to the particular embodiments described. For example, features of one embodiment may be combined with features of another embodiment. The particular modifications shown in FIG. 14 will now be discussed in detail, and features not discussed will be understood to be similar, or identical, to those discussed elsewhere herein. Some or all of the modifications discussed with respect to FIG. 14 may be incorporated into the other embodiments described herein.

The spindle 700 includes a first portion 702 configured to be rotatably coupled with any of the systems described herein. The spindle 700 includes a second portion 704. The second portion 704 may be referred to as a tip. The second portion 704 may be configured to penetrate a work-piece, a panel, a substrate, or a previously-deposited layer of material during use.

The second portion 704 may have a conical shape. The conical shape of the second portion 704 of the spindle 700 can be configured to perform dual functions: move softened material toward the weld line and compress the softened material as it is moved toward the weld line. The second portion 704 may have a flat or planar tip 709. In some embodiments, the second portion 704 may have a twisting helical shape. The twisting helical shape may be formed by indentations 705 in the conical shape. The indentations 705 may form a spiral-like pattern. In some embodiments, the indentations 705 may have a smooth surface. In some embodiments, the indentations 705 may be defined on a first side by an abrupt edge 707 and by a curved edge 708 on a second side. The abrupt edge 707 may be sharp. The abrupt edge 707 may be referred to as a cutting edge. The second portion 704 may include a plurality of fine threads 706. The fine threads 706 may be generally perpendicular to a longitudinal axis of the spindle 700. The fine threads 706 may be positioned in sections adjacent the indentations 705. In some embodiments, the fine threads 706 may at least partially extend into the indentations 705. The abrupt edges 707 and the fine threads 706 may assist in breaking down wire or other material as it is fed into the system. The indentations 705 may assist in guiding material toward a deposition end of the system.

FIG. 15 illustrates another example embodiment of a spindle 710 according to an embodiment of the present disclosure. Embodiments of the example spindle 710 shown in FIG. 15 may include any of the features of the systems discussed above or below, and should not be limited to the particular embodiments described. For example, features of one embodiment may be combined with features of another embodiment. The particular modifications shown in FIG. 15 will now be discussed in detail, and features not discussed will be understood to be similar, or identical, to those discussed elsewhere herein. Some or all of the modifications discussed with respect to FIG. 15 may be incorporated into the other embodiments described herein.

The spindle 710 includes a first portion 712 configured to be rotatably coupled with any of the systems described herein. The spindle 710 includes a second portion 714. The second portion 714 may be referred to as a tip. The second portion 714 may be configured to penetrate a work-piece or panel during use.

The second portion 714 may have a conical shape. The second portion 714 may have a flat or planar tip 719. The second portion 714 may have a first set of threads 716a and a second set of threads 716b. The threads 716a and/or the threads 716b can be fine threads. The first set of threads 716a may be positioned around a middle portion of the second portion 714. The first set of threads 716a may be generally perpendicular to a longitudinal axis of the spindle 710. The first set of threads 716a may extend around the entire outer surface of the middle portion. An upper portion of the second portion 714 that connects to the first portion 712 may have a smooth surface. A lower portion of the second portion 714 between the flat or planar tip 719 and the middle portion may include a plurality of notches or slots 715. The notches or slots 715 may include cutting edges 717. The notches or slots 715 may be circumferentially spaced about the lower portion of the second portion 714. The notches or slots 715 may have smooth surfaces. Adjacent notches or slots 715 may be separated by threads of the second set of threads 716*b*. The second set of threads 716*b* may be generally perpendicular to a longitudinal axis of the spindle 710. The cutting edges 717 and threads 716*a*, 716*b* may assist in breaking down wire or other material as it is fed into the system. In some embodiments, the notches or slots 715 may have sets of threads positioned adjacent at least three edges of each notch. The notches or slots 715 may assist in guiding material toward a deposition end of the system.

Figure 16A:
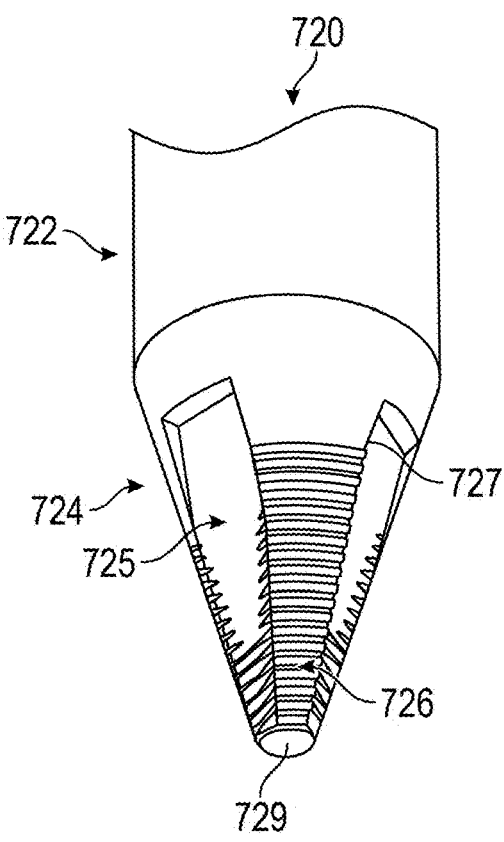
FIG. 16A is a perspective view of an example spindle according to an embodiment of the present disclosure.
Figure 16B:
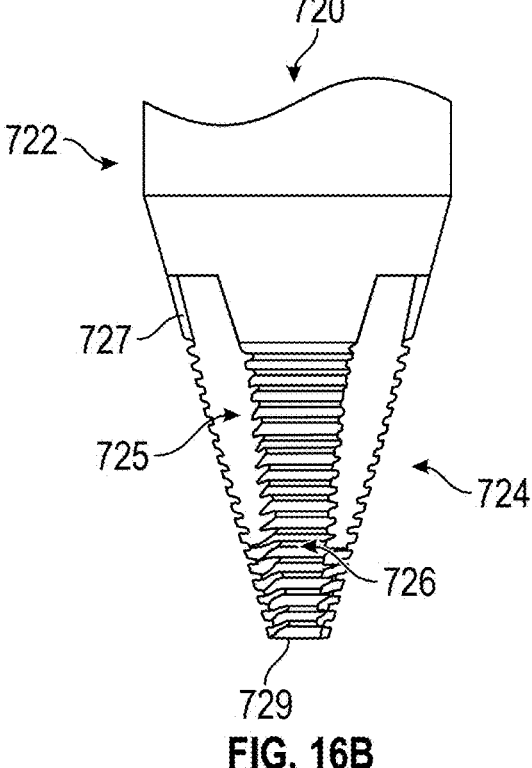
FIG. 16B is a side view of the spindle of FIG. 16A.
Figure 16C:
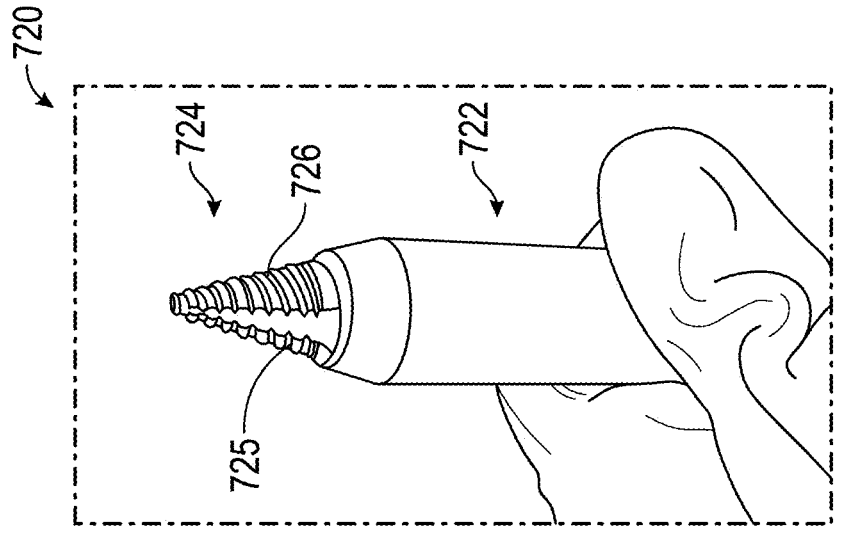
FIG. 16C is another perspective view of the spindle of FIG. 16A.

FIGS. 16A-16C illustrate another example embodiment of a spindle 720 according to an embodiment of the present disclosure. Embodiments of the example spindle 720 shown in FIGS. 16A-16C may include any of the features of the systems discussed above or below, and should not be limited to the particular embodiments described. For example, features of one embodiment may be combined with features of another embodiment. The particular modifications shown in FIGS. 16A-16C will now be discussed in detail, and features not discussed will be understood to be similar, or identical, to those discussed elsewhere herein. Some or all of the modifications discussed with respect to FIGS. 16A-16B may be incorporated into the other embodiments described herein.

The spindle 720 includes a first portion 722 configured to be rotatably coupled with any of the systems described herein. The spindle 720 includes a second portion 724. The second portion 724 may be referred to as a tip. The second portion 724 may be configured to penetrate a work-piece, a panel, a substrate, or a previously-deposited layer of material during use.

The second portion 724 may have a conical shape. The second portion 724 may have a flat or planar tip 729. The second portion 724 may include a plurality of notches or slots 725 separated by sets of threads 726. The threads 726 may be configured to mix and compress material within the housing as the spindle 720 rotates. The threads 726 may be referred to as bear claw threads. The threads 726 may be generally perpendicular to a longitudinal axis of the spindle 720. The notches or slots 725 may include cutting edges 727. The notches or slots 725 may be circumferentially spaced about the second portion 724. The notches or slots 725 may have smooth surfaces. The cutting edges 727 and the threads 726 may assist in breaking down wire or other material as it is fed into the system. The notches or slots 725 may assist in guiding material toward a deposition end of the system.

Figure 17:
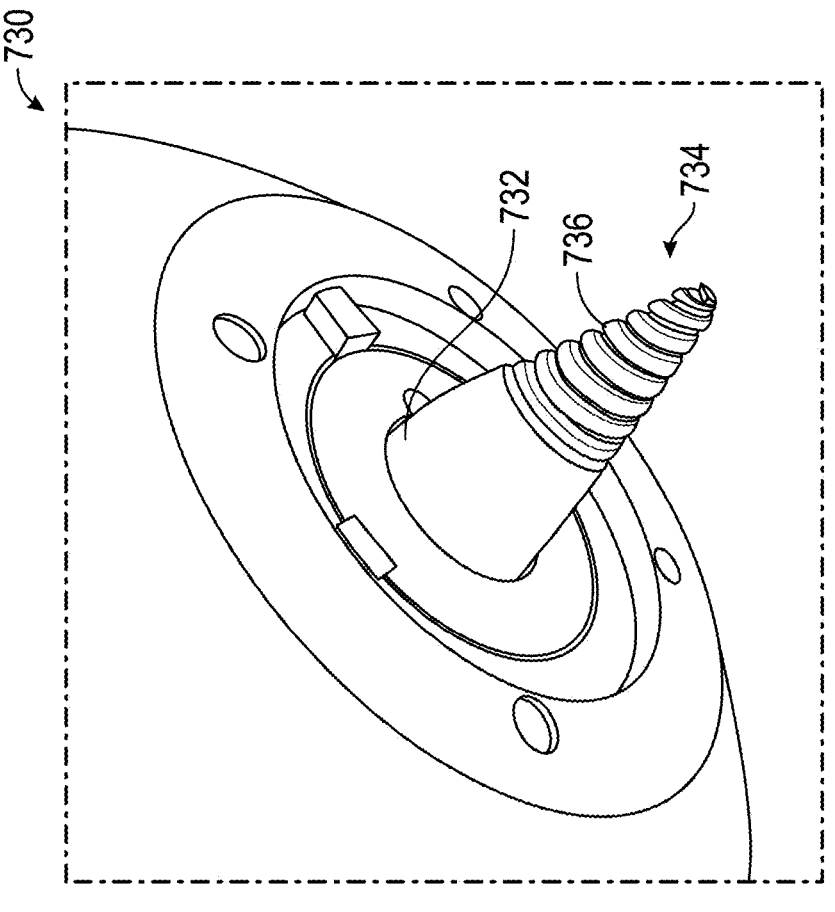
FIG. 17 illustrates an example spindle coupled with a system according to an embodiment of the present disclosure.
Figure 17:

FIG. 17 illustrates another example embodiment of a spindle 730 coupled with a system according to an embodiment of the present disclosure. Embodiments of the example spindle 730 shown in FIG. 17 may include any of the features of the systems discussed above or below, and should not be limited to the particular embodiments described. For example, features of one embodiment may be combined with features of another embodiment. The particular modifications shown in FIG. 17 will now be discussed in detail, and features not discussed will be understood to be similar, or identical, to those discussed elsewhere herein. Some or all of the modifications discussed with respect to FIG. 17 may be incorporated into the other embodiments described herein.

The spindle 730 includes a first portion 732 configured to be rotatably coupled with any of the systems described herein. The spindle 730 includes a second portion 734. The second portion 734 may have a conical shape. The second portion 734 may be referred to as a tip. The second portion 734 may be configured to penetrate a work-piece, a panel, a substrate, or a previously-deposited layer of material during use. The spindle 730 includes threads 736 extending around the second portion 734 in a spiral like fashion. The threads 736 may assist in breaking down wire or other material as it is fed into the system and may assist in guiding material toward a deposition end of the system.

Figure 18A:
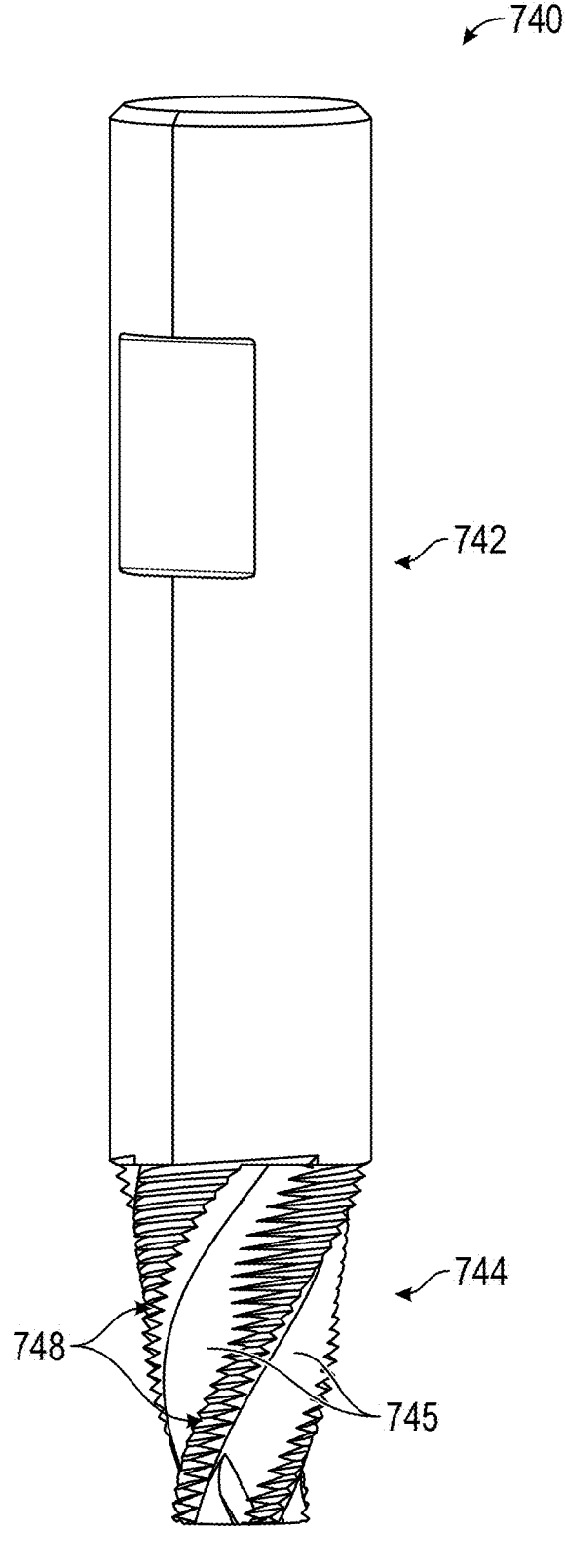
FIG. 18A is a perspective view of an example spindle according to an embodiment of the present disclosure.
Figure 18C:
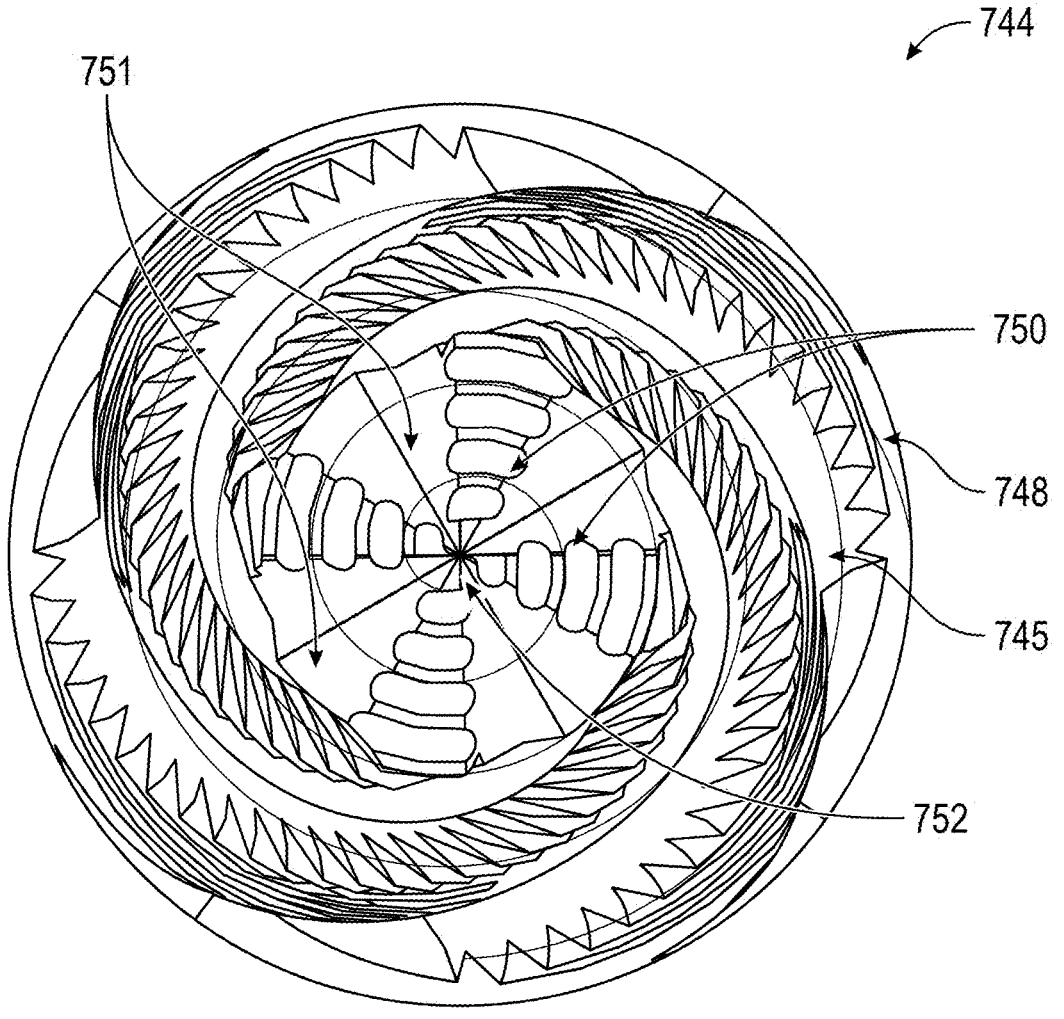
FIG. 18C is a bottom view of the spindle of FIG. 18A.

FIGS. 18A-18C illustrate another example embodiment of a spindle 740 according to an embodiment of the present disclosure. Embodiments of the example spindle 740 shown in FIGS. 18A-18C may include any of the features of the systems discussed above or below, and should not be limited to the particular embodiments described. For example, features of one embodiment may be combined with features of another embodiment. The particular modifications shown in FIGS. 18A-18C will now be discussed in detail, and features not discussed will be understood to be similar, or identical, to those discussed elsewhere herein. Some or all of the modifications discussed with respect to FIGS. 18A-18C may be incorporated into the other embodiments described herein.

The spindle 740 includes a first portion 742 configured to be rotatably coupled with any of the systems described herein. The spindle 740 includes a second portion 744. The second portion 744 may be referred to as a tip. The second portion 744 may be configured to penetrate a work-piece, a panel, a substrate, or a previously-deposited layer of material during use.

The second portion 744 may have a conical shape or tapered shape. The conical or tapered shape can improve the compression ratio of the feed material and more efficiently and effectively plasticize the feed material for deposition. The conical shape may assist in compressing the material and provide a higher pressure for compression. The tip of the conical shape may have the highest pressure. In some embodiments, the second portion 744 may have a twisting helical appearance.

The second portion 744 may include a plurality of large threads or flutes 745. The plurality of large threads 745 may be coarse threads. The plurality of large threads 745 may twist in a generally longitudinal direction from a first end 746 of the second portion 744 to a second end 747 of the second portion 744. Each large thread 745 may include a first portion that extends in a first direction away from a central axis of the spindle 740 and a second portion that extends in a second direction toward the central axis of the spindle 740. The plurality of large threads 745 may have smooth surfaces. The smooth surfaces may be positioned between adjacent edges of each large thread 745. Each large thread 745 may curve from a first position at the first end 746 of the second portion 744 to a second position at the second end 747 of the second portion 744. Each large thread 745 of the plurality of large threads 745 can curve from a first height at a first position along a longitudinal axis of the spindle 740 to a second height at a second position along the longitudinal axis of the friction spindle 704. The second position can be different than the first position. The plurality of large threads 745 may be configured to compress pieces of material and move the compressed pieces of material toward a deposition end of the system, for example toward a weld line.

The second portion 744 may include a plurality of threads 748. The plurality of threads 748 may be fine threads 748. The threads 748 may be knife like features. Each thread 748 may have a generally triangular shape. The threads 748 may extend generally perpendicular to a longitudinal axis of the spindle 740. The plurality of threads 748 may include cutting edges. The plurality of threads 748 may be positioned along edges of each large thread 745. The plurality of threads 748 may be recessed into surfaces of the plurality of large threads 745. The plurality of threads 748 may extend generally perpendicular to a longitudinal axis of the spindle 740. The plurality of threads 748 may extend generally parallel to a surface of a work-piece. The plurality of threads 758 may have a generally triangular cross-sectional shape. The plurality of threads 748 may have sharp edges configured to break material fed into the system into small pieces of material or fine particles. The large threads 745 may then compress the small pieces of material or fine particles as described above.

The second portion 744 may include a plurality of teeth 750 and a plurality of channels 751 at a tip 752 of the second portion 744. The teeth 750 and/or channels 751 may be configured to guide flow of material toward a center of the tip 752 of the second portion 744. The channels 751 may encourage material flow to the center of the tip 752. The channels 751 may open to the tip 752. In the non-limiting embodiment illustrated in FIGS. 18A-18C, the second portion includes four sets of teeth 750 separated by four channels 751. Other configurations can be suitably implemented. Sets of adjacent teeth 750 may be separated by one of the channels 751. The channels 751 may comprise smooth surfaces. The teeth 750 may comprise fine threads. The fine threads of the teeth 750 may assist in breaking down structures that the teeth 750 come in contact with and/or assist in the plasticizing of material. The teeth 750 may also be advantageous in preventing voids along weld lines or weld beads. The teeth 750 may be configured to plasticize and compress material along and/or toward a weld line. Embodiments of systems and methods according to the present disclosure that include large threads, fine threads, and/or a plurality of teeth and channels in the spindle tip can advantageously improve material flow from the housing to the weld zone, for example by efficiently and consistently moving softened material toward the weld line while also compressing the softened material as it is moved toward the weld line. Such improvements to material flow can result in a reduction of the force required to move the housing in the direction of travel along the weld line. Embodiments of systems and methods according to the present disclosure that include large threads, fine threads, and/or a plurality of teeth and channels in the spindle tip can also move softened material efficiently and consistently toward a center of the weld line, generating a high pressure zone with the highest pressure at the tip of the spindle. Such high pressure zones can lower the resistance experienced by the housing as it moves in the direction of travel along the weld line, further reducing the force required to move the housing along the direction of travel. Advantageously, such embodiments can also reduce or eliminate the formation of areas of low pressure behind the housing as it moves during the deposition process, thereby reducing or eliminating the formation of voids or areas of material starvation in the finished weld profile.

In some embodiments, the tip 752 of the second portion 744 may include a substantially flat surface. In some embodiments such as that illustrated in FIGS. 18A-18C, the tip 752 of the second portion 744 may not include a substantially flat surface. In some embodiments, the tip 752 may not be flat. In some embodiments, the tip 752 of the second portion 744 may be pointed.

Figure 19A:
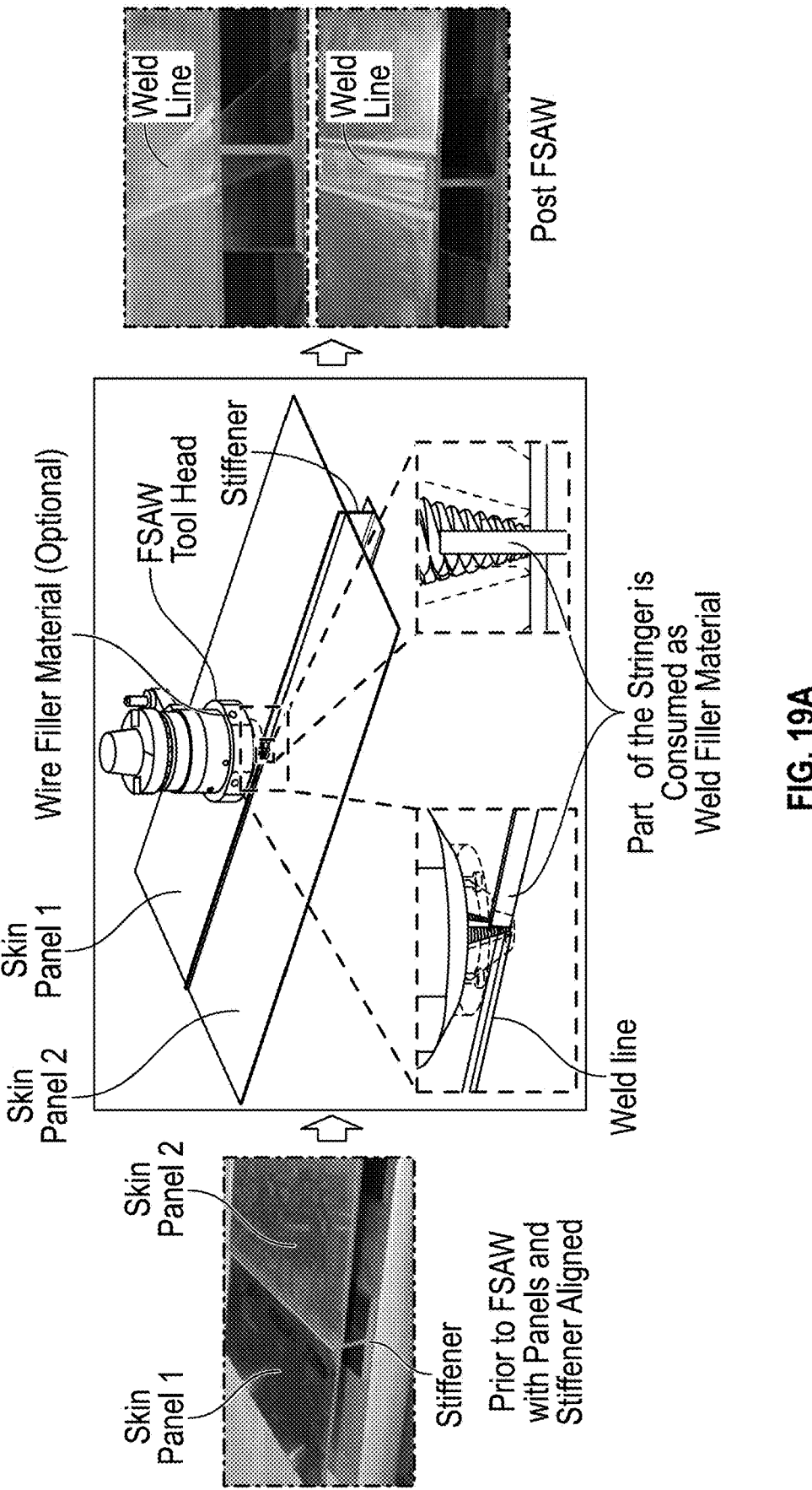
FIG. 19A illustrates an example method of joining two work-pieces and a stiffener according to an embodiment of the present disclosure.

Example Embodiments of Systems and Methods for Joining Panels and Integrated Stiffeners Systems and methods according to the present disclosure may be used to join two panels while also joining an integrated stiffener to the two panels as shown in FIG. 19A. A first panel and a second panel can be positioned adjacent to each other with a stiffener positioned between adjacent edges of the first panel and the second panel. A system according to the present disclosure can be configured to plasticize a portion of the stiffener into softened material and to deposit the softened material along a weld line to join the adjacent edges of the first panel and the second panel and the stiffener. In some embodiments, the system can be configured to plasticize additional material, such as material in the form of a wire or pellets, fed into housing into additional softened material, and to deposit the additional softened material along the weld line. Accordingly, in some embodiments, a spindle according to the present disclosure can plasticize and deposit material from two different feed sources simultaneously. Systems and methods according to embodiments of the present disclosure can advantageously lower costs, reduce lead time, and be used to efficiently manufacture large structures, for example propellent tanks and other structures for use in space.

As shown below in FIG. 19A, a first panel ("Skin Panel 1") and a second panel ("Skin Panel 2") can be aligned and positioned next to each other. A stiffener can be positioned between adjacent edges of Skin Panel 1 and Skin Panel 2. A portion of the stiffener can extend above the upper surfaces of the panels. For example, a first, generally vertical, portion of the stiffener can protrude above the generally horizontal upper surfaces of the panels, and a second portion of the stiffener can be positioned below the generally horizontal bottom surfaces of the panels. The panels and the stiffener can be held in place relative to each other, for example clamped together, using any suitable mechanism to maintain alignment of the panels and the stiffener.

A system according to the present disclosure can be used to join the panels and the stiffener. As described above, in some instances, the system can be wire fed or be used with other filler material (for example, pellets, powder, or feed bars). The use of filler material can form a weld line and join multiple panels or work-pieces into an integrated stiffened structure. The system can include any of the housings and spindles described herein, to soften and deposit the filler material.

As the system advances over the adjacent edges of the panels and the stiffener, softened filler material can be deposited along a weld line to assist in joining the panels and stiffener. Additionally or alternatively, the system can consume and soften the portion of the stiffener extending above the upper surfaces of the panels. The consumed and softened portion of the stiffener can then be used alone or in combination with the softened filler material to assist in joining the panels and the stiffener. In some instances, portions of the panels can also be softened by the system and used in the joining process. In non-limiting examples of the present disclosure, the system includes a spindle 740 that includes a tip 752 having a diameter that is approximately equal to the width of the stiffener entering the housing of the system.

FIG. 19A illustrates an example stiffener positioned relative to the first panel and the second panel prior to an FSAW process according to an embodiment of the present disclosure. FIG. 19A also illustrates an example weld line after the joining of the panels and the stiffener using the FSAW process. As shown, the weld line has a generally flat or planar profile. The first portion of the stiffener is no longer extending vertically above the upper surfaces of the panels, and the panels and the stiffener are joined to form an integrated structure.

Figure 19B:
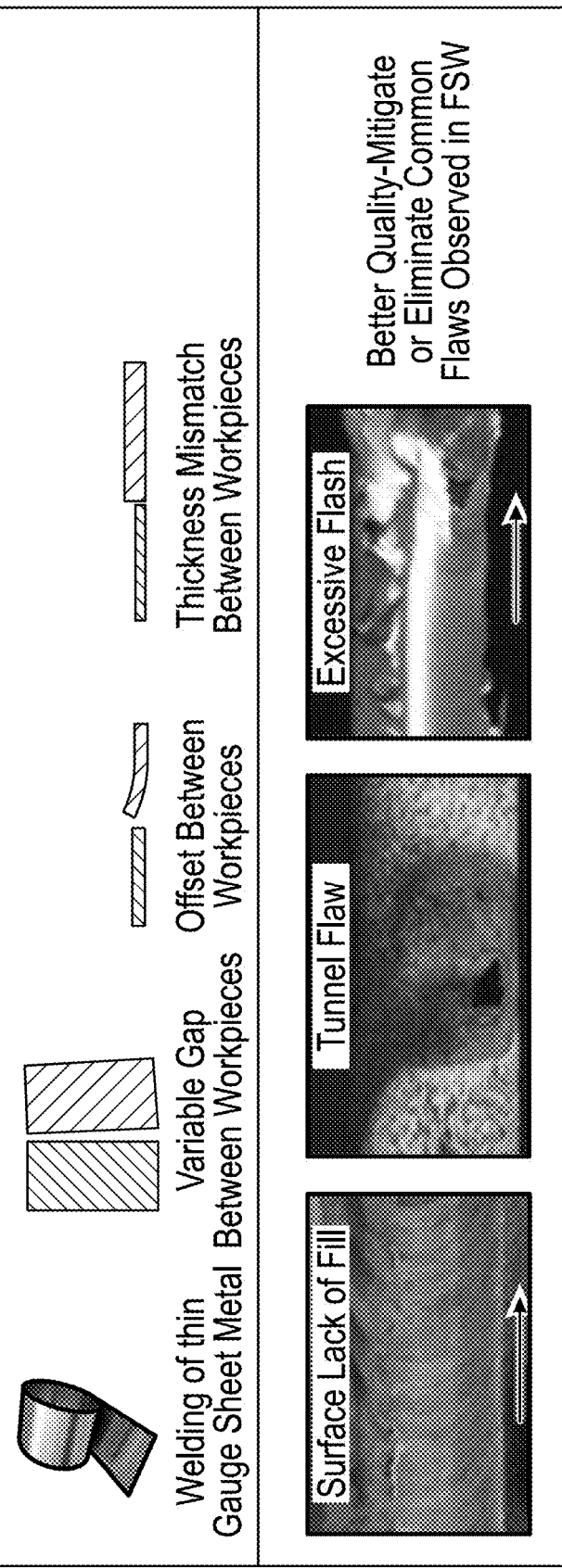
FIG. 19B illustrates advantages of the method of FIG. 19A.

As illustrated in FIG. 19B, embodiments of the methods described herein can enable welding of thin gauge panels, accommodate large tolerances and mismatches, and enable welding of multiple pieces at the same time. In some embodiments, the methods according to the present disclosure offer a more forgiving platform for joining components. For example, embodiments of the present disclosure can join a first work-piece and a second work-piece that have a variable size gap between adjacent edges of the first work-piece and the second work-piece. As another example, embodiments of the present disclosure can join a first work-piece and a second work-piece that are vertically offset relative to each other. As yet another example, embodiments of the present disclosure can join a first work-piece and a second work-piece where portions of either or both of the work-pieces are not substantially planar. As still another example, embodiments of the present disclosure can join a first work-piece having a portion with a first thickness and a second work-piece having a portion with a second thickness that is different than the first thickness. The methods can also allow for welding of dissimilar materials. The methods may produce robust joints that are consistently stronger than the acreage area of the structure, resulting in a more reliable process. Embodiments of systems and method according to the present disclosure can mitigate or eliminate flaws commonly observed in FSAM and FSW processes, for example surface lack of fill, tunnel flaws, and excessive flash. These and other advantages can be achieved in embodiments that integrate a stiffener with two work-pieces as well as embodiments that do not integrate a stiffener with two work-pieces.

Figure 20:
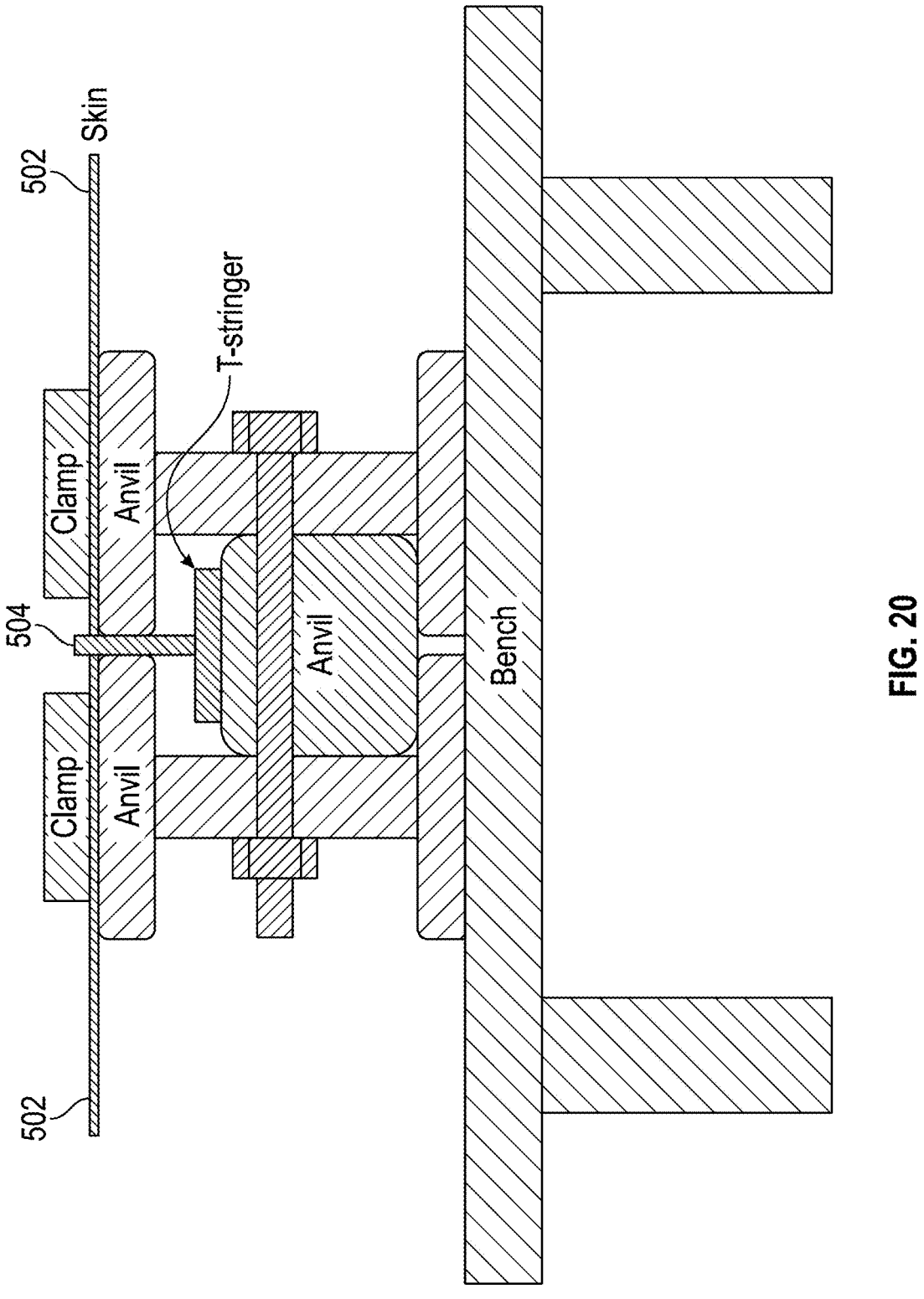
FIG. 20 is a schematic illustration of manufacturing setup for joining two work-pieces and a stiffener.

FIG. 20 illustrates two panels 502 and a structure shown as a stiffener 504 positioned prior to using a system according to the present disclosure to join the two panels 502 and the stiffener 504. In some instances, the stiffener 504 can be a T-shaped stringer. It will be understood that embodiments of the present disclosure are not limited to joining stiffeners to work-pieces, and that many suitable structures can be joined to work-pieces using systems and methods described herein. The panels 502 can be positioned on surfaces of anvils. The anvils can support the panels 502. One or more clamps can be used to secure the panels 502 to the anvils. The stiffener 504 can be positioned on an additional anvil and positioned such that a section of the stiffener 504 is positioned between the panels 502 as described herein. A first portion of the section of the stiffener 504 that is positioned between the panels 502 can extend above upward-facing surfaces of the panels 502. Although the system of FIG. 20 illustrates the panels 502 as being generally planar panels oriented generally horizontally, it will be understood that embodiments of the present disclosure can join work-pieces that are not generally planar (for example, work-pieces having a curved profile) and can join work-pieces that are not oriented generally horizontally (for example, work-pieces inclined at an angle relative to horizontal and/or oriented generally vertically).

FIGS. 21A-24C illustrate an example system 600 according to an embodiment of the present disclosure. Embodiments of the example housing 608 and the example spindle 612 shown in FIGS. 21A-24C may include any of the features of the systems discussed above or below, and should not be limited to the particular embodiments described. For example, features of one embodiment may be combined with features of another embodiment. The particular modifications shown in FIGS. 21A-24C will now be discussed in detail, and features not discussed will be understood to be similar, or identical, to those discussed elsewhere herein. Some or all of the modifications discussed with respect to FIGS. 21A-24C may be incorporated into the other embodiments described herein.

Figures 21A, 21B:
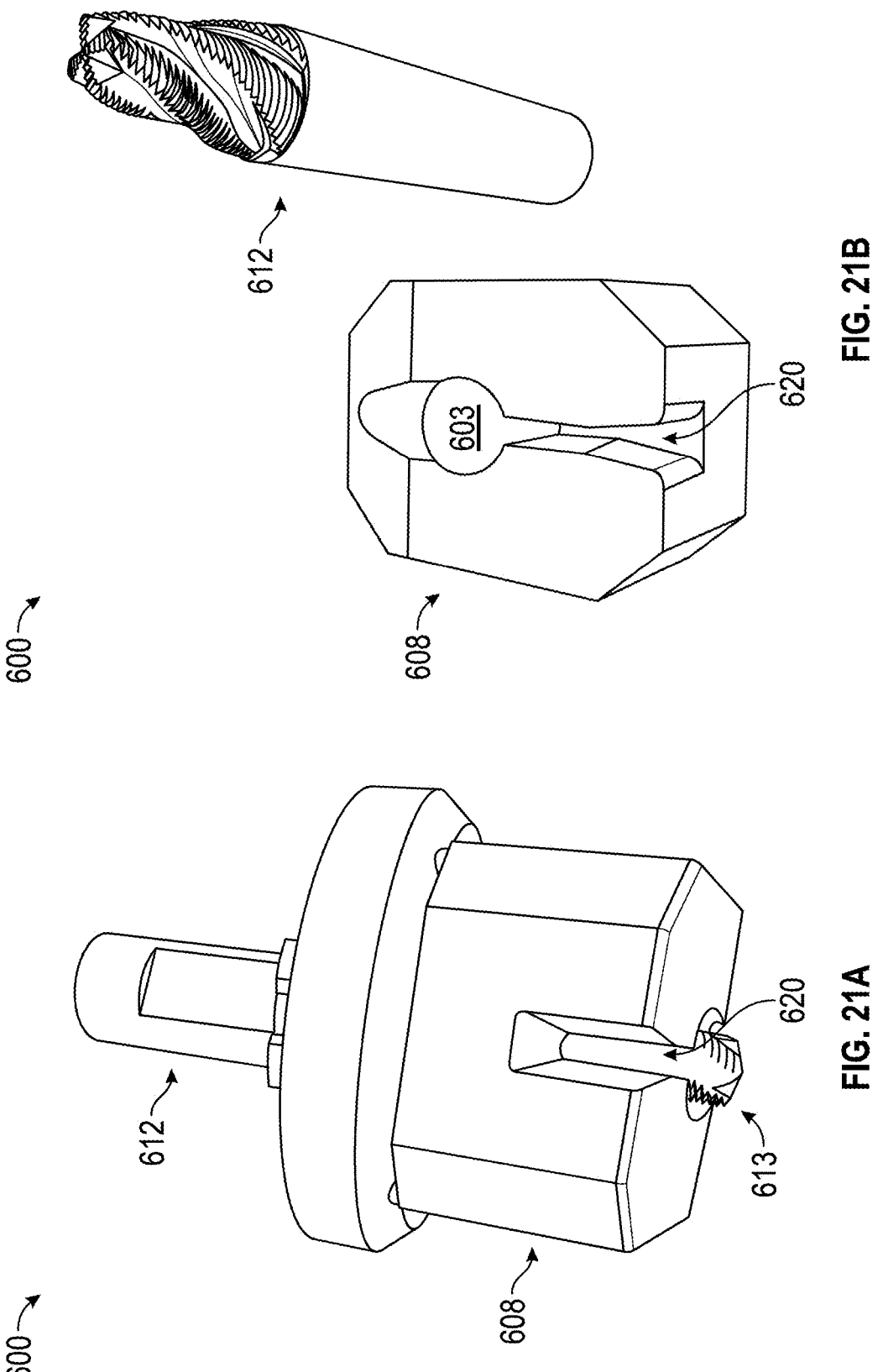
FIG. 21A is an example system including a nosecone and a spindle received within a channel of the nosecone according to an embodiment of the present disclosure.
FIG. 21B illustrates the spindle removed from the nosecone of FIG. 21A.

The system 600 may include a housing 608 and a spindle 612. The housing 608 may also be referred to as a cartridge, a nosecone, a dispensing nozzle, a shoulder, or a stator. The spindle 612 may also be referred to as a screw or a pin. The housing 608 may have a sidewall that extends from a first end 601 to a second end 602. The housing 608 and the spindle 612 may form a closed cavity for plasticizing material at high pressure. The housing 608 may include a channel 603. The channel 603 may extend along a longitudinal axis A6 of the housing 608. The channel 603 can extend from the first end 601 of the housing 608 to the second end 602 of the housing 608. The second end 602 may also be referred to as a deposition end. The spindle 612 may be positioned within the channel 603 of the housing 608, as shown in FIG. 21A. A tip 613 of the spindle 612 may extend out of the housing 608 when positioned therein. The first end 601 may couple the housing 608 to a robotic arm. The second end 602 may be a deposition end for depositing softened material.

The second end 602 of the housing 608 may include a deposition surface having a first portion or surface 617 and a second portion or surface 618. The first surface 617 may be a trailing surface. When the housing 608 is oriented such that a central axis A6 of the housing 608 is generally perpendicular to a surface of a work-piece or panel, the first surface 617 may be generally parallel to surfaces of the panels to be joined. When the housing 608 is oriented such that a central axis A6 of the housing 608 is generally perpendicular to a surface of a work-piece or panel, the second surface 618 may be angled relative to the first surface 617 and/or the surfaces of the panels to be joined. When the housing 608 is oriented such that a central axis A6 of the housing 608 is generally perpendicular to a surface of a work-piece or panel, the second surface 618 may not be parallel to the surfaces of the panels to be joined. The first surface 617 may be in a first plane and the second surface 618 may be in a second plane different than the first plane.

The housing 608 may include a slot 620. The slot 620 may extend from an outer sidewall 624 of the housing 608 to the channel 603. A first edge of the second surface 618 may contact the first surface 617 and a second edge of the second surface 618 may contact a portion of the outer sidewall 624 that the slot 620 extends through. The slot 620 may include a first opening or slot entrance in the outer sidewall 624 of the housing and a second opening or slot exit in a wall of the channel 603. A passageway may connect the first opening and the second opening. The slot 620 may be configured to receive a portion of a structure, for example, a portion of a stiffener or a stringer. Example stiffeners include flat stiffeners, angled stiffeners, tee-shaped stiffeners, double-sided stiffeners, and multi-leg stiffeners.

In some embodiments, for example as shown in FIGS. 22A, 22B, 23A, and 23B, the passageway of the slot 620 may have a constant width W1 as it extends from the outer sidewall 624 of the housing 608 to the channel 603. The width W1 may correspond to a width of the structure (for example, a stiffener) that is received into the slot 620. The width W1 may be about 0.05 inches, 0.10 inches, 0.15 inches, 0.20 inches, 0.25 inches, 0.30 inches, 0.35 inches, 0.40 inches, 0.45 inches, 0.50 inches, or more or less, or any value in between. In one non-limiting example, the width W1 is approximately 0.25 inches and is configured to receive a structure (for example, a stiffener) having a width of approximately 0.25 inches.

Figures 22A, 22B, 22C:
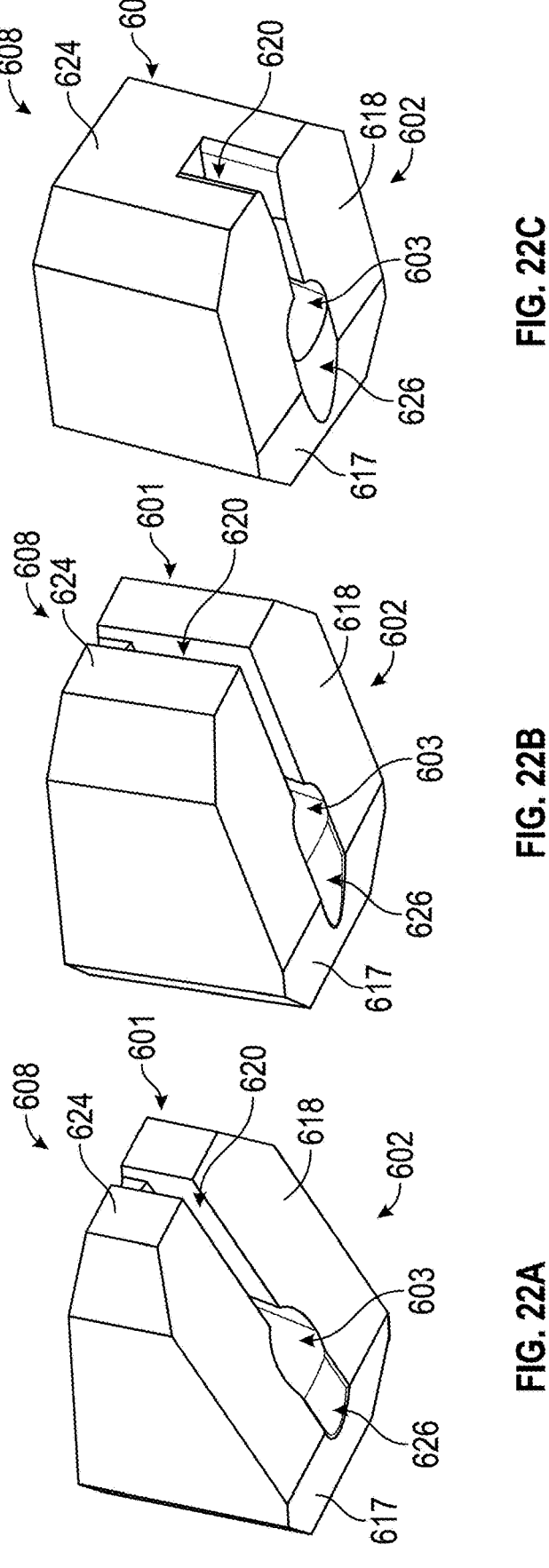
FIG. 22A is a perspective view of a nosecone having a slot according to an embodiment of the present disclosure.
FIG. 22B is a perspective view of a nosecone having a slot according to an embodiment of the present disclosure.
FIG. 22C is a perspective view of a nosecone having a slot according to an embodiment of the present disclosure.
Figures 23A, 23B, 23C:
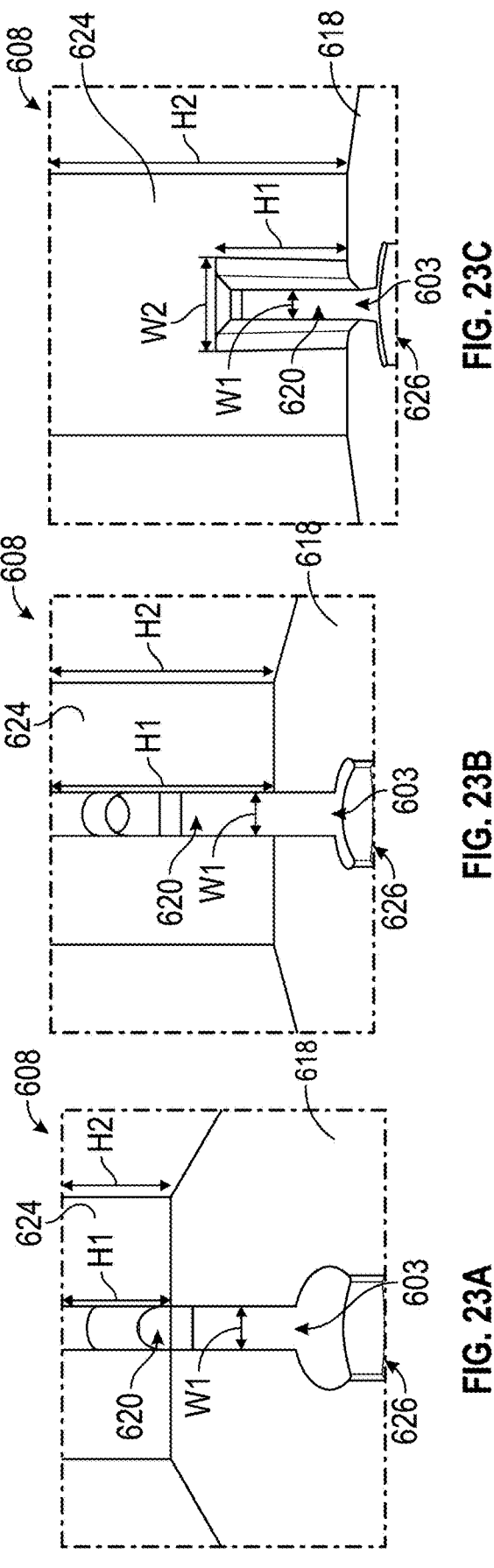
FIG. 23A is a front view of the nosecone of FIG. 22A.
FIG. 23B is a front view of the nosecone of FIG. 22B.
FIG. 23C is a front view of the nosecone of FIG. 22C.
Figures 24A, 24B, 24C:
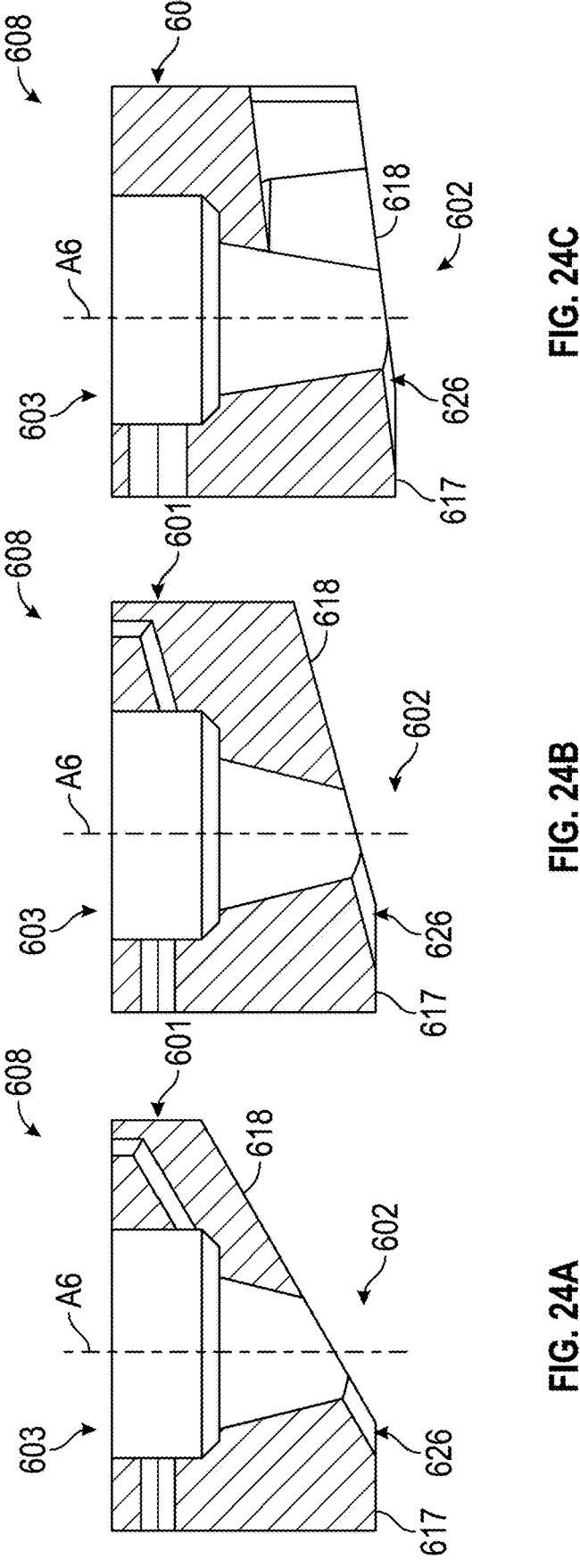
FIG. 24A is a side cross-sectional view of the nosecone of FIG. 22A.
FIG. 24B is a side cross-sectional view of the nosecone of FIG. 22B.
FIG. 24C is a side cross-sectional view of the nosecone of FIG. 22C.

In some embodiments, for example as shown in FIGS. 22C and 23C, the passageway of the slot 620 may have a width that decreases from a width W2 to a width W1 as the passageway extends from the outer sidewall 624 of the housing 608 to the channel 603. The width W2 may exceed a width of the structure (for example, a stiffener) that is received into the slot 620. In some embodiments, for example as shown in FIGS. 22C and 23C, the passageway of the slot 620 may have a first portion that has a gradually narrowing width and a second portion that has a constant width. The width W2 may be about 15 percent to 25 percent larger than a structure to be received in the slot 620. For example, about 15 percent, about 20 percent, about 25 percent, or more or less or any value in between. The slot 620 having the width W2 may be configured to prevent the structure being received in the slot 620 from being heated too soon. The slot 620 having the width W2 may be configured to prevent the slot 620 from being jammed or clogged by a structure received in the slot 620 during use. The slot 620 having a width change from W2 to W1 can be configured to ensure optimal feeding of material into the slot 620.

The slot 620 may be configured to reduce side-to-side motion of the housing 608 as the housing 608 is advanced during use. For example, the slot 620 may reduce motion perpendicular to or lateral to a direction the housing 608 is advanced. Accordingly, in some examples, the slot 620 can advantageously be configured to perform a dual function: act as a guide to feed a structure, such as a stiffener or stringer, into the housing (a process which can cause the housing to vibrate and move side-to-side), while simultaneously stabilizing the housing to reduce such vibrations and side-to-side motion of the housing.

In some embodiments, for example as shown in FIGS. 23A and 23B, the slot entrance may have a height H1 that is the same as a height H2 of the portion of the outer sidewall 624 in which the slot 620 is formed. In some embodiments, for example as shown in FIG. 23C, the slot entrance may have a height H1 that is less than the height H2 of the portion of the outer sidewall 624 in which the slot 620 is formed. In some embodiments, the height of the passageway of the slot 620 may decrease from the slot entrance to the slot exit.

The housing 608 may include a recess 626 in one or both of the first surface 617 and the second surface 618. The recess 626 may include a curved surface, or any other suitably shaped surface profile. For example, the recess 626 may include a generally rectangular cross-sectional profile (yielding a weld line such as that shown in FIG. 19A) or a generally square cross-sectional profile. The recess 626 may be positioned opposite the slot 620. The recess 626 may extend from a perimeter of the channel 603 toward the trailing end of the housing 608. The recess 626 may be formed in the trailing end of the surface 617 of the housing 608. The recess 626 may be configured to shape an outer profile of a weld line as the housing 608 is advanced along the weld line between the first panel and the second panel. As shown in FIGS. 23A, 23B, and 23C, a height of the recess 626 can be varied to form a desired weld line profile.

Figure 25A:
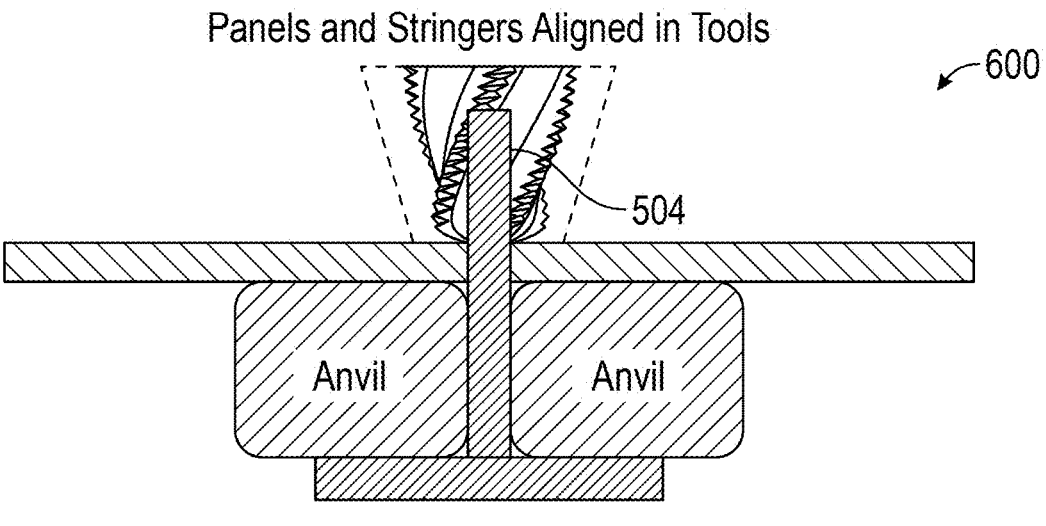
FIG. 25A is a schematic illustration of a system comprising a nosecone and spindle joining two work-pieces and a stiffener according to an embodiment of the present disclosure.
Figure 25B:
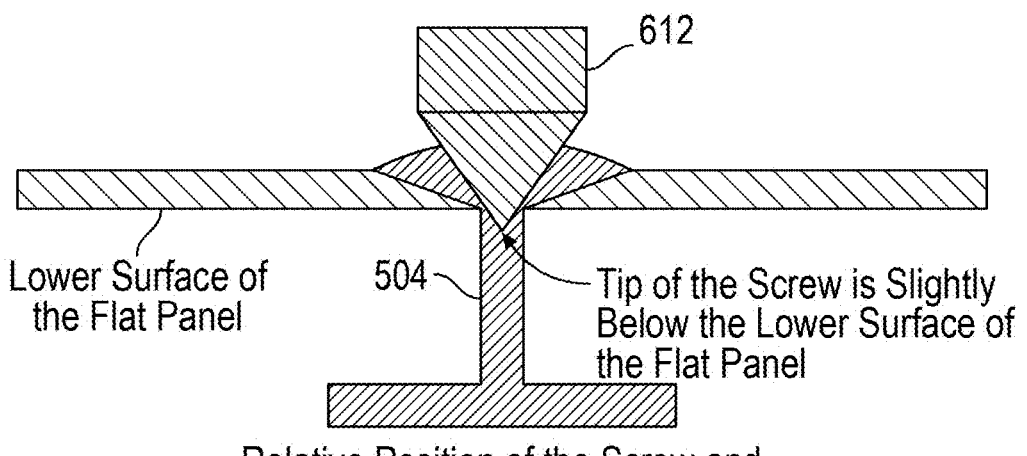
FIG. 25B is a schematic illustration of a spindle with a nosecone removed for illustrative purposes when joining two work-pieces and a stiffener according to an embodiment of the present disclosure.
Figure 25C:
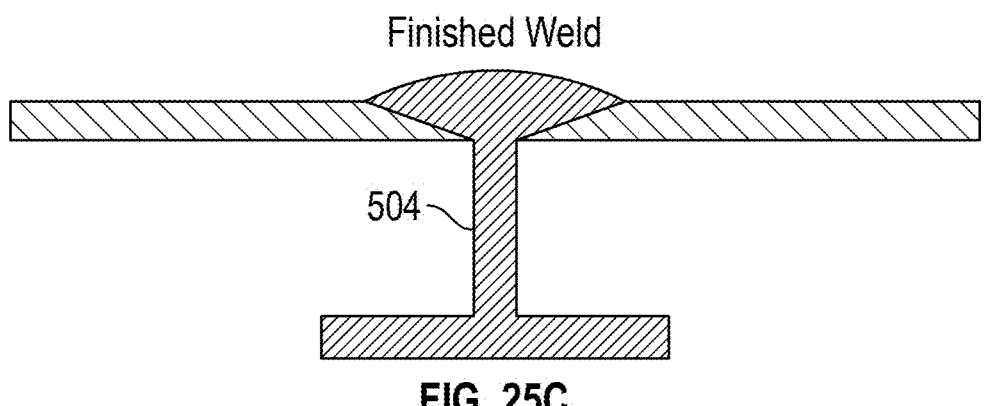
FIG. 25C is a schematic illustration of a cross section of a weld line after joining two work-pieces and a stiffener according to an embodiment of the present disclosure.

FIGS. 25A-25C schematically illustrate portions of the system 600 during use, for example as the weld line is formed. As shown in FIG. 25A, the system 600 can receive a portion of the stiffener 504, for example, through the slot 620 of the housing 608. As shown in FIG. 25B, a tip of the spindle 612 can penetrate between the panels and below a plane formed by bottom surfaces of the panels. In some embodiments, adjacent edges of adjacent panels can be beveled edges, as shown in FIGS. 25B and 25C. FIG. 25C illustrates an example weld profile formed by the curved recess 626. A curved weld profile can advantageously reduce or eliminate abrupt changes in the profile. The reduction or elimination of abrupt changes can prevent or reduce the risk of premature failure of the weld line. As described above, it will be understood that systems and methods according to the present disclosure can form welds having non-curved profiles.

As shown in FIG. 25C, systems and methods according to the present disclosure can mold-forge a finished weld bead having a gradual transition between the weld profile and the upper surface of the work-piece or panel. The gradual transition can reduce or eliminate abrupt changes in thickness of the finished weld bead. The reduction or elimination of sharp corners in the finished weld bead can reduce or eliminate areas where stress tends to concentrate and generate premature failure.

Figure 26A:
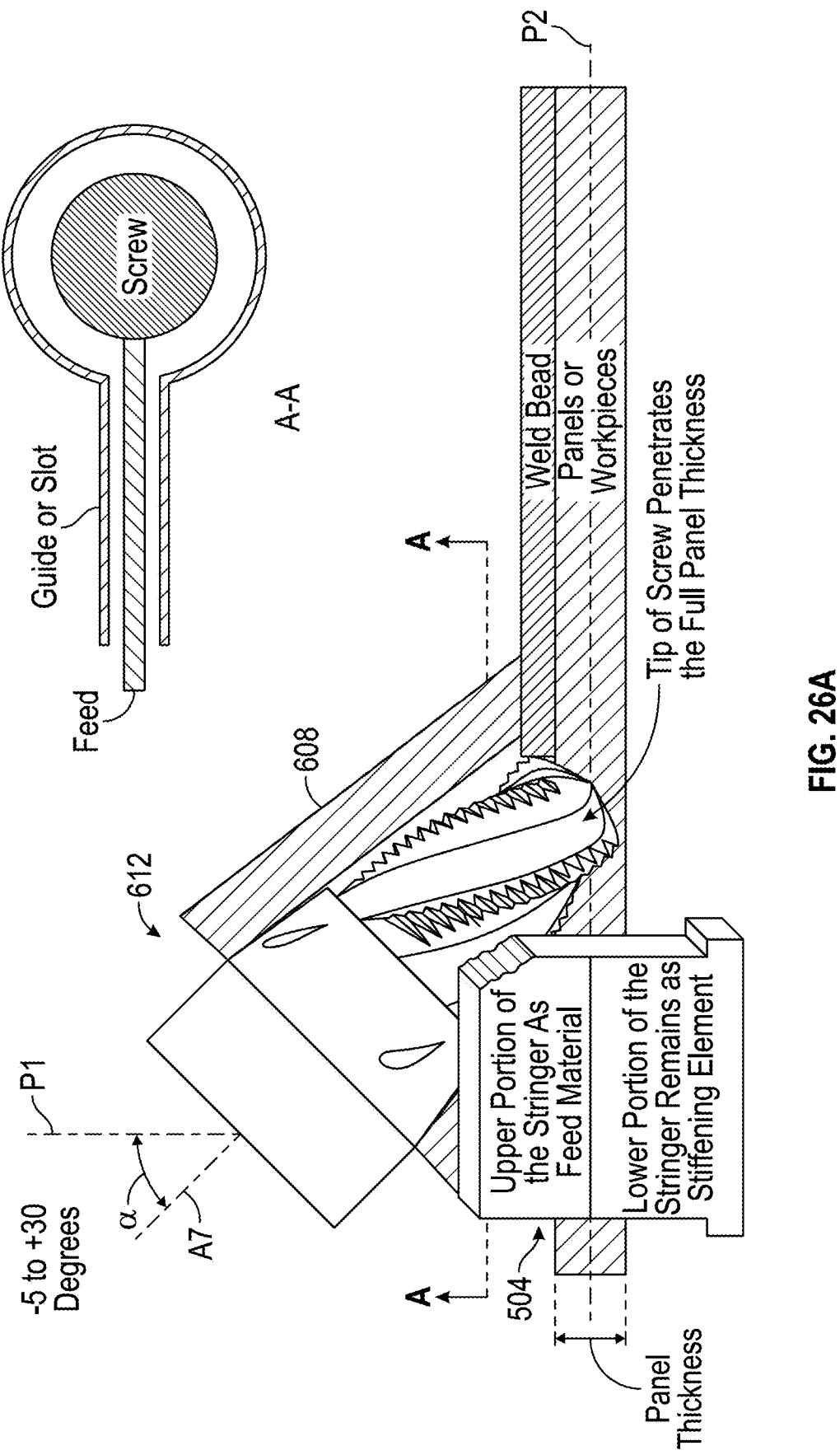
FIGS. 26A and 26B are schematic illustrations of the system of FIG. 21A during use according to embodiments of the present disclosure.
Figure 26B:
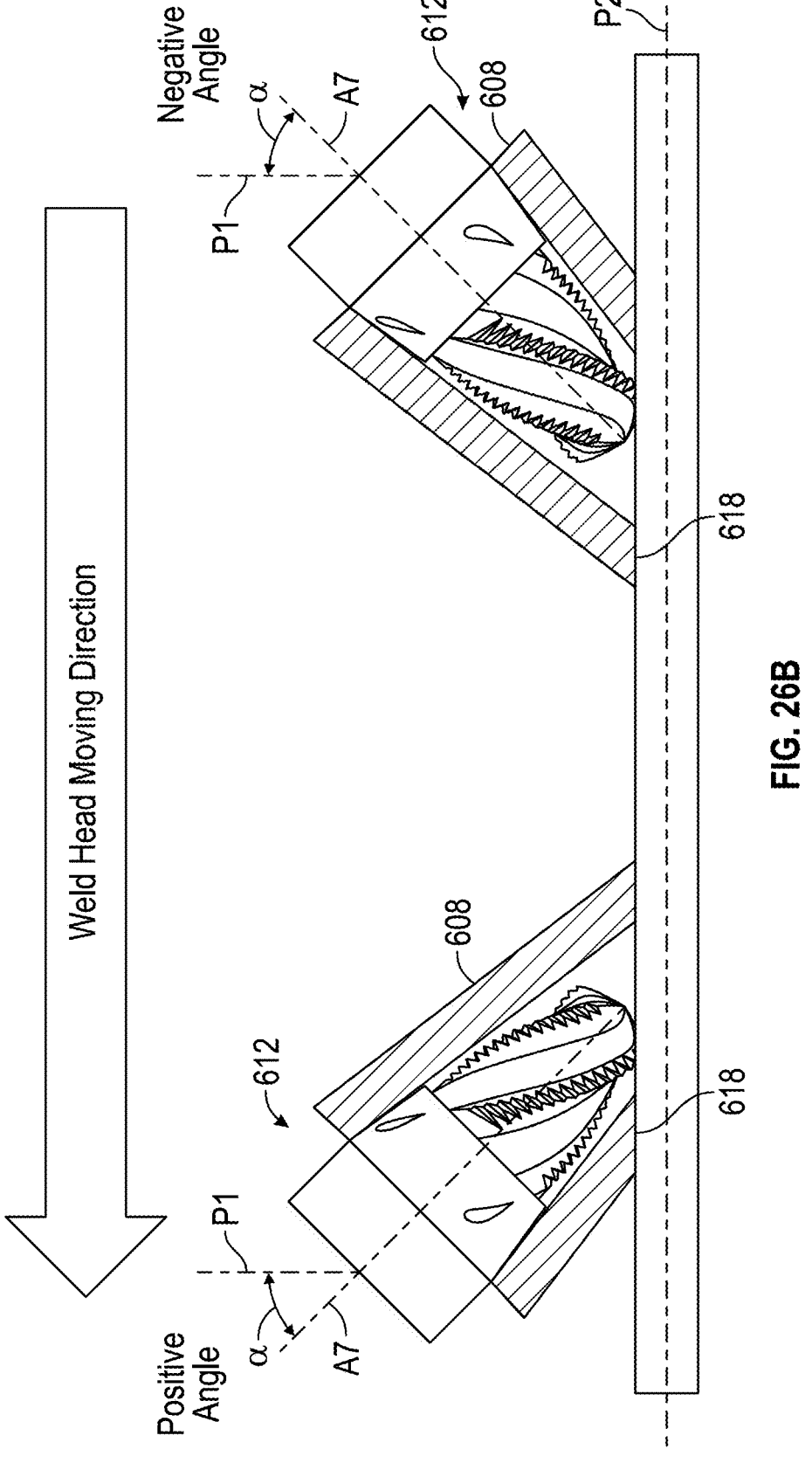

FIGS. 26A-26B schematically illustrate the system 600 during use according to an embodiment of the present disclosure. As shown, the spindle 612 and the housing 608 can be positioned such that a central axis A7 of the spindle 612 (which can align with the central axis A6 of the housing 608) and a plane P1 perpendicular to a plane P2 of a work-piece or panel form an angle α. The angle α can be a positive or negative angle, as shown in FIG. 26B. The angle α may be about 5 degrees, about 10 degrees, about 15 degrees, about 30 degrees, or more or less or any value in between in either the positive or negative direction. The angle α may be less than 90 degrees. Accordingly, embodiments of the present disclosure can include a spindle 612 positioned within the central channel of the housing 608, where the central axis A7 of the spindle 612 defines an angle α that is less than 90 degrees relative to the plane P1 that is perpendicular to surfaces of the work-piece or panel. In some embodiments, a longitudinal axis of the housing 608 and the plane P1 perpendicular to surfaces of the work-piece define a non-90 degree angle. Although FIG. 26A illustrates one work-piece or panel, it will be understood that embodiments of the present disclosure can include a spindle oriented at a positive or negative angle relative to two or more work-pieces or panels, for example work-pieces or panels to be joined. Positioning the spindle 612 and the housing 608 at an angle relative to the work-piece or panel can allow the surface 618 to contact the work-piece, panel, substrate, or previously deposited layer during use. A recess 626 in the surface 617 may be spaced a distance from the work-piece, panel, or previously deposited layer to allow the weld bead to form as the housing 608 advances along the weld line.

The angle or tilt of the spindle 612 and the housing 608 relative to the work-piece or panel can be advantageous as the tilt or angle positioning reduces the force needed to move the system during use. The angle or tilt can also result in improved material flow during deposition. In some non-limiting embodiments, using a spindle 612 oriented at a positive angle can be more optimal for welding skins or welding structures that have warpage or mismatches, in comparison to using a spindle 612 oriented at a negative angle. Using a spindle 612 oriented at a positive angle can promote material flow by making it easier for material to flow out of the housing and to weld zone. In some non-limiting embodiments, using a spindle 612 oriented at a negative angle can be more optimal for welding structures where very high quality welds are described, in comparison to using a spindle 612 oriented at a positive angle. Using a spindle 612 oriented at a negative angle may make it harder for material to flow out of the housing and to the weld zone, such an increase in the pressure applied to the material may result in higher quality welds.

As shown in FIG. 26A, the tip of the spindle 612 can penetrate the entire thickness of the work-piece or panel. The tip of the spindle 612 penetrating the entire thickness can be advantageous in that a better weld or joint can be formed between the panels and/or the structure (for example, the stiffener). In one non-limiting embodiment of the present disclosure, the panels are approximately ⅛ thick. The tip of the spindle 612 can penetrate the entire ⅛ inch thickness of the panels, for example as shown in FIGS. 25B and 26A. In some advantageous examples, the width of the weld bead is approximately four times the thickness of the panel. In the non-limiting embodiment in which the panel is approximately ⅛ inch, the weld bead can be about ½ inch wide.

The structure shown as the stiffener 504 can be received by the slot 620. A portion of the stiffener 504 received in the slot 620 can be used as feed material as the spindle 612 cuts and breaks down the portion of the stiffener 504 into smaller pieces of material. In some embodiments, the spindle 612 can have a larger diameter than a width of the stiffener 504 to assist in breaking down the portion of the stiffener 504. The diameter of the spindle 612 may also be dependent upon a thickness of the panels or work-pieces. The spindle 612 may shred a portion of the stiffener 504, compress the shredded material, and plasticize the shredded and compressed material for deposition. A portion of the stiffener not received by the slot 620 can remain intact and function as a stiffening element once joined to one or more work-pieces or panels.

Example Systems with Adjustable Spindles

Figure 27A:
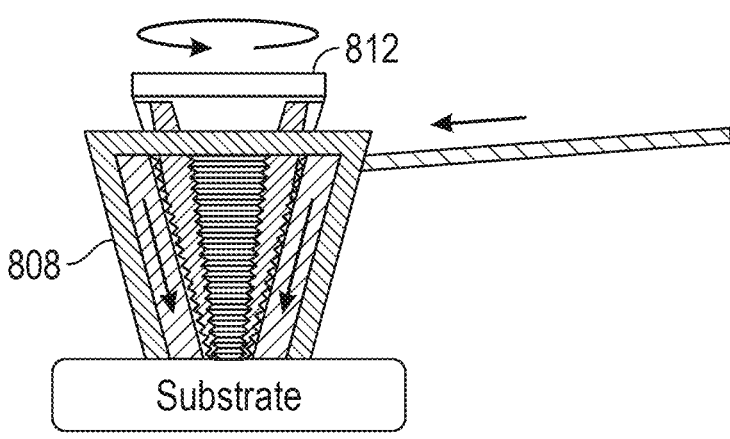
FIG. 27A illustrates an example system in a normal or flush configuration according to an embodiment of the present disclosure.
Figure 27B:
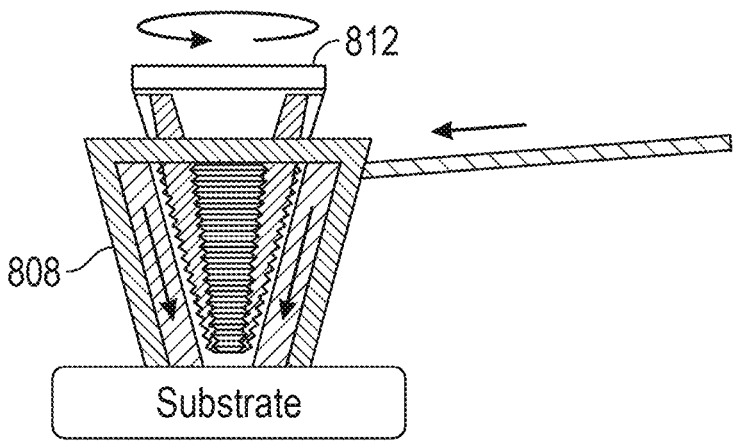
FIG. 27B illustrates the example system of FIG. 27A in a retracted configuration according to an embodiment of the present disclosure.
Figure 27C:
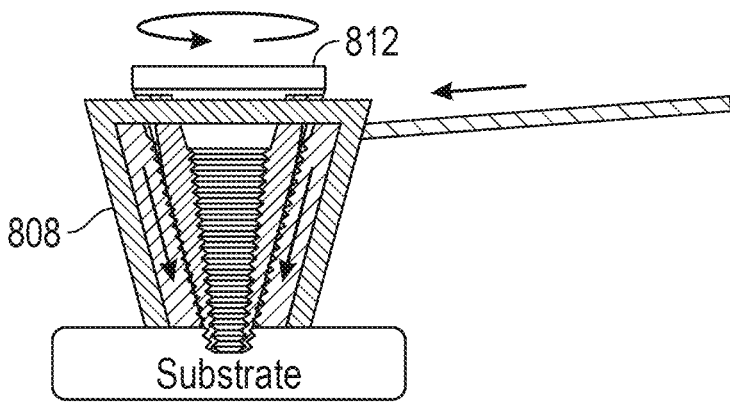
FIG. 27C illustrates the example system of FIG. 27A in a protruding configuration according to an embodiment of the present disclosure.

In some embodiments, the position of the spindle within the housing may be adjusted before, during, and after use. The spindle can be moved along a longitudinal axis of the housing between more than one position, for example from a first position to a second position. FIGS. 27A-27C illustrate three example configurations of an adjustable spindle 812 positioned within a housing 808. Embodiments of the example housing 808 and the example spindle 812 shown in FIGS. 27A-27C may include any of the features of the systems discussed above or below, and should not be limited to the particular embodiments described. For example, features of one embodiment may be combined with features of another embodiment. The particular modifications shown in FIGS. 27A-27C will now be discussed in detail, and features not discussed will be understood to be similar, or identical, to those discussed elsewhere herein. Some or all of the modifications discussed with respect to FIGS. 27A-27C may be incorporated into the other embodiments described herein.

FIG. 27A illustrates a normal or flush position. In the normal position, the tip of the rotating spindle 812 can be flush with an opening or material exit of the housing 808 and/or flush with a surface of the substrate. In the normal position, the tip of the rotating spindle 812 can be substantially coplanar with a material exit of the housing 808. FIG. 27B illustrates a retracted position. In the retracted position, the tip of the rotating spindle 812 can be retracted into the housing 808, forming a gap between the tip of the spindle 812 and the opening of the housing and/or forming a gap between the tip of the spindle 812 and a surface of the substrate. The spindle 812 can be translated along its longitudinal axis to retract the spindle 812 in a longitudinal direction and into the housing 808. The retracted position can allow for minimum impact on the substrate or a previously deposited layer of material. FIG. 27C illustrates a protruding position. In the protruding position, the tip of the rotating spindle 812 can extend out of the opening of the housing 808 and in some instances, into the substrate. The spindle 812 can be translated along its longitudinal axis to cause the spindle 812 to move in the longitudinal direction and extend out of the housing 808. The protruding position can allow for active mixing of materials between two adjacent layers of deposited material and/or two adjacent work-pieces. As described above, embodiments of the housing 808 according to embodiments of the present disclosure can include a slot (not illustrated) configured to receive and plasticize a portion of a structure (for example, a stiffener or a stringer) and further configured to receive and plasticize a wire material into a space between the housing 808 and the spindle 812.

Example Material Depositions and Applications of Use

Figure 28A:
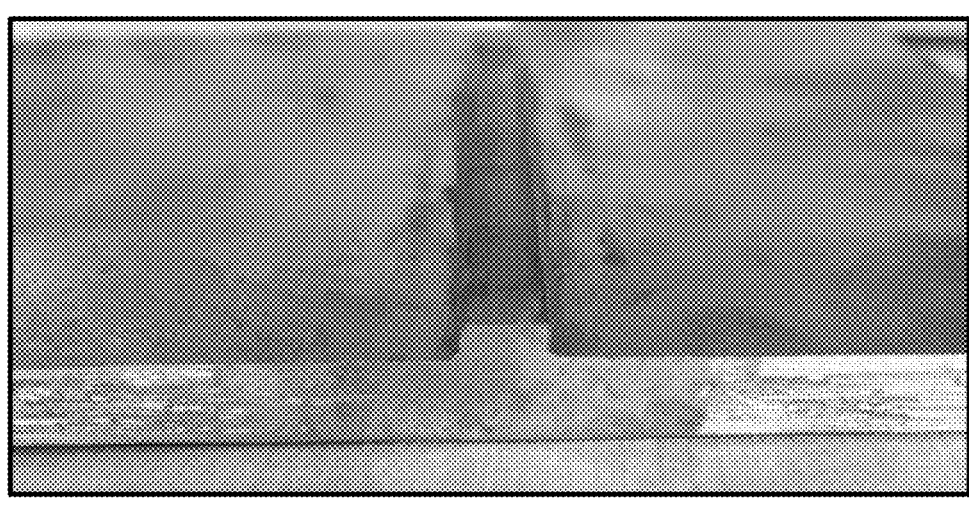
FIGS. 28A-28C illustrate example material depositions using systems according to embodiments of the present disclosure.
Figure 28B:
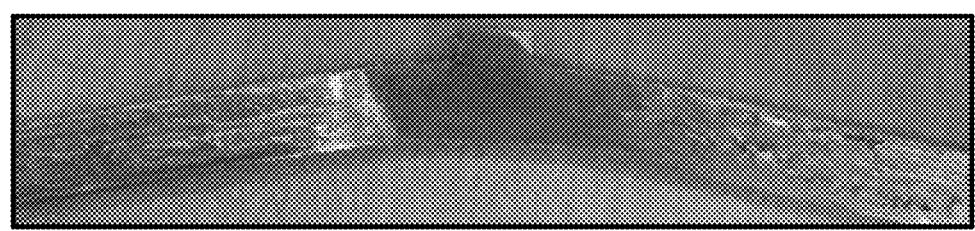
Figure 28C:
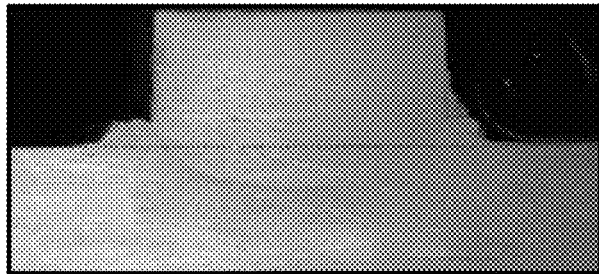
Figure 28D:
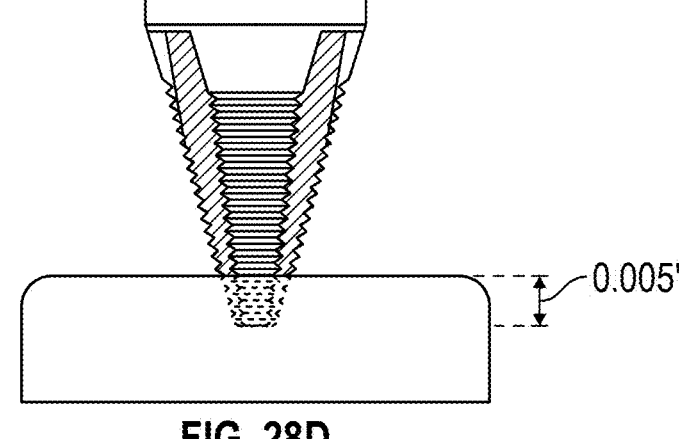
FIG. 28D illustrates a rotating spindle penetrating a substrate according to an embodiment of the present disclosure.

FIG. 28A illustrates an example layer of material that was deposited according to an embodiment of the systems described herein. FIG. 28A illustrates the layer after deposition on a substrate. FIG. 28B illustrates a root bend after the layer was deposited on the substrate. The methods and systems according to the present disclosure are advantageous as there is no debonding when the bend is applied to the substrate and deposited material, as shown. The interface bonding that can be formed between deposited material and the substrate can be facilitated by in-plane shear (for example, a very low downforce). FIG. 28C illustrates a rough etch or onion ring pattern. During the bonding process, the rotating spindle or pin can partially penetrate the substrate to assist in the interface bonding, as shown in FIG. 28D. In some non-limiting embodiments, the spindle can partially penetrate into the surface of the substrate, for example penetrate a distance of 0.005 inches into the surface of the substrate. In other non-limiting embodiments, as described above with reference to FIG. 26A, the spindle can penetrate an entire thickness of the substrate, for example a distance of ⅛ inch.

Figure 29B:
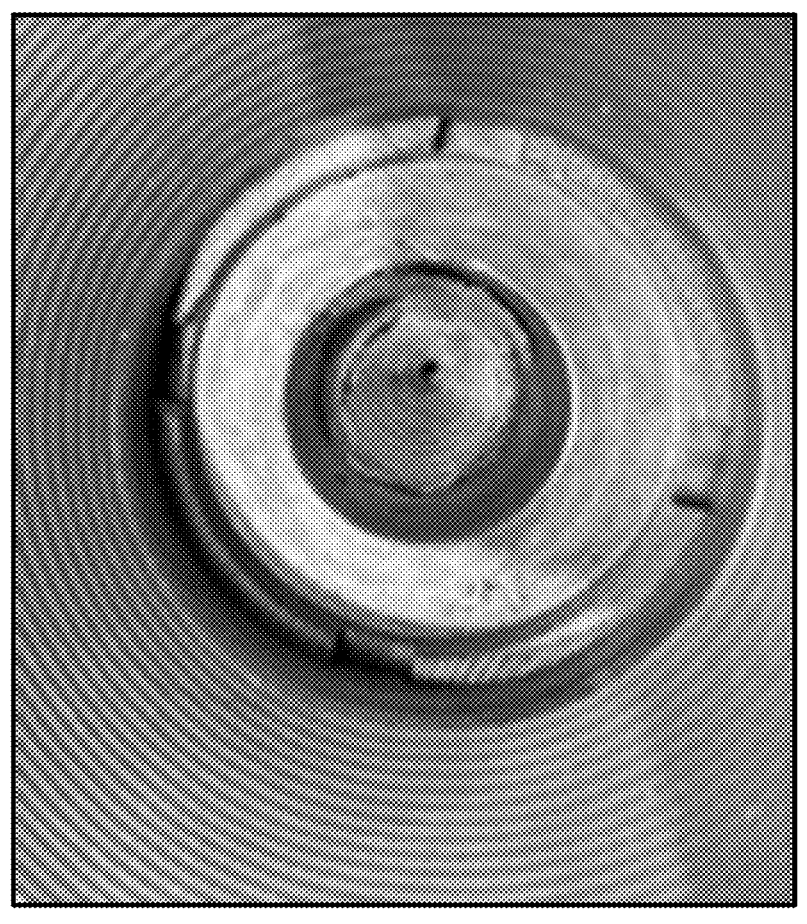
FIG. 29B illustrates a swirling DRX nugget within a nosecone or housing of a system according to an embodiment of the present disclosure.
Figure 29A:
FIG. 29A illustrates an example extrusion produced using a system according to the present disclosure.

FIG. 29A illustrates an example extrusion produced using a system according to the present disclosure. FIG. 29B illustrates a swirling DRX nugget within a nosecone or housing of a system according to the present disclosure. The system can be operated at a value within the range of about 300 RPM to about 1,000 RPM. The torque range can be about 17 ft-lbs. to about 24 ft lbs. The Z-forces on the spindle during extrusion can be about 1,200 lbs. Thus, systems and methods according embodiments of the present disclosure can greatly reduce the forging force required in typical FSW and FSAM systems.

Embodiments of systems and methods according to the present disclosure can advantageously introduce feed material, such as a wire or pellet-like material, into a side wall of a housing, allowing the system to have a much lighter weight and a smaller footprint than conventional FSAM systems. In one example embodiment, a system according to the present disclosure can weigh 100 to 200 pounds, an order of magnitude lighter than conventional friction stir systems. Advantageously, embodiments of systems and methods according to the present disclosure may not require large normal forces that are typically required to force feed rigid bars of material, or other feedstock, into a shoulder. In some embodiments, the housing reacts all or almost all of the load. In some embodiments, systems and methods according to the present disclosure do not transfer forces, or transfers negligible forces, to a substrate onto which material is deposited. Further, as noted above, embodiments of systems and methods according to the present disclosure need not rely on gravity to feed bars of material into and through a shoulder. Embodiments of systems and methods according to the present disclosure can rely on rotation of a spindle to plasticize a material, such as readily available and commercially-viable wire materials, for example aluminum or Inconel wire.

Figure 30:
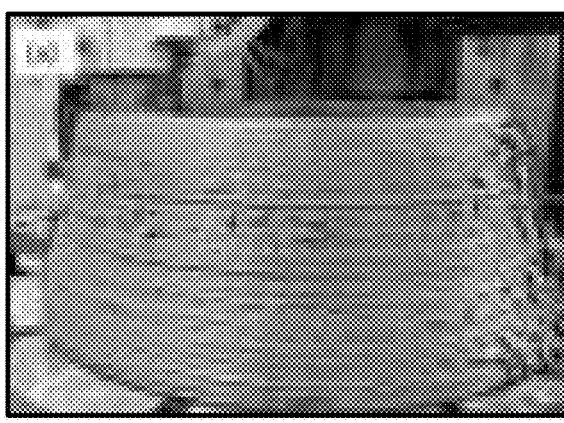
FIG. 30 illustrates example applications of use for systems according to embodiments of the present disclosure.
Figure 30:
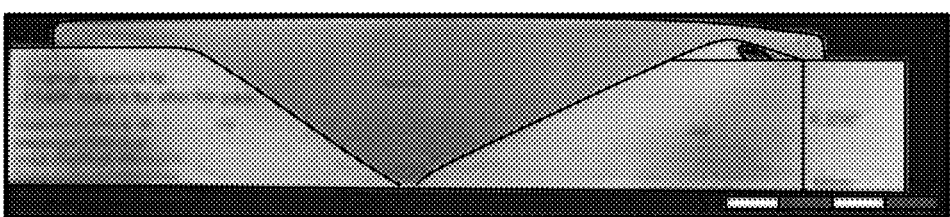
Figure 30:
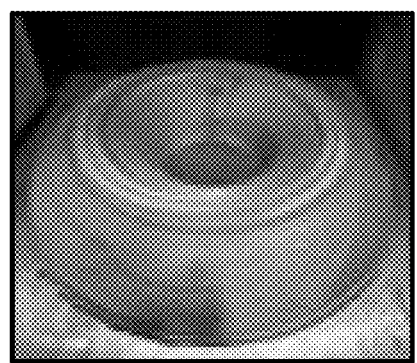
Figure 30:
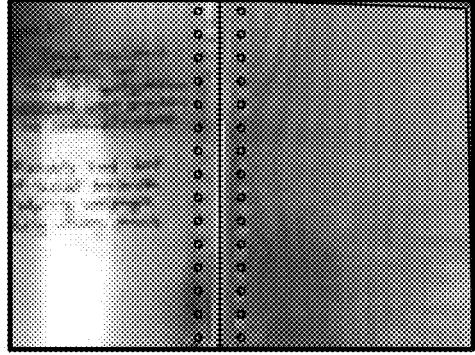
Figure 30:
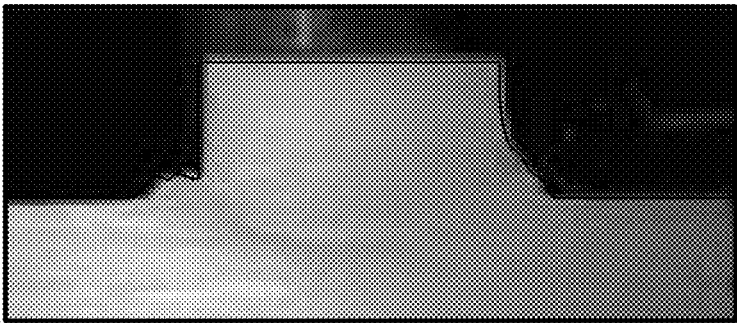

The systems and methods according to the present disclosure can be used in various applications, as shown in FIG. 30. In some cases, the systems and methods can be used to free form parts or structures. The systems and methods can be used to weld and/or join parts. The system and methods can be used for local pad-up.

Figure 31:
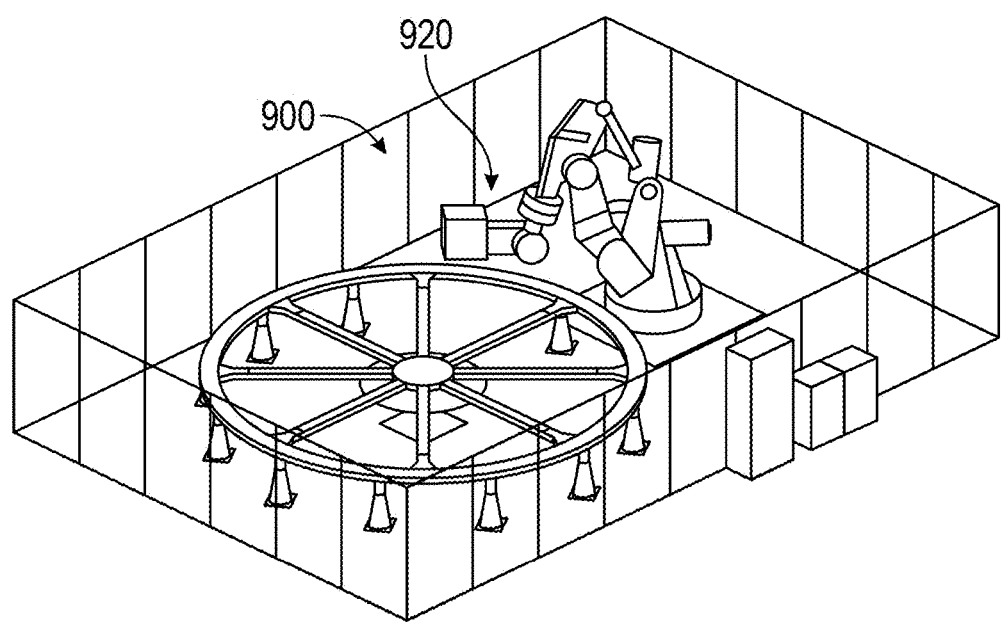
FIG. 31 illustrates an example robotic system that can incorporate an additive manufacturing system according to an embodiment of the present disclosure.
Figure 32:
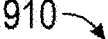
FIG. 32 illustrates a gantry-based CNC platform that can incorporate an additive manufacturing system according to an embodiment of the present disclosure.
Figure 32:
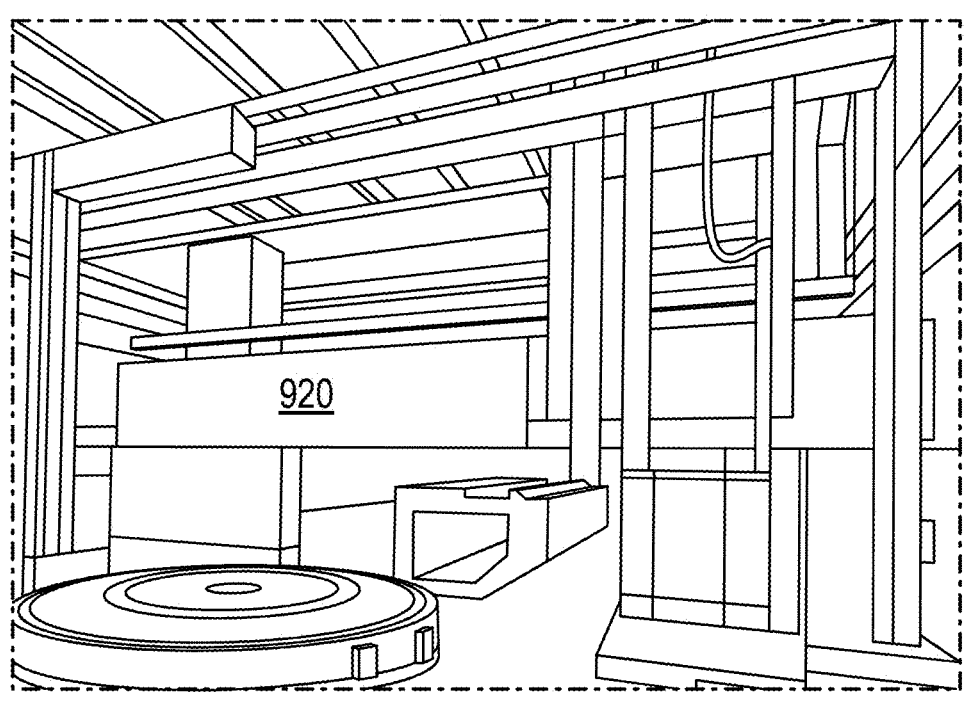

Example Systems Incorporated into Robotic Systems and/or Gantry Based CNC Platforms Systems according to the present disclosure can be incorporated into robotic systems and/or gantry-based CNC platforms to free form, join, and repair many different types of structures. The systems described herein can include print heads configured to move in 3 translational and 3 rotational degrees of freedom under control of a control system. Example control systems include a robotic system 900 and a gantry-based CNC platform 910, as shown in FIGS. 31 and 32. Other control systems can be suitably implemented in embodiments of the present disclosure. The overall systems according to embodiments of the present disclosure can be very lightweight relative to conventional systems. The housing can be mounted to the robotic machine or gantry-based CNC platform. As described above, systems according to the present disclosure can be used in any orientation as they are not gravity based. For example, the systems can deposit a material in a direction opposite the direction of gravity. As such, the incorporation of the systems onto a robotic system or gantry-based CNC platform can allow the pointing or orientation of the system in any direction during use. This can be advantageous over systems that require gravity to move the material being deposited to a deposition surface. Accordingly, systems and methods according to embodiments of the present disclosure can advantageously be used to manufacture large structures, such as propellent tanks and other structures for use in space, with very high quality welds in less time and at reduced cost than other systems. In some non-limiting embodiments, systems and methods according to the present disclosure can be used to manufacture a tank or other container having a length of 50 meters measured pole-to-pole and/or a diameter of 5 to 10 meters.

The robotic system 900 can include a print head of any of the above-described systems mounted to a robotic arm 920. The CNC platform can include a print head of any of the above-described systems mounted to a CNC gantry. The robotic arm 920 or CNC gantry can be controlled by a user interface that can control the motion of the print head with six degrees of freedom. The thermocouples described above can be used to collect temperature data for a closed loop control of the printing parameters. For example, the spindle's RPM, wire feed speed, and print head transverse speed can be controlled. The cooling described above can be used to maintain a desired temperature of the feed material during deposition. The systems may also include a shield gas distributing system for protecting the printed material from oxidation. A tooling system for maneuvering the printed part may also be incorporated into the systems.

Implementation Details

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope. Throughout this disclosure, the term "fluid" encompasses both liquids and gases (for example, a shield gas).

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above description discloses several devices, methods, and materials of the present disclosure. The present disclosure is susceptible to modifications in the devices, methods, and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A friction stir additive manufacturing system comprising:
   a spindle configured to rotate about a central axis;
   a housing configured to receive at least a portion of the spindle, the housing configured to remain stationary relative to the spindle, the housing comprising:
      a wire inlet extending between an exterior surface of the housing and an interior surface of the housing, and
      a track extending from the wire inlet and partially around a circumference of the interior surface of the housing; and
   a feeding system configured to receive a wire from a roller and feed the wire through the wire inlet and into the track of the housing.

2. The friction stir additive manufacturing system of claim 1, further comprising a gap between the interior surface of the housing and an exterior surface of the spindle.

3. The friction stir additive manufacturing system of claim 2, wherein the track comprises a depth that is less than a diameter of the wire fed by the feeding system, and wherein, when the wire is fed through the wire inlet, the wire extends out of the track and protrudes into the gap.

4. The friction stir additive manufacturing system of claim 1, wherein an outer surface of the spindle comprises threads or vertical ridges.

5. The friction stir additive manufacturing system of claim 1, wherein a longitudinal axis of the wire inlet is perpendicular to the central axis of the spindle.

6. The friction stir additive manufacturing system of claim 1, wherein a longitudinal axis of the wire inlet does not intersect the central axis of the spindle.

7. The friction stir additive manufacturing system of claim 1, wherein the wire inlet is offset from the central axis of the central axis of the spindle.

8. A friction stir additive manufacturing system comprising:
   a spindle configured to rotate about a central axis;
   a housing configured to receive at least a portion of the spindle, the housing configured to remain stationary relative to the spindle, the housing comprising:

a wire inlet extending through a side wall of the housing and offset from the central axis of the spindle, and
      a track extending from the wire inlet and formed in an interior surface of the housing; and
   a feeding system configured to feed a wire through the wire inlet and into the track of the housing.

9. The friction stir additive manufacturing system of claim 8, wherein the track has a tear drop shape.

10. The friction stir additive manufacturing system of claim 8, wherein a longitudinal axis of the wire inlet does not intersect the central axis of the spindle.

11. The friction stir additive manufacturing system of claim 10, further comprising a gap between the interior surface of the housing and an exterior surface of the spindle.

12. The friction stir additive manufacturing system of claim 11, wherein the track comprises a depth that is less than a diameter of the wire fed by the feeding system, and wherein, when the wire is fed through the wire inlet the wire extends out of the track and protrudes into the gap.

13. The friction stir additive manufacturing system of claim 8, wherein the track extends partially around a circumference of the interior surface of the housing.

14. The friction stir additive manufacturing system of claim 8, wherein the track extends around an entire circumference of the interior surface of the housing.

15. The friction stir additive manufacturing system of claim 8, wherein the track extends in multiple rotations around a circumference of the interior surface of the housing.

16. The friction stir additive manufacturing system of claim 8, wherein an outer surface of the spindle comprises threads or vertical ridges.

17. A method comprising:
   feeding a wire through a wire inlet extending through a sidewall of a housing of a friction stir additive manufacturing device and into a track formed in an interior surface of the housing;
   rotating a spindle positioned within the housing about a central axis to soften the wire as it is fed into a gap between the interior surface of the housing and an exterior surface of the spindle; and
   depositing softened material on to a substrate as it exits a deposition end of the housing.

18. The method of claim 17, further comprising advancing the friction stir additive manufacturing device across the substrate as the softened material is deposited.

19. The method of claim 17, wherein feeding the wire through the wire inlet further comprises feeding the wire through a roller configured to guide the wire into a wire sleeve aligned with the wire inlet.

20. The method of claim 17, wherein, when the wire is fed into the track, the wire extends out of the track and protrudes into the gap.

* * * * *